US007873644B1

(12) United States Patent
Alley

(10) Patent No.: US 7,873,644 B1
(45) Date of Patent: Jan. 18, 2011

(54) COMPUTER IMPLEMENTED SYSTEM FOR POPULATION OF FORMS WITH INFORMATION

(75) Inventor: Kenneth Rand Alley, Littleton, CO (US)

(73) Assignee: Automotive Titling Corporation, Centennial, CO (US)

( * ) Notice: Subject to any disclaimer, the term of this patent is extended or adjusted under 35 U.S.C. 154(b) by 878 days.

(21) Appl. No.: 11/418,877

(22) Filed: May 5, 2006

Related U.S. Application Data

(60) Provisional application No. 60/678,395, filed on May 5, 2005.

(51) Int. Cl.
*G06F 7/00* (2006.01)
*G06F 17/30* (2006.01)

(52) U.S. Cl. ....................... 707/756; 707/803; 707/809; 715/225

(58) Field of Classification Search ....................... None
See application file for complete search history.

(56) References Cited

U.S. PATENT DOCUMENTS

| | | | | |
|---|---|---|---|---|
| 6,088,700 | A * | 7/2000 | Larsen et al. | 1/1 |
| 2005/0289114 | A1* | 12/2005 | Bellamy | 707/2 |
| 2007/0288292 | A1* | 12/2007 | Gauger | 705/9 |

OTHER PUBLICATIONS

U.S. Appl. No. 60/678,395, Alley Kenneth Rand.
Adobe Acrobat Help, PDF Forms, faxed Apr. 27, 2006, pp. 145-146.

* cited by examiner

*Primary Examiner*—Uyen T. Le
(74) *Attorney, Agent, or Firm*—Craig R. Miles; CR Miles, P.C.

(57) ABSTRACT

A computer implemented system which automatically populates the fields of form documents with the corresponding information.

16 Claims, 49 Drawing Sheets

```
<?xml version="1.0"?>
<Autotitling>
<Registration>
        <ClientCredentials>
        <AcceptComplex>1</AcceptComplex>
        </ClientCredentials>
        <RegistrationInformation>
                <State>CO</State>
                <County>ARAPAHOE</County>
                <City>DENVER</City>
                <Zipcode>80005</Zipcode>
                <VehicleType>m</VehicleType>
                <PlateType>Regular</PlateType>
                <Transaction>2</Transaction>
                <TransferingPlates>yes</TransferingPlates>
                <Number></Number>
                <Expiration></Expiration>
        </RegistrationInformation>
        <FirstBuyerInformation>
                        <FBFirstName>John</FBFirstName>
                        <FBMiddleName>Curtis</FBMiddleName>
                        <FBLastName>DemoTest</FBLastName>
                        <FBCompany></FBCompany>
                        <FBAddress>123 Fake Street</FBAddress>
                        <FBAddress2>123 Fake Street</FBAddress2>
                        <FBDOB>8/8/1975</FBDOB>
                        <FBCity>New York</FBCity>
                        <FBState>NY</FBState>
                        <FBZIP></FBZIP>
                        <FBSSN></FBSSN>
                        <FBDLNumber>321654987</FBDLNumber>
                        <FBDLState></FBDLState>
                        <FBRelationship>family</FBRelationship>
                </FirstBuyerInformation>
                <SecondBuyerInformation>
                        <SBFirstName></SBFirstName>
                        <SBMiddleName></SBMiddleName>
                        <SBLastName></SBLastName>
                        <SBDOB></SBDOB>
                        <SBAddress1></SBAddress1>
                        <SBAddress2></SBAddress2>
                        <SBCity></SBCity>
                        <SBState></SBState>
                        <SBZip></SBZip>
                        <SBSSN></SBSSN>
                        <SBANDOR></SBANDOR>
                </SecondBuyerInformation>
                <FeesPaid>
                        <DocumentFees></DocumentFees>
                        <WarrantyFees></WarrantyFees>
                </FeesPaid>
                <VehicleInformation>
                        <Lien>1</Lien>
                        <Titled>1</Titled>
                        <TitledState></TitledState>
                        <VIN>98234923980</VIN>
                        <Odometer>45023</Odometer>
                        <NewUsed>no</NewUsed>
                </VehicleInformation>
                <VehicleDescription>
                        <Year>2003</Year>
                        <Make>Honda</Make>
                        <Model>Civic</Model>
```

FIG. 40 A

```
                <Weight>600</Weight>
                <Color>Silver</Color>
                <Cylinders>4</Cylinders>
                <HP>145</HP>
                <MSRP>17000</MSRP>
                <Purchaseprice>16425</Purchaseprice>
                <PurchaseDate>1/12/2005</PurchaseDate>
                <TradeIn>1</TradeIn>
                <TradeInState>CO</TradeInState>
                <TradeAmt>3000</TradeAmt>
                <TotalPrice></TotalPrice>
        </VehicleDescription>
        <LienInformation>
                <LienholderCompany>Westcorp Financial</LienholderCompany>
                <LienholderAddress>123 Finance Street</LienholderAddress>
                <LienholderAddress2></LienholderAddress2>
                <LienholderFederalTaxId>232323</LienholderFederalTaxId>
                <LienholderStateTaxID>2323</LienholderStateTaxID>
                <LienCity>New York</LienCity>
                <LienState></LienState>
                <LienZIP></LienZIP>
                <LienDate>01/01/2005</LienDate>
                <MaturityDate>01/01/2010</MaturityDate>
                <LienAmount>25000</LienAmount>
        </LienInformation>
        <InsuranceInformation>
                <InsuranceCompany>Allstate</InsuranceCompany>
                <InsuranceDate>01/01/2005</InsuranceDate>
                <InsuranceExpiryDate>01/01/2007</InsuranceExpiryDate>
                <InsuranceNumber>123456</InsuranceNumber>
        </InsuranceInformation>
        <LeaseInformation>
                <LeaseCompanyName></LeaseCompanyName>
                <LeaseAddress></LeaseAddress>
                <LeaseAddress2></LeaseAddress2>
                <LeaseFederalTaxId></LeaseFederalTaxId>
                <LeaseStateTaxId></LeaseStateTaxId>
                <LeaseCity></LeaseCity>
                <LeaseState></LeaseState>
                <LeaseZIP></LeaseZIP>
                <DownPayment></DownPayment>
                <MonthlyPayment></MonthlyPayment>
                <MonthsInTerm></MonthsInTerm>
        </LeaseInformation>
        <FirstSeller>
                <FSFirstName>Peter</FSFirstName>
                <FSMiddleName>James</FSMiddleName>
                <FSLastName>Sellers</FSLastName>
                <FSCompany>123 Sale Street</FSCompany>
                <FSAddress>New York</FSAddress>
                <FSCity>New York</FSCity>
                <FSState>NY</FSState>
                <FSZIP>10001</FSZIP>
        </FirstSeller>
        <SecondSeller>
                <SSFirstName></SSFirstName>
                <SSMiddleName></SSMiddleName>
                <SSLastName></SSLastName>
        </SecondSeller>
</Registration>
</Autotitling>
```

FIG. 40 B

*Request XML*

```
<?xml version="1.0" encoding="iso-8859-1" ?>
<AutoTitling RequestNo="1">
        <Login>
                <UserName>atcdirect</UserName>
                <Password>bn67aJ4</Password>
        </Login>
        <Options AcceptComplex="yes" />
        <Registration>
                <Location>
                        <State>CA</State>
                        <County>Alameda</County>
                        <City>Alameda</City>
                </Location>
                <Vehicle Type="pv" Lien="yes" Transaction="lease" TransferingPlates="no" TradeIn="no" Used="no">
                        <Plate Type="regular">
                                <Number>ABC123</Number>
                                <Expiration>05/02/2005</Expiration>
                        </Plate>
                        <VIN>AB12345JH678</VIN>
                        <Make>Chevrolet</Make>
                        <Model>Cavalier</Model>
                        <Weight>1200</Weight>
                        <MSRP>16025</MSRP>
                        <PurchasePrice>16000</PurchasePrice>
                        <HP>123</HP>
                        <Year>2003</Year>
                        <Color>Red</Color>
                        <Cylinders>4</Cylinders>
                        <PurchaseDate>01/01/2005</PurchaseDate>
                        <Odometer>35783</Odometer>
                </Vehicle>
                <TotalPrice>16000</TotalPrice>
                <PreviousOwners>
                        <FirstOwner>
                                <Company />
                                <FirstName>Helen</FirstName>
                                <MiddleName>Mary</MiddleName>
                                <LastName>Murphy</LastName>
                                <Address>123 Anywhere</Address>
                                <City>Somewhere</City>
                                <State>CA</State>
                                <Zip>12345</Zip>
                        </FirstOwner>
                        <SecondOwner>
                                <FirstName>Jim</FirstName>
                                <MiddleName>William</MiddleName>
                                <LastName>Kelly</LastName>
                        </SecondOwner>
```

FIG. 41 A

```
            </PreviousOwners>
            <NewOwners>
                <FirstOwner>
                    <Company />
                    <FirstName>John</FirstName>
                    <MiddleName>Tim</MiddleName>
                    <LastName>Smith</LastName>
                    <Address>123 Newbuyer Street</Address>
                    <City>Alameda</City>
                    <State>CA</State>
                    <Zip>12345</Zip>
                    <DOB>01/01/1975</DOB>
                    <SSN>123456789</SSN>
                    <DriverLicenseNbr>C1234567</DriverLicenseNbr>
                    <DriverState>CA</DriverState>
                </FirstOwner>
                <SecondOwner>
                    <FirstName>James</FirstName>
                    <MiddleName>Phil</MiddleName>
                    <LastName>Doe</LastName>
                </SecondOwner>
            </NewOwners>
            <LeasingCompany>
                <Name>Imaginary Lease Co</Name>
                <Address>456 Anywhere</Address>
                <City>Leasington</City>
                <State>CA</State>
                <Zip>12433</Zip>
                <Downpayment>2000</Downpayment>
                <MonthlyPayment>500</MonthlyPayment>
                <MonthsInTerm>36</MonthsInTerm>
            </LeasingCompany>
        </Registration>
</AutoTitling>
```

*Expected Response XML*

```
<?xml version="1.0" encoding="UTF-8"?>
<AutoTitling RequestNo="0">
    <Login>
        <UserName>atcdirect</UserName>
        <Password>bn67aJ4</Password>
    </Login>
    <Options AcceptComplex="yes" />
    <Registration>
        <Location>
            <State>CA</State>
            <County>Alameda</County>
            <City>Alameda</City>
        </Location>
        <Vehicle Type="pv" Lien="yes" Transaction="lease" TransferingPlates="no" TradeIn="no" Used="no">
            <Plate Type="regular">
                <Number>ABC123</Number>
                <Expiration>05/02/2005</Expiration>
            </Plate>
            <VIN>AB12345JH678</VIN>
            <Make>Chevrolet</Make>
            <Model>Cavalier</Model>
            <Weight>1200</Weight>
            <MSRP>16025</MSRP>
            <PurchasePrice>16000</PurchasePrice>
            <HP>123</HP>
            <Year>2003</Year>
            <Color>Red</Color>
```

FIG. 41 B

```
        <Cylinders>4</Cylinders>
        <PurchaseDate>01/01/2005</PurchaseDate>
        <Odometer>35783</Odometer>
    </Vehicle>
    <TotalPrice>16000</TotalPrice>
    <PreviousOwners>
        <FirstOwner>
            <Company />
            <FirstName>Helen</FirstName>
            <MiddleName>Mary</MiddleName>
            <LastName>Murphy</LastName>
            <Address>123 Anywhere</Address>
            <City>Somewhere</City>
            <State>CA</State>
            <Zip>12345</Zip>
        </FirstOwner>
        <SecondOwner>
            <FirstName>Jim</FirstName>
            <MiddleName>William</MiddleName>
            <LastName>Kelly</LastName>
        </SecondOwner>
    </PreviousOwners>
    <NewOwners>
        <FirstOwner>
            <Company />
            <FirstName>John</FirstName>
            <MiddleName>Tim</MiddleName>
            <LastName>Smith</LastName>
            <Address>123 Newbuyer Street</Address>
            <City>Alameda</City>
            <State>CA</State>
            <Zip>12345</Zip>
            <DOB>01/01/1975</DOB>
            <SSN>123456789</SSN>
            <DriverLicenseNbr>C1234567</DriverLicenseNbr>
            <DriverState>CA</DriverState>
        </FirstOwner>
        <SecondOwner>
            <FirstName>James</FirstName>
            <MiddleName>Phil</MiddleName>
            <LastName>Doe</LastName>
        </SecondOwner>
    </NewOwners>
    <LeasingCompany>
        <Name>Imaginary Lease Co</Name>
        <Address>456 Anywhere</Address>
        <City>Leasington</City>
        <State>CA</State>
        <Zip>12433</Zip>
        <Downpayment>2000</Downpayment>
        <MonthlyPayment>500</MonthlyPayment>
        <MonthsInTerm>36</MonthsInTerm>
    </LeasingCompany>
</Registration>
<Result Complex="no">
    <Paperwork DocumentCount="1">
            <Item ComplexFee="no" OriginalForm="no" Pages="2">
                <FormNumber>Not Specified</FormNumber>
                    <Name>CA Registration Application</Name>
                    <FileName>reg3433.pdf</FileName>
                    <FileSpec xmlns:dt="urn:schemas-microsoft-com:datatypes"
dt:dt="bin.base64">[file contents removed]</FileSpec>
                    <Description>Additional fillout instruction here.</Description>
            </Item>
    </Paperwork>
```

FIG. 41 C

```
<FeesTaxes DocumentCount="2">
        <TaxItem>
                <Name>State Tax</Name>
                <Description>No credits available for county or city taxes paid.</Description>
                <Amount>$960.00</Amount>
                <Estimated>no</Estimated>
                <Calculation>(6/100)*16000</Calculation>
        </TaxItem>
        <TaxItem>
                <Name>Ad Valorem Tax</Name>
                <Description>Flat 25 fee</Description>
                <Amount>$25.00</Amount>
                <Estimated>no</Estimated>
                <Calculation>25</Calculation>
        </TaxItem>
</FeesTaxes>
<RequestId>0</RequestId>
    </Result>
</AutoTitling>
```

FIG. 41 D

```
<?xml version="1.0" encoding="UTF-8" ?>
<AutoTitling RequestNo="1">
        <Login>
                <UserName>dealername</UserName>
                <Password>letmein</Password>
        </Login>
        <Custom>
                <Custom1 />
                <Custom2 />
                <Custom3 />
                <Custom4 />
                <Custom5 />
        </Custom>
        <Options AcceptComplex="yes" />
        <Registration>
                <Location>
                        <State>AL</State>
                        <County>Barbour</County>
                        <City>Clio</City>
                </Location>
                <FeesPaid>
                        <Warranty>2500.00</FeesPaid>
                        <Document>125.00</Document>
                </FeesPaid>
                <Vehicle Type="pv" Lien="yes" Transaction="purchase" TransferingPlates="no" TradeIn="no" Used="no">
                        <Plate Type="regular">
                                <Number>123</Number>
                                <Expiration>01/01/2003</Expiration>
                        </Plate>
                        <VIN>234</VIN>
                        <Make>FORD</Make>
                        <Model>khkj</Model>
                        <Weight>1200</Weight>
                        <MSRP>213</MSRP>
                        <PurchasePrice>16130.00</PurchasePrice>
                        <HP>123</HP>
                        <Year>1931</Year>
                        <Color>red</Color>
                        <Cylinders>12</Cylinders>
                        <PurchaseDate>01/01/2003</PurchaseDate>
                        <Titled />
                        <TitledState>AK</TitledState>
                        <Odometer />
                </Vehicle>
                <TotalPrice>18799.00</TotalPrice>
                <PreviousOwners>
                        <FirstOwner>
                                <Company />
                                <FirstName>Helen</FirstName>
                                <MiddleName>Mary</MiddleName>
```

FIG. 42 A

```
            <LastName>Murphy</LastName>
            <Address>123 Anywhere</Address>
            <City>Somewhere</City>
            <State>AK</State>
            <Zip>12345</Zip>
        </FirstOwner>
        <SecondOwner>
            <FirstName>Jim</FirstName>
            <MiddleName>William</MiddleName>
            <LastName>Kelly</LastName>
        </SecondOwner>
    </PreviousOwners>
    <NewOwners>
        <FirstOwner>
            <Company />
            <FirstName>Helen</FirstName>
            <MiddleName>Mary</MiddleName>
            <LastName>Murphy</LastName>
            <Address>123 Anywhere</Address>
            <City>Somewhere</City>
            <State>AK</State>
            <Zip>12345</Zip>
            <DOB>01/01/1900</DOB>
            <SSN>123456789</SSN>
            <DriverLicenseNbr>C1234567</DriverLicenseNbr>
            <DriverState>CA</DriverState>
            <Relationship>family</Relationship>
        </FirstOwner>
        <SecondOwner>
            <FirstName>Jim</FirstName>
            <MiddleName>William</MiddleName>
            <LastName>Kelly</LastName>
            <SSN>987654321</SSN>
            <AndOr>and</AndOr>
        </SecondOwner>
    </NewOwners>
    <Insurance>
        <CompanyName>Insurance Company</CompanyName>
        <EffectiveDate>01/01/1900</EffectiveDate>
        <ExpirationDate>01/01/2010</ExpirationDate>
        <PolicyNumber>123456789</PolicyNumber>
    </Insurance>
    <Seller>
        <FirstName>John</FirstName>
        <LastName>Smith</LastName>
        <Address>123 Anywhere</Address>
        <City>Somewhere</City>
        <State>AK</State>
        <Zip>12345</Zip>
    </Seller>
    <LeasingCompany>
        <Name>asdf</Name>
        <Address>asdf</Address>
        <City>asdf</City>
        <State>CA</State>
        <Zip>12433</Zip>
        <Downpayment>2000</Downpayment>
        <MonthlyPayment>500</MonthlyPayment>
        <MonthsInTerm>36</MonthsInTerm>
    </LeasingCompany>
    <FinanceCompany>
        <Name />
        <Address />
        <City />
        <State />
```

FIG. 42 B

```
            <Zip />
            <StateTaxID />
            <LienDate />
            <LienMaturityDate />
            <LienAmount />
        </FinanceCompany>
</Registration>
<Result>
        <Error />
        <Paperwork DocumentCount="8">
                <Item ComplexFee="no" OriginalForm="no" Pages="1">
                        <FormNumber>Instr-01</FormNumber>
                        <Name>Mailing Instructions for the Plates and Registration</Name>
                        <FileSpec xmlns:dt="urn:schemas-microsoft-com:datatypes"
                        dt:dt="bin.base64">Document.PDF</FileSpec>
                        <Description>Customer needs to go to DMV for VIN Inspection...Clerk will hand plates
                        and registration to customer</Description>
                </Item>
                <Item ComplexFee="no" OriginalForm="no" Pages="2">
                        <FormNumber />
                        <Name>Original Notarized Power of Attorney</Name>
                        <FileSpec xmlns:dt="urn:schemas-microsoft-com:datatypes"
                        dt:dt="bin.base64">Document.PDF</FileSpec>
                        <Description>POA is needed for a third party to sign the titling documents on behalf of
                        the applicant</Description>
                </Item>
                <Item ComplexFee="no" OriginalForm="no" Pages="1">
                        <FormNumber>Addr-01</FormNumber>
                        <Name>Lienholders Name and Complete Address</Name>
                        <FileSpec xmlns:dt="urn:schemas-microsoft-com:datatypes"
                        dt:dt="bin.base64">Document.PDF</FileSpec>
                        <Description />
                </Item>
                <Item ComplexFee="no" OriginalForm="no" Pages="1">
                        <FormNumber>BOS-145</FormNumber>
                        <Name>Bill of Sale</Name>
                        <FileSpec xmlns:dt="urn:schemas-microsoft-com:datatypes"
                        dt:dt="bin.base64">Document.PDF</FileSpec>
                        <Description />
                </Item>
                <Item ComplexFee="no" OriginalForm="no" Pages="2">
                        <FormNumber>REGIS</FormNumber>
                        <Name>Copy of Current Registration</Name>
                        <FileSpec xmlns:dt="urn:schemas-microsoft-com:datatypes"
                        dt:dt="bin.base64">Document.PDF</FileSpec>
                        <Description>Needed / only if transferring a plate from the old vehicle to a new vehicle
                        For the plate number that is being transferred</Description>
                </Item>
                <Item ComplexFee="no" OriginalForm="no" Pages="2">
                        <FormNumber>Fee-101</FormNumber>
                        <Name>Advaloreum Tax</Name>
                        <FileSpec xmlns:dt="urn:schemas-microsoft-com:datatypes"
                        dt:dt="bin.base64">Document.PDF</FileSpec>
                        <Description>Will be due upon registration. Average Cost is between $200.00-
                        $800.00</Description>
                </Item>
                <Item ComplexFee="no" OriginalForm="yes" Pages="1">
                        <FormNumber>Vin-010199</FormNumber>
                        <Name>Vin Verification</Name>
                        <FileSpec xmlns:dt="urn:schemas-microsoft-com:datatypes"
                        dt:dt="bin.base64">Document.PDF</FileSpec>
                        <Description>Must be completed at the DMV office</Description>
                </Item>
                <Item ComplexFee="yes" OriginalForm="no" Pages="1">
                        <FormNumber>DMV-138</FormNumber>
```

FIG. 42 C

<Name>AL Title Application</Name>
<FileSpec xmlns:dt="urn:schemas-microsoft-com:datatypes"
dt:dt="bin.base64">Document.PDF</FileSpec>
<Description>Form MVT 5-1C Must be completed at the DMV on their original
form</Description>
</Item>
</Paperwork>
<FeesTaxes DocumentCount="2">
<FeeItem>
<Name>DMV Transfer Fee</Name>
<Description />
<Amount>$55.00</Amount>
<Estimated>yes</Estimated>
<Calculation>123.00*.4472</Calculation>
</FeeItem>
<TaxItem>
<Name>County Option Tax</Name>
<Description>Flat fee due in lieu of County Option Tax. $100.00 Maximum. Based on age
of bike and cc's. NOT due in ALL counties. Fax your quote verify screen printout to
NADA GUIDES for exact quote.</Description>
<Amount>$100.00</Amount>
<Estimated>no</Estimated>
</TaxItem>
</FeesTaxes>
<RequestId>237</RequestId>
</Result>
</AutoTitling>

FIG. 42 D

COMPUTER IMPLEMENTED SYSTEM FOR POPULATION OF FORMS WITH INFORMATION

This United States Patent Application claims the benefit of U.S. Provisional Patent Application No. 60/678,395, filed May 5, 2005, hereby incorporated by reference herein.

I. BACKGROUND

An automotive titling system in which motor vehicle titling data elements entered in a motor vehicle titling inquiry author generates a motor vehicle titling inquiry which applied to a motor vehicle titling database generates motor vehicle titling data instructions relevant to a motor vehicle titling event.

Typically, ownership of a motor vehicle in the United States (and other countries or regions as well) is documented by registering the title to the motor vehicle with the government of the state, county, city, or other motor vehicle jurisdiction in which the motor vehicle is owned. The conventional approach to registering the title of a motor vehicle with a motor vehicle jurisdiction typically involves manually populating the fields if one or more motor vehicle registration documents, producing other required registration documents, and calculating fees in the format or amount required by the motor vehicle jurisdiction in which the motor vehicle is owned or operated (the "motor vehicle title registration application"). The burden of preparing and filing the motor vehicle title registration application in a particular motor vehicle jurisdiction typically falls to the motor vehicle sales entity (such as a motor vehicle dealer) or the financial entity (such as a bank or other lender) that initiates the motor vehicle loan or initiates the motor vehicle lease for the buyer of the vehicle.

Even though every state of the United States (along with most other countries) requires motor vehicle title registration of each motor vehicle and even though motor vehicle sales entities and financial entities which initiate motor vehicle sales, loans or leases have prepared the motor vehicle title registration applications for many years, there yet remains a variety of long felt but unresolved problems with respect to titling a motor vehicle.

A first problem with respect to motor vehicle title registration can be that titling laws, regulations, rules, tax rates, form documents, filing locations, or other requirements ("motor vehicle registration requirements") vary from motor vehicle titling jurisdiction to motor vehicle titling jurisdiction; however, the services provided by motor vehicle sales entities, financial entities, or other motor vehicle titling entities ("titling entity") have not remained local, but rather, have become regional or national. This requires each motor vehicle sales, financing, and titling entity to create, develop and maintain a hardcopy or electronic database of the titling requirements of numerous motor vehicle jurisdictions. The development and maintenance of this additional database creates an additional burden for the titling entity which can translate into increased costs paid by the motor vehicle buyer.

This problem may be exacerbated because the motor vehicle registration requirements encompassed by the plurality of motor vehicle jurisdictions relevant to a titling entity are frequently altered due to legislation, agency action, operation of contracts, or the like. These alterations to the motor vehicle registration requirements can require a corresponding alteration in the practice of a titling entity to achieve the filing of a proper motor vehicle title registration application.

Another problem related to the provision of regional or nationwide services by a titling entity can be the increased difficulty in assessing motor vehicle title registration requirements when the motor vehicle owner, the motor vehicle sales transaction, the motor vehicle financing transaction, or the motor vehicle title entity are located, reside or occur in different motor vehicle jurisdictions each applying a unique set of automotive titling instructions.

Another problem for a motor vehicle titling entity can be the burden of manually populating the fields (whether by hand writing or by key stroke) of certain documents encompassed by the motor vehicle title registration application. Due to the variables or factors unique to a particular motor vehicle buyer's record which must be assessed to select the various elements which make up the motor vehicle registration application along with making any corresponding manual data entries into the motor vehicle title registration application and to the buyer's file, along with any other action required to complete the motor vehicle title registration application (the "motor vehicle titling event"), each motor vehicle title registration application can take a clerk between about sixty to ninety minutes to complete.

Other problems with conventional automotive titling devices and methods may be disclosed throughout other areas of the specification, drawings, photographs, and claims.

II. SUMMARY OF THE INVENTION

Accordingly, a broad object of the invention can be to provide an electronic automotive titling system which provides a titling entity motor vehicle titling instructions for a particular motor vehicle titling event including a plurality of motor vehicle titling data entities which as to certain embodiments of the invention can be automatically populated with motor vehicle titling data elements.

Another broad object of the invention can be to provide a motor vehicle titling database which contains a plurality of motor vehicle titling data entities which can be mapped against a plurality of inquiry fields and motor vehicle titling data elements (which can be applied individually or in various permutations and combinations) in a motor vehicle titling inquiry to generate the motor vehicle titling instructions for each motor vehicle titling event regardless of the actual location of: the titling entity, motor vehicle jurisdiction which controls the performance of the motor vehicle buyer, the motor vehicle sales entity, the motor vehicle insurance entity, the motor vehicle financing entity, the motor vehicle, or the like. Another broad object of the invention can be to provide an application program which allows motor vehicle titling data elements to be extracted from a second computer motor vehicle titling database of a titling entity and mapped against a plurality of inquiry fields of a motor vehicle titling inquiry author to generate the motor vehicle titling inquiry which can be used to retrieve a part of the plurality of motor vehicle titling data entities in a motor vehicle titling database relating to a motor vehicle titling event.

Another broad object of the invention can be to provide an application program which generates a motor vehicle titling inquiry which can be applied to a motor vehicle titling database containing a plurality of motor vehicle titling data entities to generate motor vehicle titling instructions relating to a particular motor vehicle titling event, including, but not limited to, motor vehicle title registration instructions and motor vehicle title registration application documents which can have the data entity fields properly populated.

Another broad object of the invention can be to provide a motor vehicle titling service which provides to a user access to the program application which provides a motor vehicle titling inquiry author in which a plurality of motor vehicle titling data elements relating to a particular motor vehicle titling event can be established in a plurality of inquiry fields to generate a motor vehicle titling inquiry which can be applied to the motor vehicle titling database of the motor vehicle titling service to generate a motor vehicle titling instruction.

Naturally, further objects of the invention are disclosed throughout other areas of the specification, drawings, photographs, and claims.

III. A BRIEF DESCRIPTION OF THE DRAWINGS

FIG. 1 provides a block diagram of a particular embodiment of the invention.

FIG. 2 provides a block diagram of hardware means, software means, and network means which may be utilized to practice various embodiments of the invention.

FIGS. 40A and 40B is non-limiting example of a motor vehicle titling inquiry is provided in an XML schema.

Figure 1:
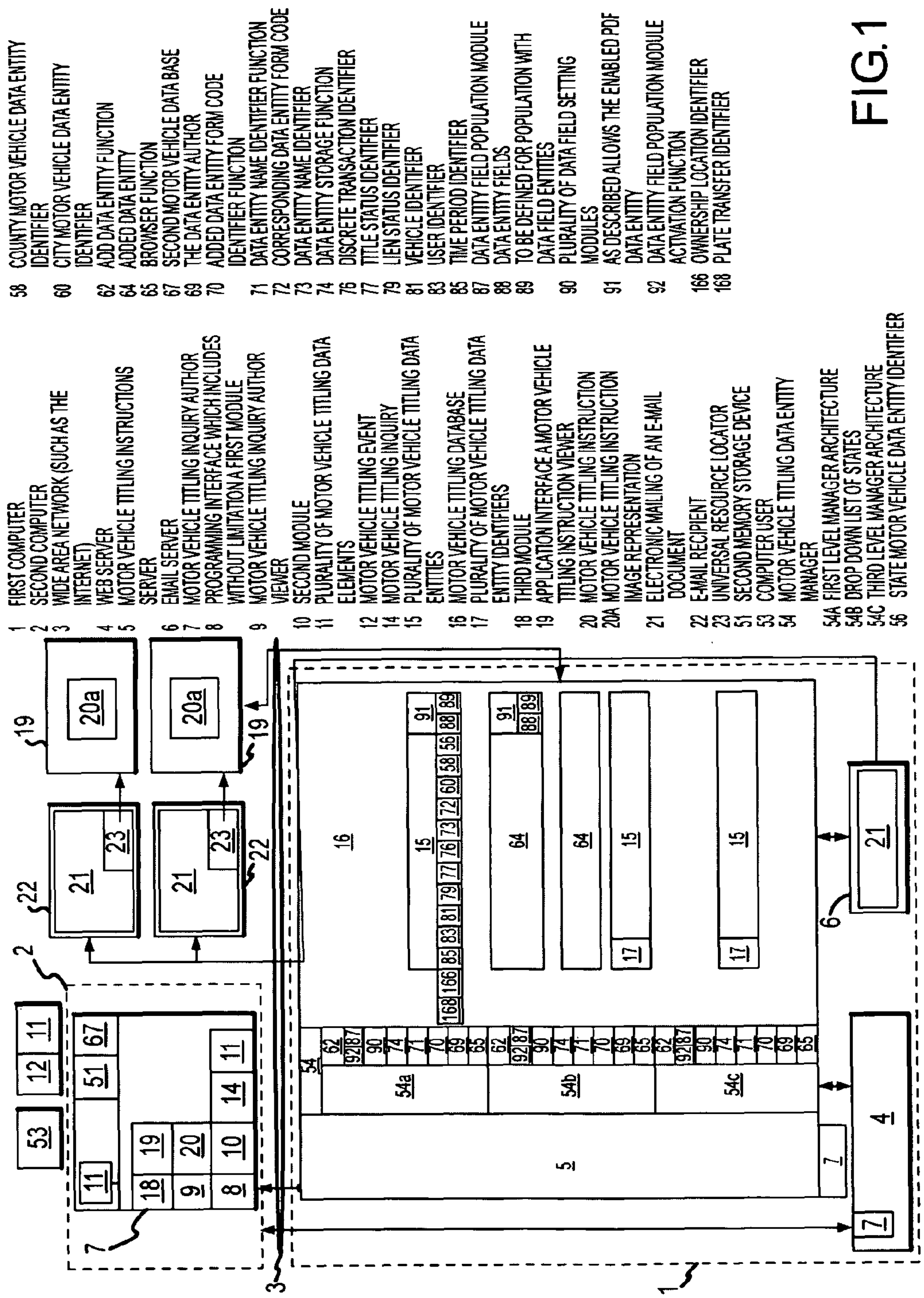

FIGS. 41A to 41D provide a non-limiting example of a "return inquiry" step on a titling instruction inquiry in an XML schema.

FIGS. 42A to 42D provide a non-limiting example of a motor vehicle titling instruction in an XML schema.

IV. DETAILED DESCRIPTION OF THE PREFERRED EMBODIMENTS

An automotive titling system in which motor vehicle titling data elements entered in a motor vehicle titling inquiry author generates a motor vehicle titling inquiry which applied to a motor vehicle titling database generates motor vehicle titling data instructions relevant to a motor vehicle titling event.

Now referring primarily to FIGS. 1 and 3-5, which provide a broad overview of certain elements and functions which underlie embodiments of the invention, a first computer (1) allows access by a second computer (2) over a wide area network (such as the Internet) (3) to a web server (4), a motor vehicle titling instructions server (5) and an email server (6). The web server (4) of the first computer (1) can download to the second computer (2) a motor vehicle titling inquiry author (7). The motor vehicle titling inquiry author (7) provides a programming interface which includes without limitation a first module (8) which functions to generate a motor vehicle titling inquiry author viewer (9) and a second module (10) which functions to generate a motor vehicle titling inquiry (14).

The motor vehicle titling inquiry author viewer (9) functions to display an motor vehicle inquiry author image representation (9a) (see FIGS. 2-5 which show but one non-limiting example) which includes a plurality of inquiry fields (13) (a representative number of the fields labeled) each having a inquiry field identifier (13d). The first module (8) of the motor vehicle titling inquiry author (7) further functions to allow a corresponding one of a plurality of motor vehicle titling data elements (11) (such as name, address, vehicle type, vehicle weight, lienholder, or other motor vehicle titling data elements as shown in the Figures, or required as part of a motor vehicle titling inquiry (14)) pertaining to a motor vehicle titling event (12) to be established in a corresponding one of the a plurality of inquiry fields (13). Each one of the plurality of motor vehicle data elements (11) can be established in the corresponding one of the plurality of inquiry fields (13) manually by keystroke, click event from drop down lists (13a), click event of bullets (13b), or the like, or automatically populated from a second motor vehicle database (67). The second module (10) of the motor vehicle titling inquiry author (7) generates a motor vehicle titling inquiry (14) based upon the inquiry field identifiers (13d) and the plurality of motor vehicle titling data elements (11) established in each of the plurality of inquiry fields (13).

Figure 39:
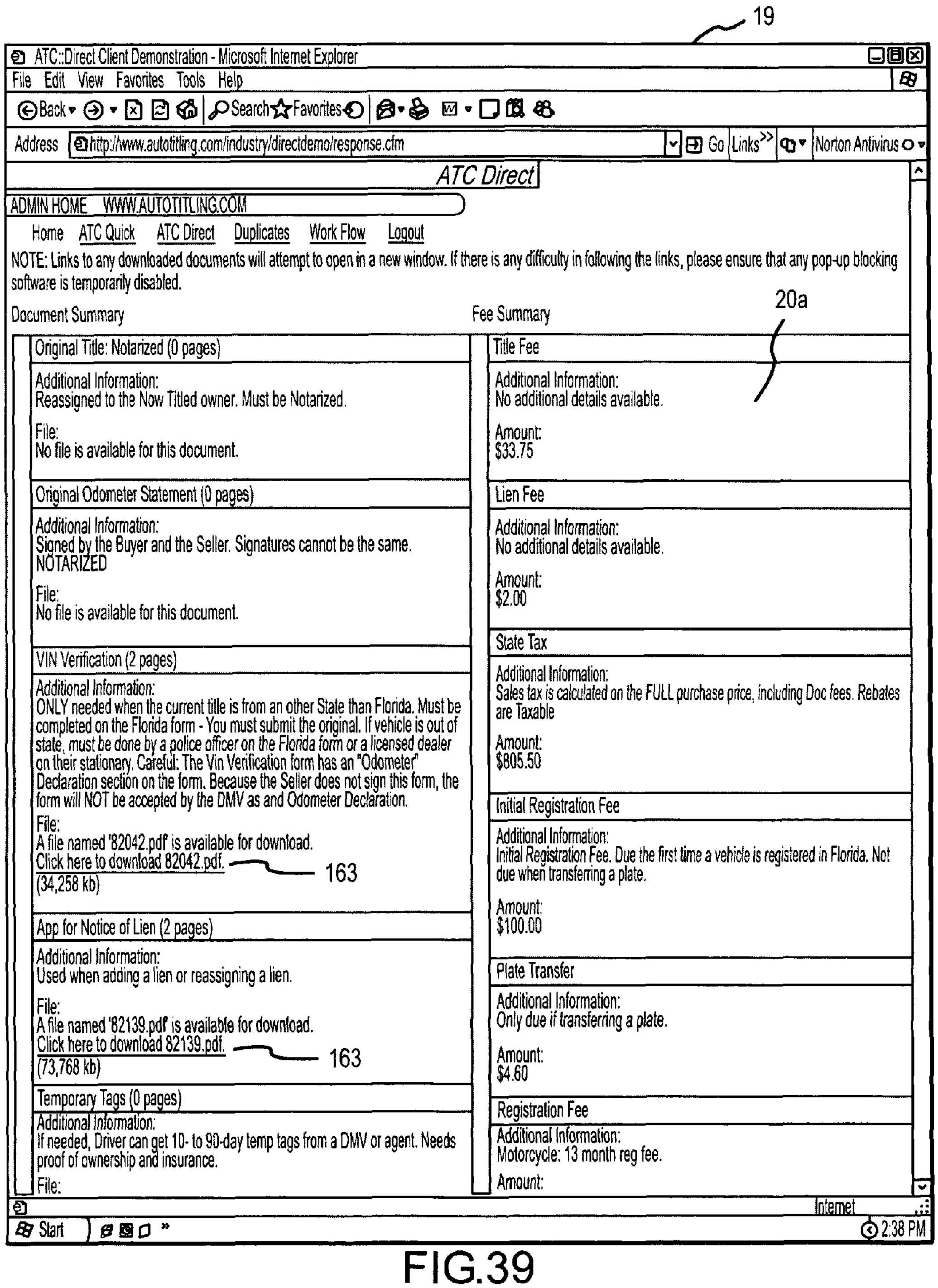
FIG. 39 is a screen image representation of a motor vehicle titling instruction generated by a motor vehicle titling instruction viewer.

The first computer (1) can receive the titling instruction inquiry (14) and utilize the motor vehicle titling instructions server (5) to perform a sort of a plurality of motor vehicle titling data entities (15) stored in a motor vehicle titling database (16) based on the motor vehicle titling inquiry (14) which utilizes the inquiry field identifiers (13d) along with motor vehicle titling data elements (11) to correspondingly match one or more of a plurality of motor vehicle titling data entity identifiers (17) further described below. The plurality of motor vehicle titling data entities (15) retrieved by sort of the motor vehicle titling database (16) based on the motor vehicle titling inquiry (14) can be utilized to generate a motor vehicle titling instruction (20) which can be received by the second computer (2). A third module (18) of the motor vehicle titling inquiry author (7) functions to provides as an application interface a motor vehicle titling instruction viewer (19) which displays a motor vehicle titling instruction image representation (20a) such that the user (53) can view the a plurality of motor vehicle titling data entities (15) retrieved by application of the motor vehicle titling inquiry (14) to the motor vehicle titling database (16). A particular example of the motor vehicle titling instruction image representation (20a) is shown in FIG. 39.

Certain embodiments of the invention can further provide the email server (6) which allows electronic mailing of an e-mail document (21) containing a universal resource locator (URL) (23) which can be utilized by an e-mail recipient (22) (by click event) to access the titling instructions server (5), the web server (6), or both, to utilize the motor vehicle titling viewer (19) to display motor vehicle titling instruction image representation (20a) pertaining to a particular motor vehicle titling event (12).

A preferred embodiment of the invention provides a titling instruction inquiry author (7) which utilizes XML to generate packets for interoperability and connectivity between the first computer (1) and the second computer (2) (see Examples 1-3). As to each type of user (53) (dealer entity, financial entity, consumer entity, or the like), a different version of the titling instruction inquiry author (7) can be developed with an XML schema (or other standard markup language schema) based upon characteristics of the user operating system, the database currently available in the second computer (2), the types of motor vehicle titling events (12), or other factors related to the user (53), the second computer (2), or the motor vehicle titling event (12) to access the relevant portion of the motor vehicle titling database (16) or the second motor vehicle titling database (67). Importantly, each inquiry field identifier (13d) when supported by a properly configured title instruction inquiry author (7) as an XML schema, or other standard markup language, can be applied to motor vehicle database (78) to generate the motor vehicle titling instructions (17) which can include a part of the a plurality of motor vehicle titling data entities (15) without limitation motor vehicle title registration application forms which may be PDF data entities (91) having data entity fields (88) which can be populated with data field entities (89) or motor vehicle data elements (11) consistent with every department of motor vehicles in every state of the United States.

Figure 2:
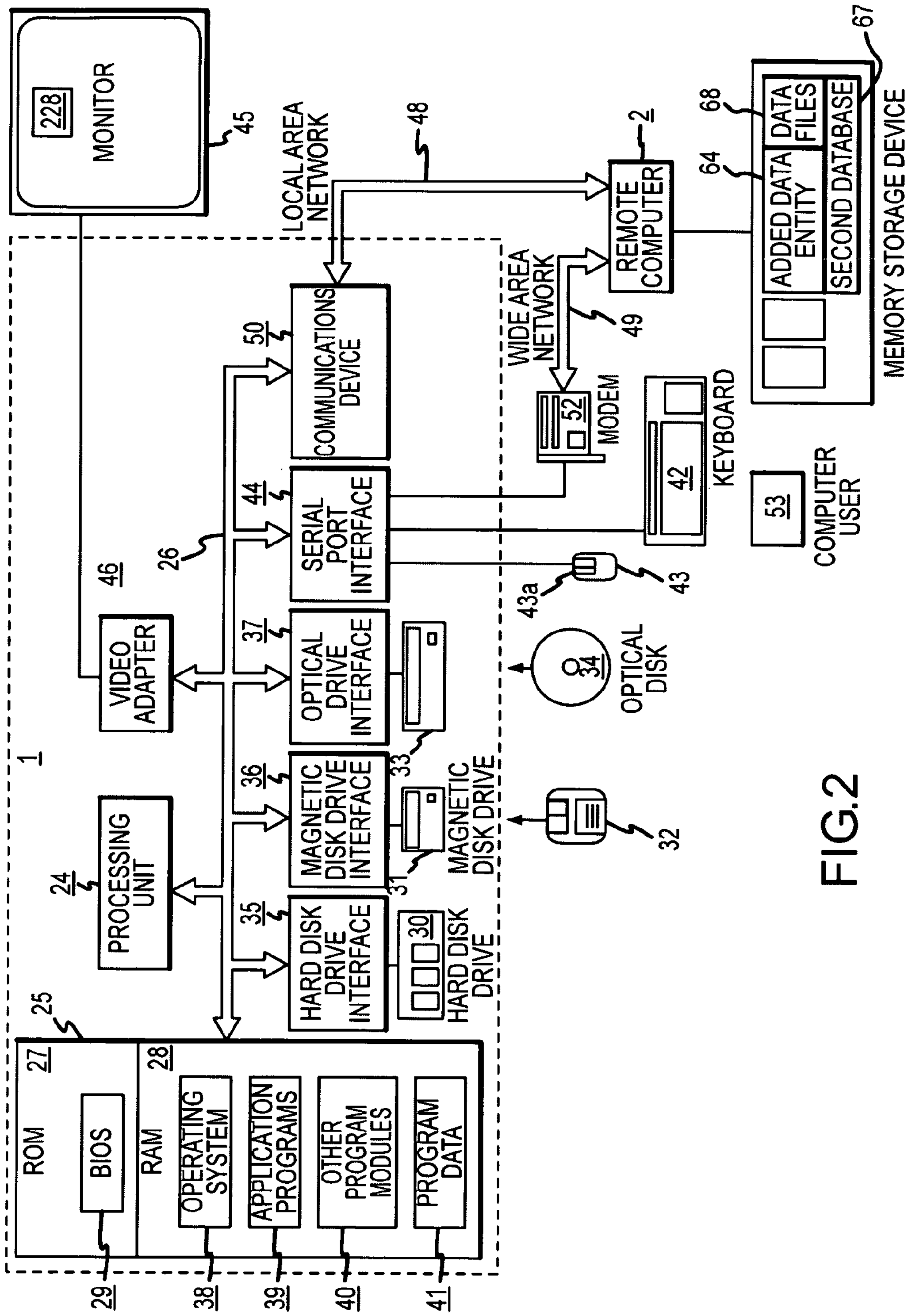
Figure 3:
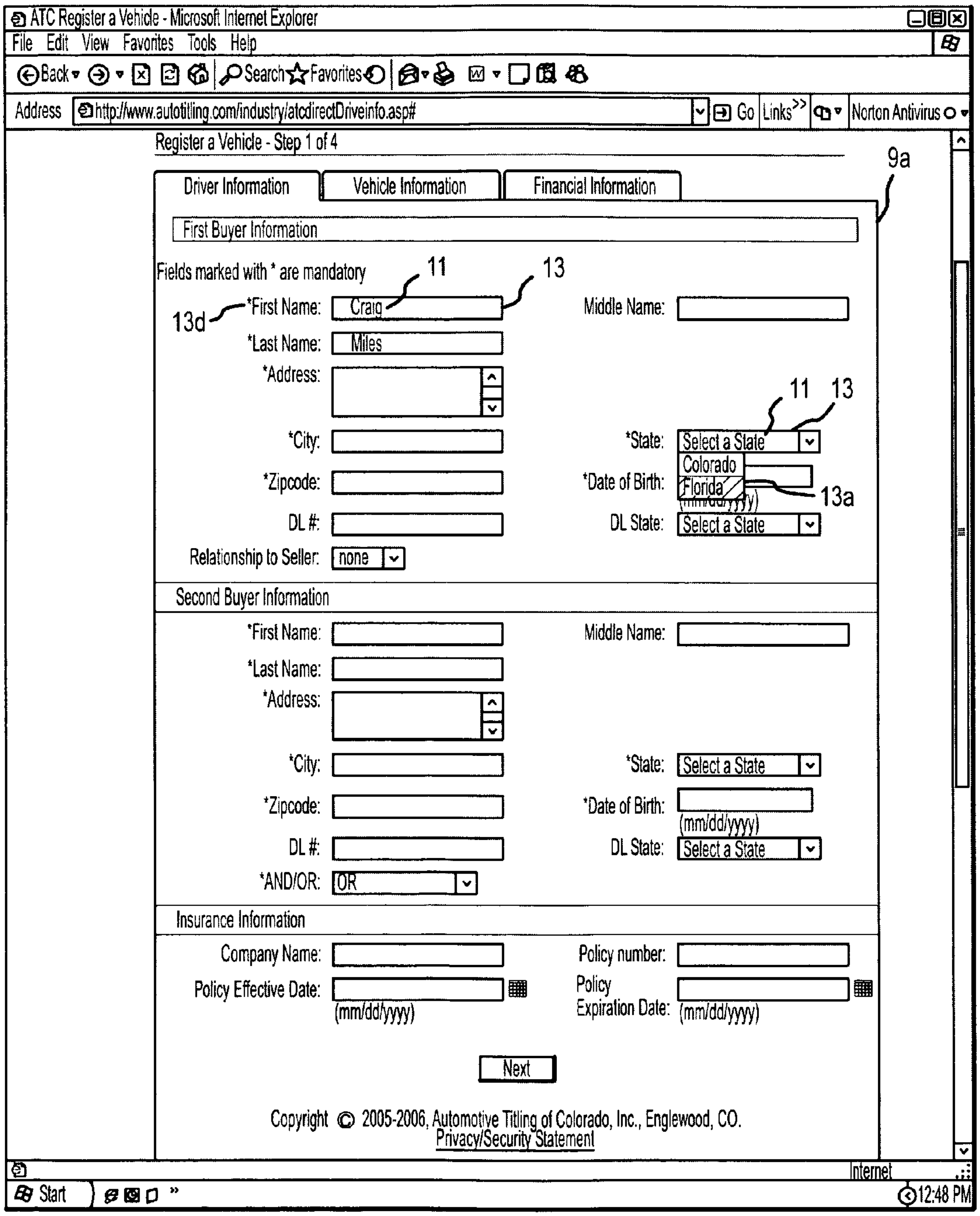
FIG. 3 is a screen image representation of first part of a particular embodiment of an application interface of a motor vehicle titling inquiry author.
Figure 4:
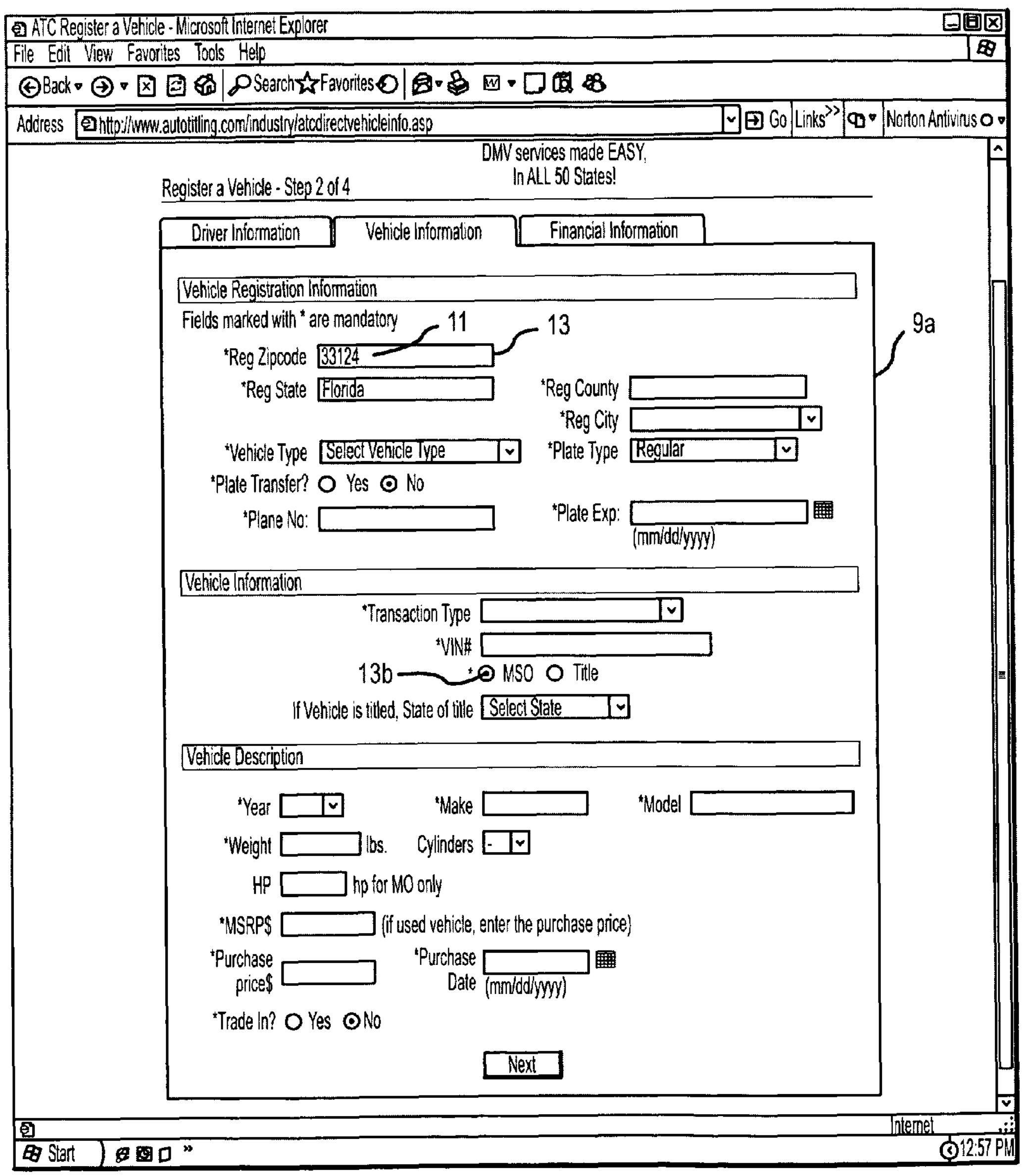
FIG. 4 is a screen image representation of a second part of a particular embodiment of an application interface of the motor vehicle titling inquiry author.
Figure 5:
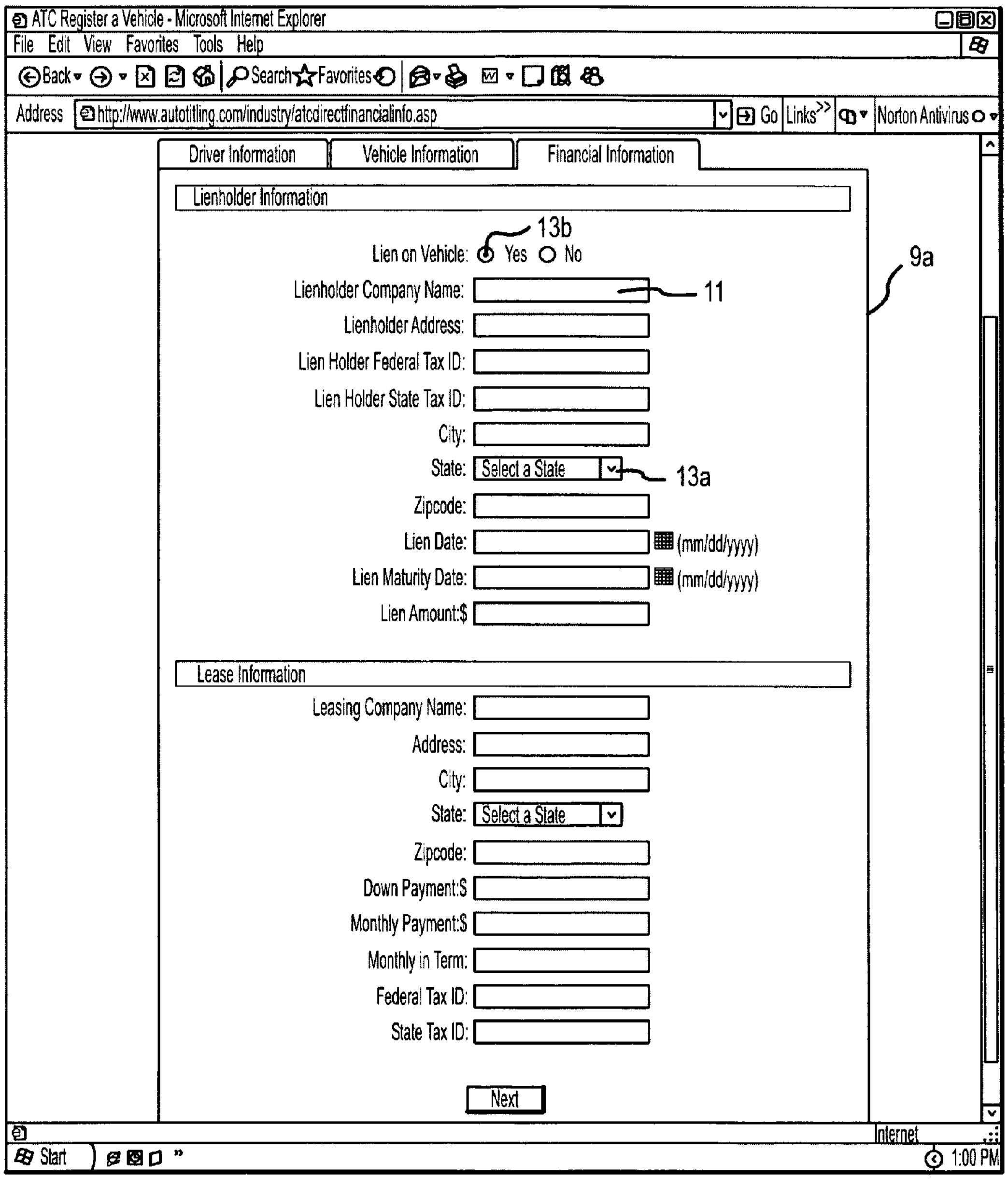
FIG. 5 is a screen image representation of a third part of a particular embodiment of an application interface of the motor vehicle titling inquiry author.

Now referring primarily to FIG. 2, a broad overview of certain computer means and certain network means which can be utilized to practice various embodiments of the invention is provided. While the computer means and the network means shown in FIG. 2 can be utilized to practice preferred embodiments of the invention including the best mode, it is not intended that the description of the best mode of the invention or any preferred embodiment of the invention be limiting with respect to the utilization of a wide variety of similar, different, or equivalent computer means or network means to practice embodiments of the invention which include without limitation hand-held devices, such as personal digital assistants or camera/cell phone, multiprocessor systems, microprocessor-based or programmable consumer electronics, network PCs, minicomputers, mainframe computers, and the like.

Similarly, it is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements. Also while a preferred embodiment of the invention is described in the general context of computer-executable instructions such as program modules which utilize routines, programs, objects, components, data structures, or the like, to perform particular functions or tasks or implement particular abstract data types, or the like, being executed by the computer means and network means, it is not intended that any embodiments of the invention be limited to a particular set of computer-executable instructions or protocols.

Again referring to FIG. 2, the first computer (1) can provide a processing unit (24), a memory element (25), and a bus (26) which operably couples components of the first computer (1), including without limitation the memory element(s) (25) to the processing unit (24). The first computer (1) may be a conventional computer, a distributed computer, or any other type of computer; the invention is not so limited. The processing unit (24) can comprise one central-processing unit (CPU), or a plurality of processing units which operate in parallel to process digital information. The bus (26) may be any of several types of bus configurations including a memory bus or memory controller, a peripheral bus, and a local bus using any of a variety of bus architectures. The memory element (25) can without limitation be a read only memory (ROM) (27) or a random access memory (RAM) (28), or both. A basic input/output system (BIOS) (29), containing routines that assist transfer of data between the components of the first computer (1), such as during start-up, can be stored in ROM (27). The first computer (1) can further include a hard disk drive (30) for reading from and writing to a hard disk (not shown), a magnetic disk drive (31) for reading from or writing to a removable magnetic disk (32), and an optical disk drive (33) for reading from or writing to a removable optical disk (34) such as a CD ROM or other optical media.

The hard disk drive (30), magnetic disk drive (31), and optical disk drive (33) can be connected to the bus (26) by a hard disk drive interface (35), a magnetic disk drive interface (36), and an optical disk drive interface (37), respectively. The drives and their associated computer-readable media provide nonvolatile storage of computer-readable instructions, data structures, program modules and other data for the first computer (1). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments.

A number of program modules may be stored on the hard disk, magnetic disk (32), optical disk (34), ROM (27), or RAM (28), including an operating system (38), one or a plurality of application programs (39) without limitation the motor vehicle titling inquiry author (7) or other program interfaces, other program modules (40), and the program data (41) including but not limited to the motor vehicle titling database (16) which may be served by the titling instructions server (5). A user may enter commands and information into the first computer (1) through input devices such as a keyboard (42) or a pointing device such as a mouse (43). Other input devices (not shown) may include a microphone, joystick, game pad, satellite dish, scanner, or the like. These and other input devices are often connected to the processing unit (24) through a serial port interface (44) that can be coupled to the bus (26), but may be connected by other interfaces, such as a parallel port, game port, or a universal serial bus (USB). A monitor (45) or other type of display device can also be connected to the bus (26) via an interface, such as a video adapter (46), or the like. In addition to the monitor (45), the first computer (1) can further include other peripheral output devices (not shown), such as speakers and printers.

A "click event" occurs when the user operates a application function through the use of a command which for example can include pressing or releasing the left mouse button (43*a*) while a pointer is located over a control icon (47) (or other field which activates a function) displayed in the a motor vehicle titling inquiry author viewer image representation (9*a*) or the a motor vehicle titling viewer image representation (18*a*) (or display generated by another application or program) in the monitor (45). However, it is not intended that a "click event" be limited to the press and release of the left button (43*a*) on a mouse (43) while a pointer is located over a control icon (47), rather, a "click event" is intend to broadly encompass a command by the user through which a function of an application program (39) (or other program, application, module or the like) including without limitation the motor vehicle titling inquiry author (7) can be activated or performed, whether through selection of one or a plurality of control icon(s) (47) or by user voice command, keyboard (42) stroke, mouse button (43*a*), or otherwise. It is further intended that control icons (47) can be configured or displayed without limitation as a bullets, point, a circle, a triangle, a square (or other geometric configurations or combinations or permutations thereof), or as fields in which addresses such as a street address, zip code, county code, or natural area code, or inputting a latitude/longitude or projected coordinate X and Y, or other notation, script or character, motor vehicle titling data elements (11), or the like, can be entered manually or by operation of an application program (39) such as the motor vehicle titling inquiry author (7), or a portion or element thereof.

The first computer (1) may operate in a networked environment using logical connections (48) or (49), or both, to one or a plurality of second computers (2). These logical connections (48) or (49) are achieved by a communication device (50) coupled to or a part of the first computer (1); the invention is not limited to a particular type of communications device (50). The second computer (2) may be another computer, a server, a router, a network PC, a client, a peer device or other common network node, and can include a part or all of the elements above-described relative to the first computer (1), although only a memory storage device (51) has been illustrated in FIG. 2. The logical connections (48) (49) depicted in FIG. 2 can include a local-area network (LAN) or a wide-area network (WAN). Such networking environments are commonplace in offices, enterprise-wide computer networks, intranets and the Internet.

When used in a LAN-networking environment, the first computer (1) can be connected to the local network through a network interface or adapter, which is one type of communications device (50). When used in a WAN-networking environment, the first computer (1) typically includes a modem (52), a type of communications device, or any other type of communications device for establishing communications over the wide area network, such as the Internet (3) (shown in FIG. 1). The modem (52), which may be internal or external, is connected to the bus (26) via the serial port interface (44). In a networked environment, program modules depicted relative to the first computer (1), or portions thereof, may be as to certain embodiments of the invention be stored in the second computer memory element (51). It is appreciated that the network connections shown are exemplary and other means of and communications devices for establishing a communications link between the computers can be used.

Now referring again primarily to FIG. 1, the second computer (2) can encompass a single second computer or can encompass a plurality of second computers which can be operated by a computer user (53) which can be without limitation a person, a plurality of persons, a business entity, a titling entity as above-described, or otherwise, which desires access to motor vehicle titling instructions (20) generated by the motor vehicle titling instructions server (5).

As above-described, the laws, rules or regulations, tax rates, or other requirements of a motor vehicle title registration application vary between state, county, city, locality or other type of motor vehicle jurisdiction and by the particulars of the motor vehicle titling event (12). The plurality of motor vehicle titling data entities (15) that must be stored in the motor vehicle titling database (16) to allow generation of a complete motor vehicle titling instruction (20) in response to all the permutations and combinations of parameters conveyed by the motor vehicle titling inquiry (14) the plurality of motor vehicle titling data entities (15) can encompass a very large number of data entities. As such, it is essential to have an effective motor vehicle titling program architecture to manage the plurality of motor vehicle titling data entities (15) stored in the motor vehicle titling database (16) and retrieved by application of the a motor vehicle titling inquiry (14) to generate the motor vehicle titling instruction (20) for the particular motor vehicle titling event (12) in a particular motor vehicle jurisdiction.

Now referring again to FIGS. 1 and 6, the first computer (1) can further include motor vehicle titling data entity manager (54) which can operate to couple at least one motor vehicle data entity identifier (17) to each of the plurality of motor vehicle titling data entities (15). The motor vehicle titling data entity manager (54) can generate a motor vehicle titling data manager viewer (55) which provides a first level manager architecture (54*a*) which differentiates the plurality of motor vehicle titling data entities (15) between a plurality of geographic entities. The boundaries of each geographic entity defined by the utilization of a corresponding first set of motor vehicle registration application requirements. For example, in the United States, each state establishes the motor vehicle registration requirements utilized within geographic area encompassed by its border.

Figure 6:
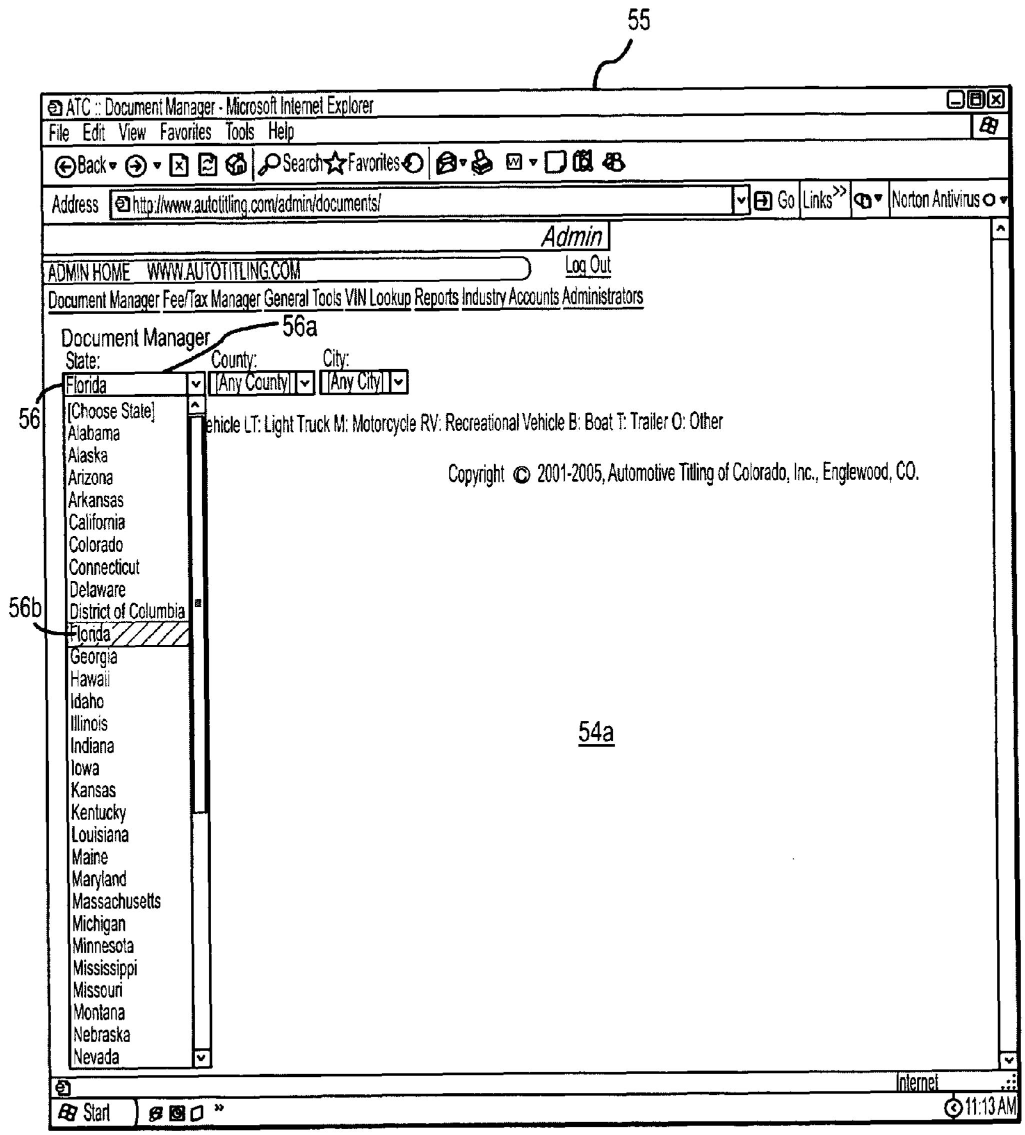
FIG. 6 is a screen image representation of a motor vehicle titling data entity viewer in a first level architecture.

Now referring primarily to FIGS. 1 and 6, which provides a non-limiting example of a first level manager architecture (54*a*) for the storage and sort of the plurality of motor vehicle data entities (15) based on a state motor vehicle data entity identifier (56). The state motor vehicle identifier (56) (as an example "Florida") can be entered into a corresponding state identifier field (56*a*) whether the click event is a drop down list of states (56*b*) as shown (or other list of motor vehicle jurisdictions), by manual entry, or otherwise. Entry of a state motor vehicle data entity identifier (56) in the state identifier field (56*a*) initiates sort of the plurality of motor vehicle titling data entities (15) in the motor vehicle titling database (16) based on the state motor vehicle data entity identifier (56) and generates a state data entity list (57) (shown in FIG. 7) which identifies the part of the plurality of motor vehicle titling data entities (15) coupled to that particular state motor vehicle data entity identifier (56).

Figure 7:
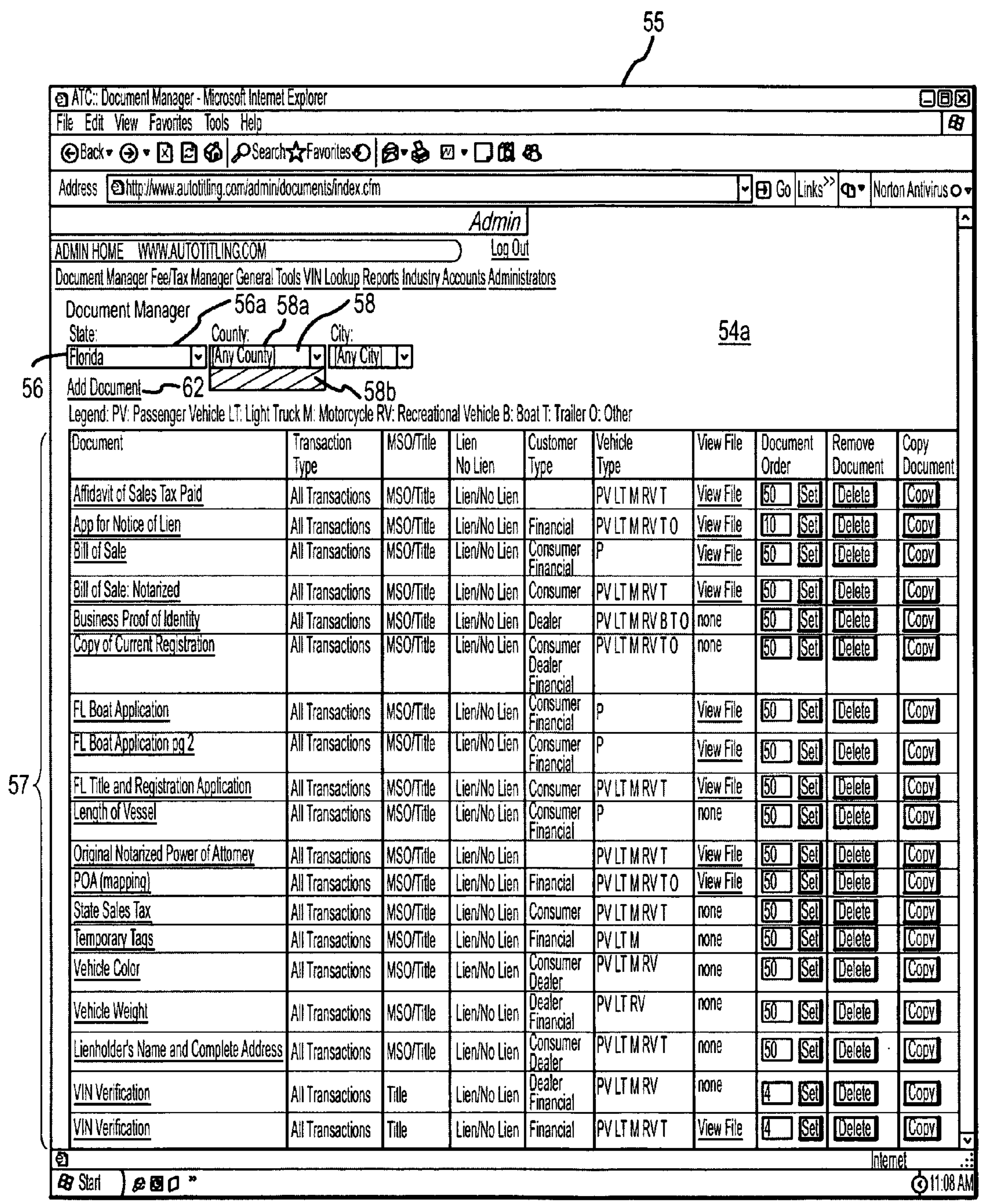
FIG. 7 is a screen image representation of a first level architecture data entity list.

As shown by FIG. 7, the specific state motor vehicle data entity identifier (56) "Florida" was selected which retrieved a state data entity list (57) including that part of the plurality of motor vehicle titling data entities (15) for the motor vehicle jurisdiction of the State of Florida. While this specific example is provided of a first level manager architecture (54*a*) it is not intended that the first level manager architecture (54*a*) be limited to the use of a state motor vehicle data entity identifier (56) and each of a plurality of geographic entities each correspondingly defined by utilization of the same motor vehicle registration application requirements can be matched to a geographic motor vehicle data entity identifier which can be coupled to the plurality of motor vehicle titling data entities (15) for that geographic entity to establish the first level manager architecture (54*a*).

Figure 8:
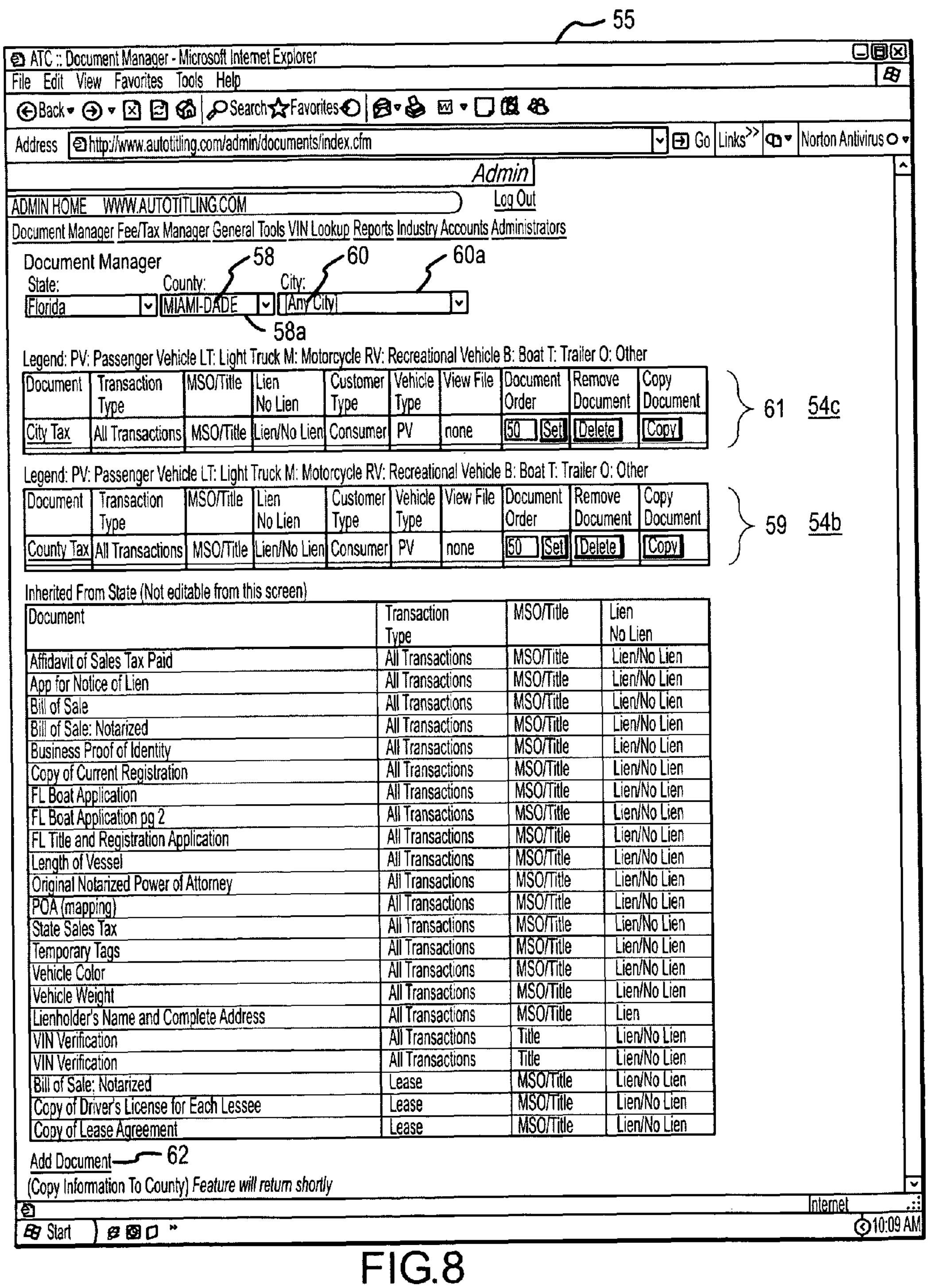
FIG. 8 is a screen image representation of a second level architecture data entity list and a third level architecture data entity list.

Now referring primarily to FIGS. 1, 7 and 8, a second level manager architecture (54*b*) provides for the storage and sort of the plurality of motor vehicle data entities (15) retrieved by the first level manager architecture (54*a*) and further based on differentiating between a plurality of second regions within the geographic entity, the boundaries each defined by the application of a second set of registration application requirements. In the non-limiting example shown, a county motor vehicle data entity identifier (58) can be entered into a corresponding county identifier field (58*a*) whether the click event provides a list of counties (58*b*) as shown by FIG. 7 (or other list of county motor vehicle identifiers), by manual entry, or otherwise. Entry of a county motor vehicle data entity identifier (58) in the county identifier field (58*a*) initiates sort of the plurality of motor vehicle titling data entities (15) in the motor vehicle titling database (16) based on the county motor vehicle data entity identifier (58) and generation of a county data entity list (59) of the plurality of motor vehicle titling data entities (15) coupled to that particular state motor vehicle data entity identifier (56) and the county motor vehicle data entity identifier (58). As shown by FIG. 8, the county motor vehicle data entity identifier (58) "Miami-Dade" was selected which retrieved from the plurality of motor vehicle titling data entities (15) that part of the plurality of motor vehicle data entities (15) utilized only by the County of Miami-Dade, Fla. and generated a separate county data entity list (59). In the example, only a single one of the plurality of motor vehicle data entities (15) was retrieved in the second level manager architecture (54*b*) relating to county tax.

Again referring primarily to FIGS. 1 and 8, a third level manager architecture (54*c*) provides for the storage and sort of the plurality of motor vehicle data entities (15) retrieved by the second level architecture (54*b*) and further based on differentiating a plurality of third regions within each second region the boundaries of each defined by the application of a third set of registration application requirements. The non-limiting example of a third level manager architecture (54*c*) provides a city or locality motor vehicle data entity identifier (60) which can be entered into a corresponding city or locality identifier field (60*a*) whether by click event within a list of cities (or other list of city or locality motor vehicle jurisdictions), by manual entry, or otherwise. Entry of a city motor vehicle data entity identifier (60) in the city identifier field (60*a*) initiates sort of the plurality of motor vehicle titling data entities (15) in the motor vehicle titling database (16) based on the city motor vehicle data entity identifier (60) and generation of city data entity list (61) of the plurality of motor vehicle titling data entities (15) coupled to the state motor vehicle data entity identifier (56), the county motor vehicle data entity identifier (58) and the particular city motor vehicle data entity identifier (60). For example, entry of the city motor vehicle data entity identifier (60) such as "Miami" can retrieve a city data entity list (61) including that part of the plurality of motor vehicle titling data entities (15) for the City of Miami, in Miami-Dade County, State of Florida.

Now referring primarily to FIGS. 1, 7-9, at each of the first level, second level, or third level manager architecture (54*a*) (54*b*) (54*c*) above described (non-limiting examples of State (54*a*), County (54*b*), City (54*c*) provided), the motor vehicle titling data entity manager (54) can further provide an add data entity function (62) which upon click event operates to open an add data entity viewer (63) (an embodiment shown in FIG. 9) which can operate within each of the first level, second level or third level manager architecture (54*a*) (54*b*) (54*c*) to correspondingly couple a state motor vehicle data entity identifier (56), a county motor vehicle data entity identifier (58), or city motor vehicle data entity identifier (60) (or other identifiers as above discussed) to an added data entity (64) and store the added data entity (64) with the plurality of motor vehicle titling data entities (15) in the motor vehicle titling database (16).

Figure 9:
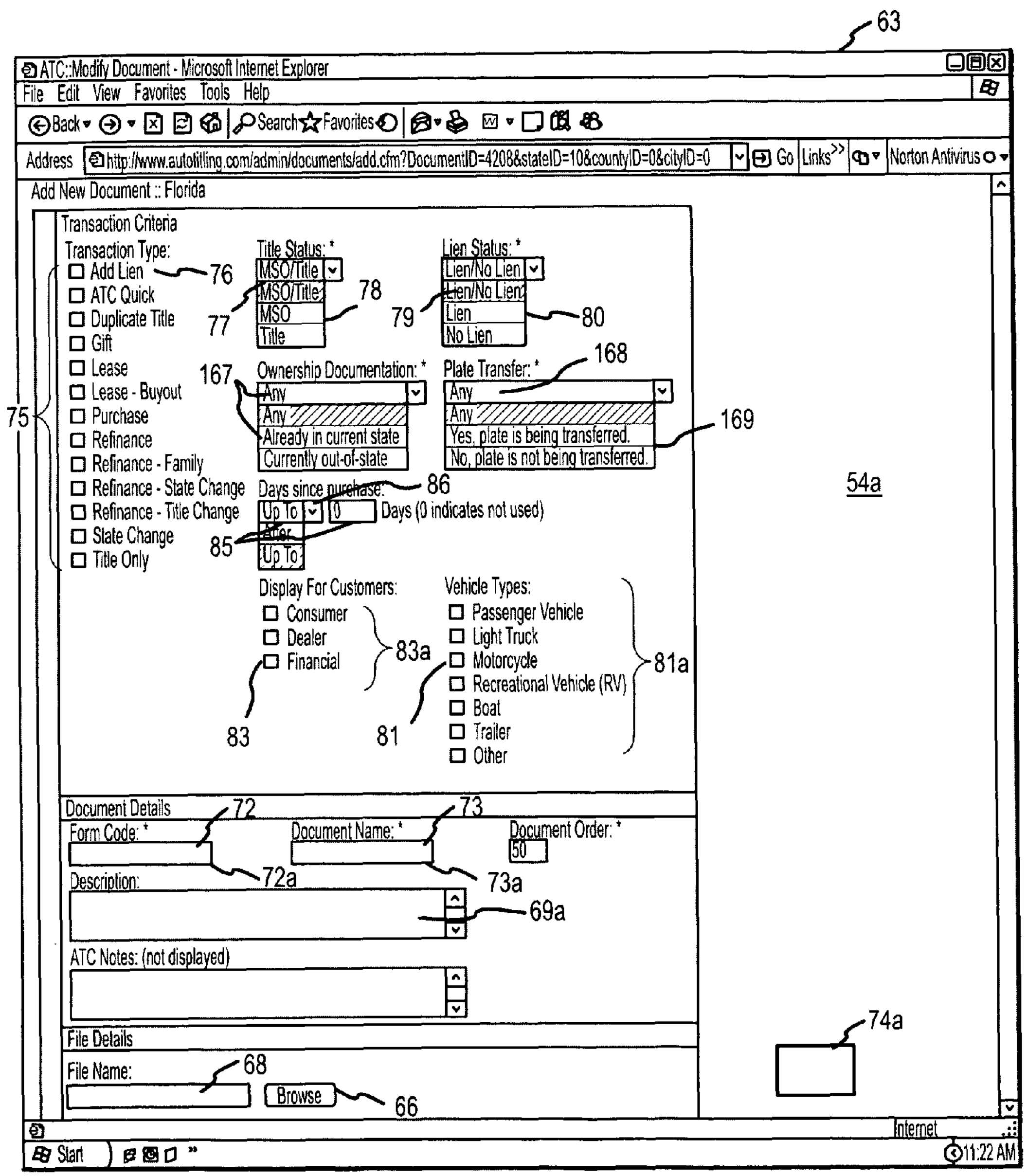
FIG. 9 is a screen image representation of an add data entity viewer.

Now referring primarily to FIGS. 1 and 9, the embodiment of the add data entity viewer (63) shown has been opened at the first level manager architecture (54*a*) by entering a state motor vehicle data entity identifier (56) into the state identifier field (56*a*) motor vehicle titling data entity viewer (55). By operating the add data entity function (62) by click event, the add data entity function (62) can further provide a browser function (65) which can be operated in the add data entity viewer (63) by click event for example on a browse icon (66) which allows the added data entity (64) to be selected from a second motor vehicle data base (67) (see FIG. 2), for example a state motor vehicle department database, and loaded into the add data entity viewer (63). The added data entity (64) can be any one of the numerous and varied types of data files (68) such as a word file, a word perfect file, a pdf file, or the like. Alternately, the added data entity (64) can comprise any type of content entered manually into a data entity author field (69*a*) generated by a data entity author (69) in the add data entity viewer (63). Whether the added data entity (64) is loaded into the add data entity viewer (63) as data file (68) or authored in the data entity author field (69*a*) provided by the data entity author (69), the added data entity function (62) further provides an added data entity form code identifier function (70) and a data entity name identifier function (71) which can be used independently or in combination to couple a corresponding data entity form code (72) or a data entity name identifier (73) entered into the corresponding data entity form code field (72*a*) or data entity name identifier field (73*a*) to the added data entity (64). The add data entity function (62) further provides a data entity storage function (74) which operates by click event of for example a data entity storage icon (74*a*) to store the added the data entity (64) coupled to the data entity name identifier (73) or the data entity form code identifier (74) (or both) to the plurality of motor vehicle titling data entities (15) in motor vehicle titling database (16). Operation of the data entity storage function (74) in the add data entity viewer (63) opened at the first level manager architecture (54*a*) as above-described further couples that particular state motor vehicle data entity identifier (56) to the added data entity (64). Subsequent entry of the state motor vehicle data entity identifier (56) into a corresponding state identifier field (56*a*) sorts the plurality motor vehicle titling data entities (15) and generates the state data entity list (57) which further includes the added data entity (64).

Similarly, if the add data entity function (62) is operated by click event in the second level manager architecture by entering the county motor vehicle data entity identifier (58) or in the third level manager architecture by entering the city motor vehicle data entity identifier (60), added data entities (64) can be stored with the plurality of motor vehicle titling data entities (15) in the motor vehicle titling database (16) and retrieved as part of the corresponding county data entity list (59) or city data entity list (61) by subsequently entering the county motor vehicle data entity identifier (58) or the city motor vehicle data entity identifier (60) (or both) into the corresponding county motor vehicle data entity identifier field (58*a*) or the city motor vehicle data entity identifier field (60*a*) of the motor vehicle titling data entity viewer (55).

Again referring primarily to FIG. 9, the add data entity function (62) can further operate within each of the first, second, or third level manager architecture (54*a*) (54*b*) (54*c*) to couple one or more of a plurality of transaction identifiers (75) to the added data entity (64) to further differentiate the added data entity (64) within the plurality of motor vehicle titling data entities (15) based on motor vehicle titling transaction condition or type. The add data entity viewer (63) can provide the list of the plurality of transaction identifiers (75) (such as "add lien", "duplicate title", "gift", "lease", "lease-buyout", "purchase", "refinance", "refinance-family", "refinance-state change", "refinance-title change", "state change", "title only", or "other transaction type") utilized in a geographic entity or region. Each discrete transaction identifier (76) (a representative number labeled) can be selected by click event to couple the discrete transaction identifier (76) ("add lien" for example) to the added data entity (64). The term "a plurality of transaction identifiers" means a set of discrete transaction identifiers (76) each of which identifies a discrete transaction condition or type which can occur in filing a motor vehicle title registration application in a geographic entity or region identified by use of the first, second, or third level manager architecture (54*a*) (54*b*) (54*c*) such discrete transaction condition requiring inclusion of the added data entity (64) or a part of the plurality of motor vehicle titling data entities (15) to which the discrete transaction identifier (76) is coupled to complete the motor vehicle title registration application.

Again referring primarily to FIG. 9, the add data entity function (62) can further operate within each of the first, second, or third level manager architecture (54*a*) (54*b*) (54*c*) to couple a title status identifier (77) to the added data entity to further differentiate the added data entity (64) in the plurality of motor vehicle data entities (15) based on a title condition such as a vehicle not prior titled, a vehicle prior titled, or both. The add data entity viewer (63) can provide a title status identifier list (78). By click event on the title status identifier (77) in the list the title status identifier can be coupled to the added data entity (64). As shown by the example of the add data entity viewer (63) in FIG. 9, a MSO title status identifier can differentiate one or more of the plurality motor vehicle titling data entities (15) utilized to register a motor vehicle not prior titled (typically requiring the motor vehicle dealer to provide as additional motor vehicle titling data entities (15): a manufacturer's statement of origin "MSO", a proof of sales tax paid, a proof of exemption, or notice that sales tax must be collected, for inclusion in the motor vehicle title registration application); a Title status identifier (which differentiates the motor vehicle data entities (15) utilized to register a vehicle prior titled), or an MSO/Title title status identifier (which differentiates the motor vehicle titling data entities (15) utilized for both vehicles not prior titled and prior titled vehicles) can be selected and coupled to a added data entity (64) or one of the plurality of motor vehicle data entities (15) by click event.

Again referring primarily to FIG. 9, the add data entity function (62) can further operate within each of the first, second, or third level manager architecture (54*a*) (54*b*) (54*c*) to couple a lien status identifier (79) to the added data entity (64) to further differentiate the added data entity (64) in the plurality of motor vehicle data entities (15). The add data entity viewer (63) can provide a lien status identifiers list (80) from which one lien status identifier can by click event be coupled to the added data entity (64). As shown by the example of the add data entity viewer (63) shown by FIG. 9, a Lien status identifier (which identifies the lien condition in which a loan has been made for the purchase of a motor vehicle); a No Lien status identifier (which identifies the lien condition in which no loan has been made for the purchase of the vehicle), or both an No Lien/Lien title status identifier can be selected and coupled to a added data entity (64) or one of the plurality of motor vehicle data entities (15) by click event.

Again referring to FIG. 9, the add data entity function (62) can further operate within each of the first, second, or third level manager architecture (54*a*) (54*b*) (54*c*) to couple a vehicle identifier (81) to the added data entity to further differentiate the added data entity (64) by the type of vehicle. The add data entity viewer (63) can provide a list of the vehicle identifiers (81*a*) one of which can be coupled to the added data entity (64) by click event on the vehicle identifier (81) in the list. As shown by the example of the add data entity viewer in FIG. 9, a vehicle identifier (81) which identifies the type of vehicle such as a passenger vehicle, a light truck, a motorcycle, a recreational vehicle, boat, trailer, or other can be selected and coupled to a added data entity (64) or one of the plurality of motor vehicle data entities (15) by click event.

Again referring to FIG. 9, the add data entity function (62) can further operate within each of the first, second, or third level manager architecture (54*a*) (54*b*) (54*c*) to couple a user identifier (83) to the added data entity (64) to further differentiate the added data entity (64) by user of the motor vehicle titling inquiry author (7). The add data entity viewer (63) can provide a user identifier list (83*a*) from which one user identifier (83) can be coupled to the added data entity (64) by click event on the user identifier (83). As shown by the example of the add data entity viewer shown by FIG. 9, a Consumer user identifier (which identifies a person in the general public), a Dealer user identifier (which identifies a motor vehicle dealer entities), a Financial user identifier (which identifies financing entities such as banks, lenders, or the like) can be selected and coupled to a added data entity (64) or one of the plurality of motor vehicle data entities (15) by click event. This allows the plurality of plurality of motor vehicle titling data entities (15) to be sorted based on specific requirements of the particular user (53) type.

Again referring to FIG. 9, the add data entity function (62) can further operate within each of the first, second, or third level manager architecture (54*a*) (54*b*) (54*c*) to couple a time period identifier (85) to the added data entity (64). The add data entity viewer (63) can provide a time period identifier list (86) from which one time period identifier (85) can be coupled to the added data entity (64) by click event on the time period identifier (85). As shown by the example of the add data entity viewer (63) in FIG. 9, an "up to" identifier which can be used to identify certain of the plurality motor vehicle titling data entities (15) which can be used until the specified time period elapses (such as the elapse of a certain number days after purchase of the vehicle) and an "after" identifier which identifies plurality motor vehicle titling data entities (15) which must be used after the elapse of a specified time period (such as after the elapse of a certain number days after purchase of the vehicle) can each be selected by click event to be coupled to a added data entity (64) or one of the plurality of motor vehicle data entities (15).

Again referring to FIG. 9, the add data entity function (62) can further operate within each of the first, second, or third level manager architecture (54*a*) (54*b*) (54*c*) to couple a ownership location identifier (166) to the added data entity (64). The add data entity viewer (63) can provide a state ownership identifier list (167) from which an ownership location identifier (166) can be coupled to the added data entity (64) by click event. As shown by the example of the add data entity viewer (63) in FIG. 9, an in-state ownership identifier differentiates certain of the plurality of motor vehicle titling data entities (15) based on the vehicle being titled within the motor vehicle jurisdiction of registration and an out-of-state ownership identifier differentiates certain of the plurality of motor vehicle titling data entities (15) based on the vehicle being titled outside of the motor vehicle jurisdiction of registration.

Again referring to FIG. 9, the add data entity function (62) can further operate within each of the first, second, or third level manager architecture (54*a*) (54*b*) (54*c*) to couple a plate transfer identifier (168) to the added data entity (64). The add data entity viewer (63) can provide a plate transfer identifier list (169) from which one plate transfer identifier (168) can be coupled to the added data entity (64) by click event. As shown by the example of the add data entity viewer (63) in FIG. 9, an plate transfer identifier allows differentiation of certain of the plurality of motor vehicle titling data entities (15) based on whether or not the license plate for the vehicle being registered is being transferred from another vehicle.

Understandably, certain added data entities (64) or certain of the plurality of motor vehicle titling data entities (15) could have a plurality of the identifiers above-described coupled while other added data entities (64) and certain of the plurality of motor vehicle titling data entities (15) may have only one or few of the identifiers coupled and will be retrieved of the motor titling instruction (20) only in the event the motor vehicle titling inquiry (14) includes a motor vehicle data element (11) matched to that particular transaction identifier (75) (or other identifier). By use of the architecture levels (54*a*) (54*b*) (54*c*) and by selectively coupling the various identifiers above-described to each added data entity (64) the resulting plurality of motor vehicle titling data entities (15) can be mapped against a limited plurality of inquiry fields (13) of the vehicle titling inquiry author (7) to produce the motor vehicle titling instruction (20) corresponding to a motor vehicle titling event.

Figure 10:
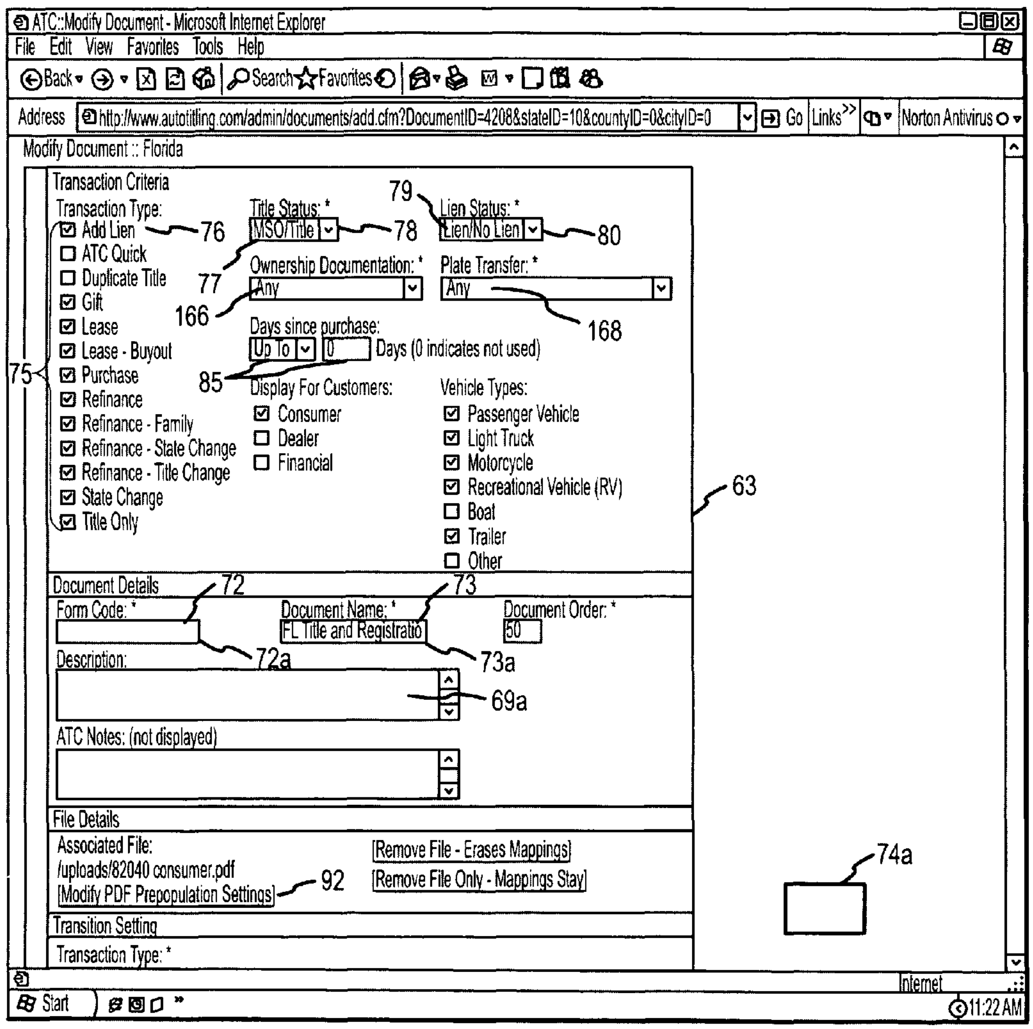
FIG. 10 is a screen image representation of an add data entity viewer including a data entity field population module activation element.
Figure 11:
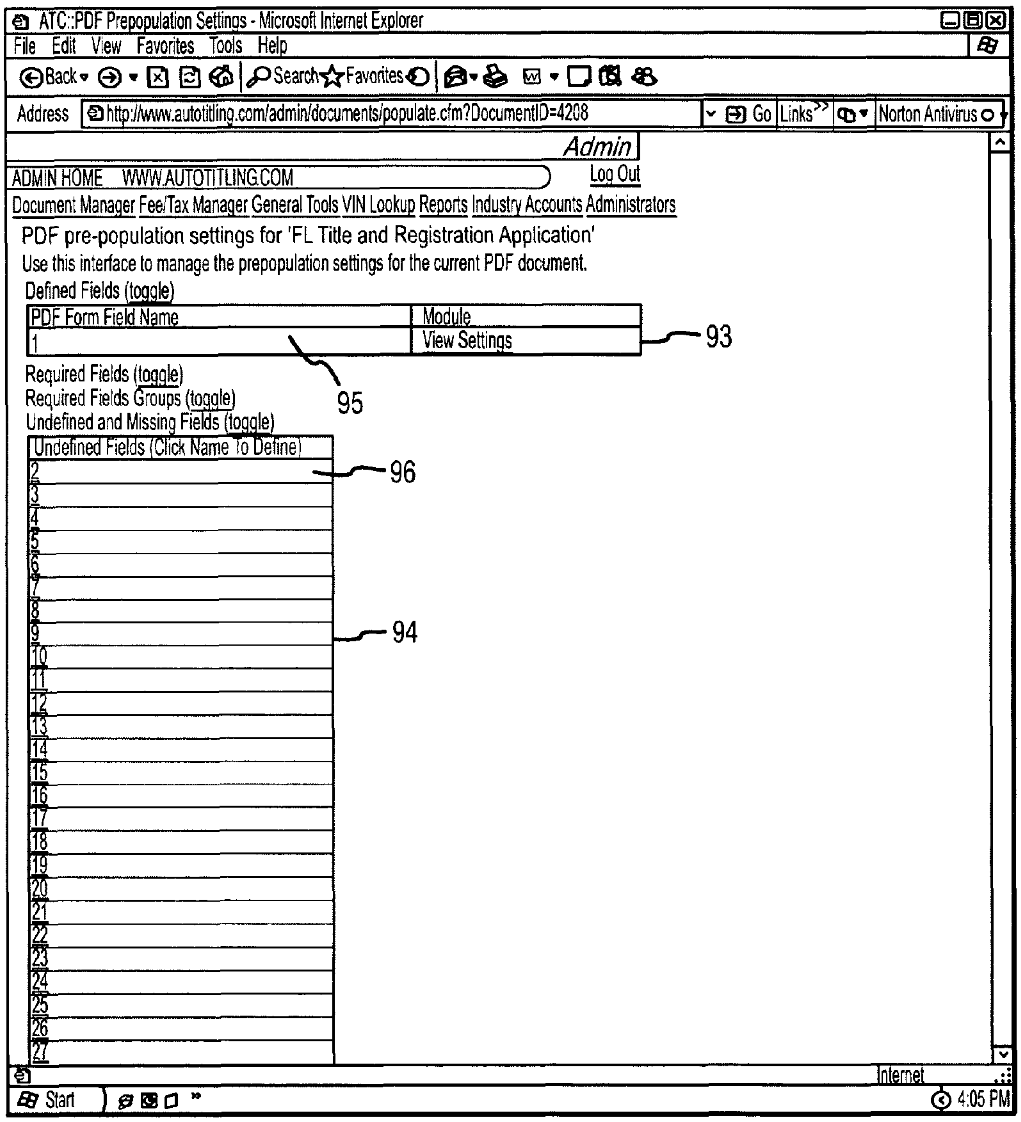
FIG. 11 is a screen image representation of a viewable list of undefined data entity fields generated by operation of the data entity field population module activation element.
Figure 12:
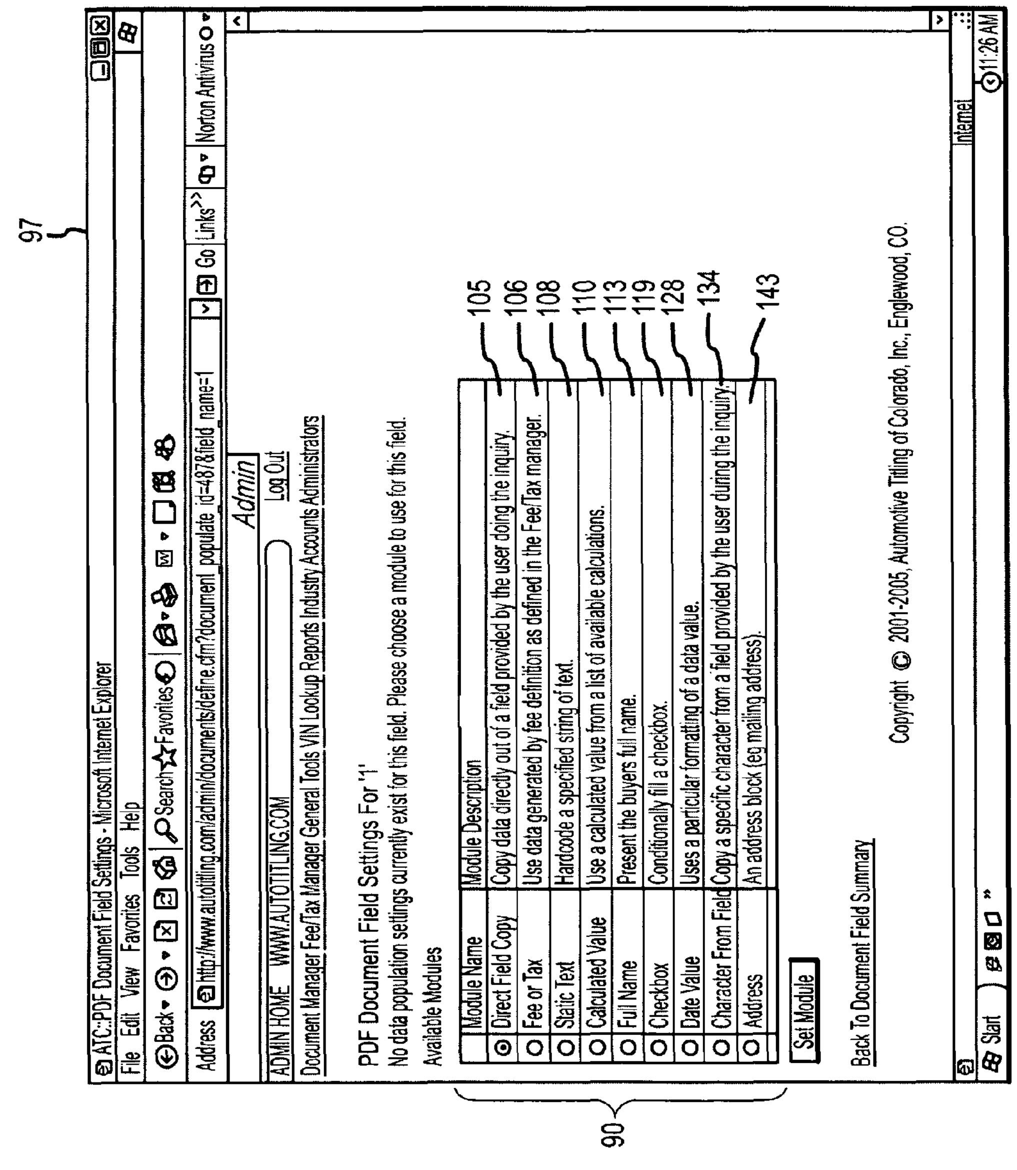
FIG. 12 is a screen image representation of a data field setting module viewer generated by selection of an undefined data entity field in an enabled PDF data entity.
Figure 38:
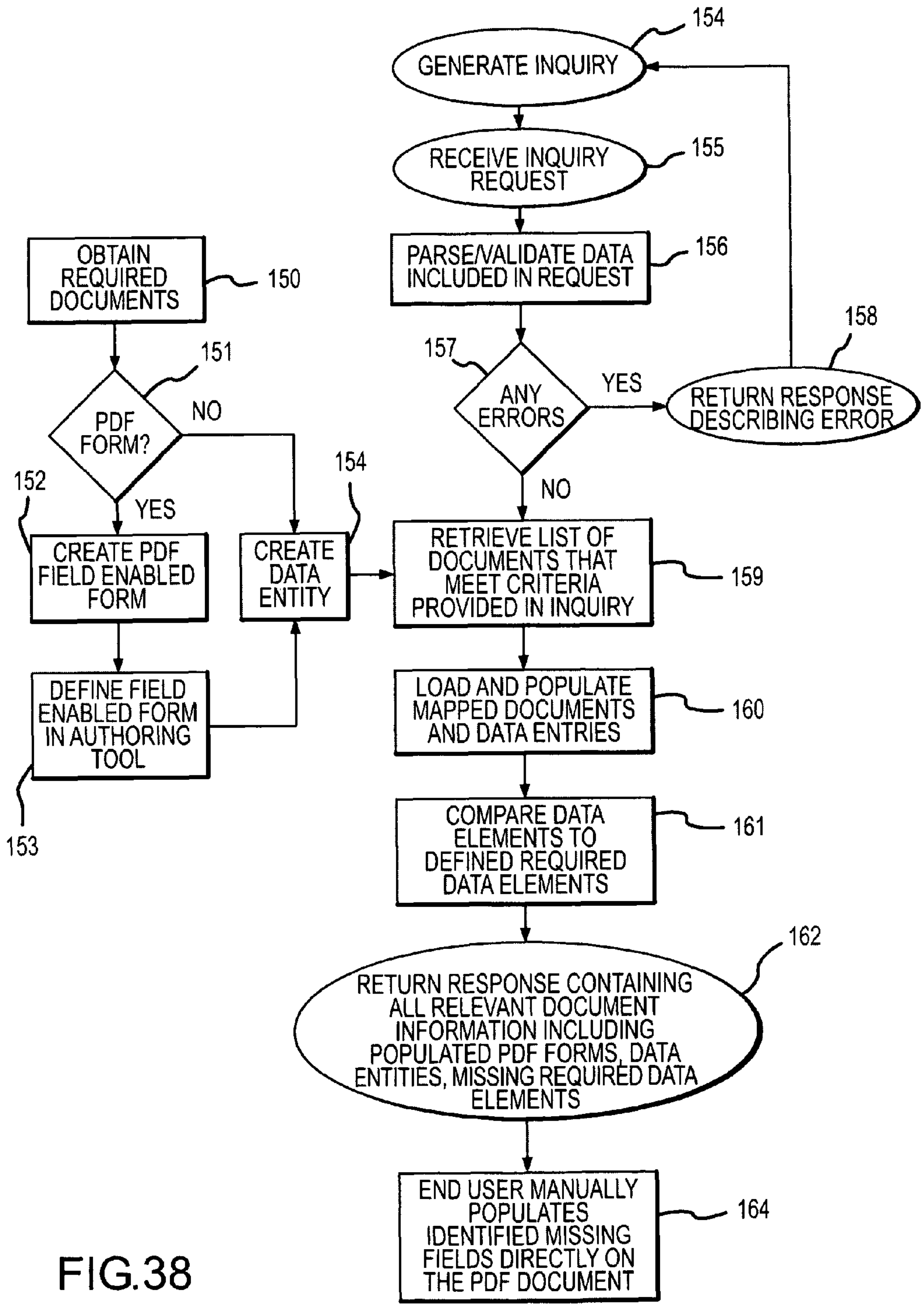
FIG. 38 is a flow diagram of a method of using an embodiment of the automotive titling system.

Now referring primarily to FIGS. 10 and 38, the add data entity function (62) further provides a data entity field population module (87) which allows the data entity fields (88) in certain of the plurality of motor vehicle titling data entities (15) or an added data entity (64) to be defined for population with data field entities (89) by utilizing one of a plurality of data field setting modules (90) (see for example FIG. 12). Now referring to FIGS. 1 and 9, in a first step (150) (see FIG. 38) a data entity (64) can be retrieved from a second data base (67) of a second computer (2) using the browser function (65) of the add data entity function (62). If the retrieved data entity is a Portable Document Forms ("PDF") developed by Adobe Systems, in a second step (151) (see FIG. 38) the data entity fields (88) can be enabled utilizing the conventional Acrobat Systems form tool to name each data entity field (88). See "Adobe Acrobat Help-PDF Forms", Creating Form Fields, p. 145-146, hereby incorporated in the entirety by reference herein. Enabling the data entity fields (88) as described allows the enabled PDF data entity (91) to be interactive with the data entity field population module (87) of the invention. In a third step (152), the data entity field population module (87) can activated by click event in the add data entity viewer (63) of a data entity field population module activation function (92) (shown in the embodiment of the add data entity viewer (63) as a "Modify PDF Pre-populations Setting" icon) to generate a viewable list of defined data entity fields (93) (see FIG. 11) and a viewable list of undefined data entity fields (94) (see FIG. 11) for the enabled PDF data entity (91) and further allows each of one of the defined data entity fields (95) or undefined data entity fields (96) to be selected by click event to provide a data field setting module viewer (97) (see FIG. 12) in which one of a plurality of data field setting modules (90) can be selected to define the data field entity (89) for the selected undefined data entity field (94). The third step is repeated to define each of the undefined data entity fields (94) in the enabled PDF data entity (91) (or as many of the undefined data entity fields (94) as necessary or desired). In a fourth step (153) (see FIG. 38) the PDF data entity (91) with defined data field entities (89) is then saved to the motor vehicle titling database (16) as one of the plurality of motor vehicle titling data entities (15).

In general, each of the plurality of data field setting modules (90) of the embodiment of the invention shown in FIG. 12 function upon click event to provide a field arguments viewer (98) which displays a field arguments list (99) in which all the field arguments (100) listed must be satisfied to define the data field entity (89) for the selected undefined data entity field (96) of the PDF data entity (91). Upon selection of each field argument (100) by click event a field argument setting viewer (101) can be displayed which provides all field argument settings (102) which can satisfy each field argument (100) selected. By selection of an argument setting (103) by click event or entering the field argument setting (103) manually in an argument setting field (104), the undefined data entity field (96) in the PDF data entity (91) with defined fields can be created and can upon subsequent retrieval be populated with one of the plurality of motor vehicle titling data elements (11) defined by the argument setting (103).

Figure 13:
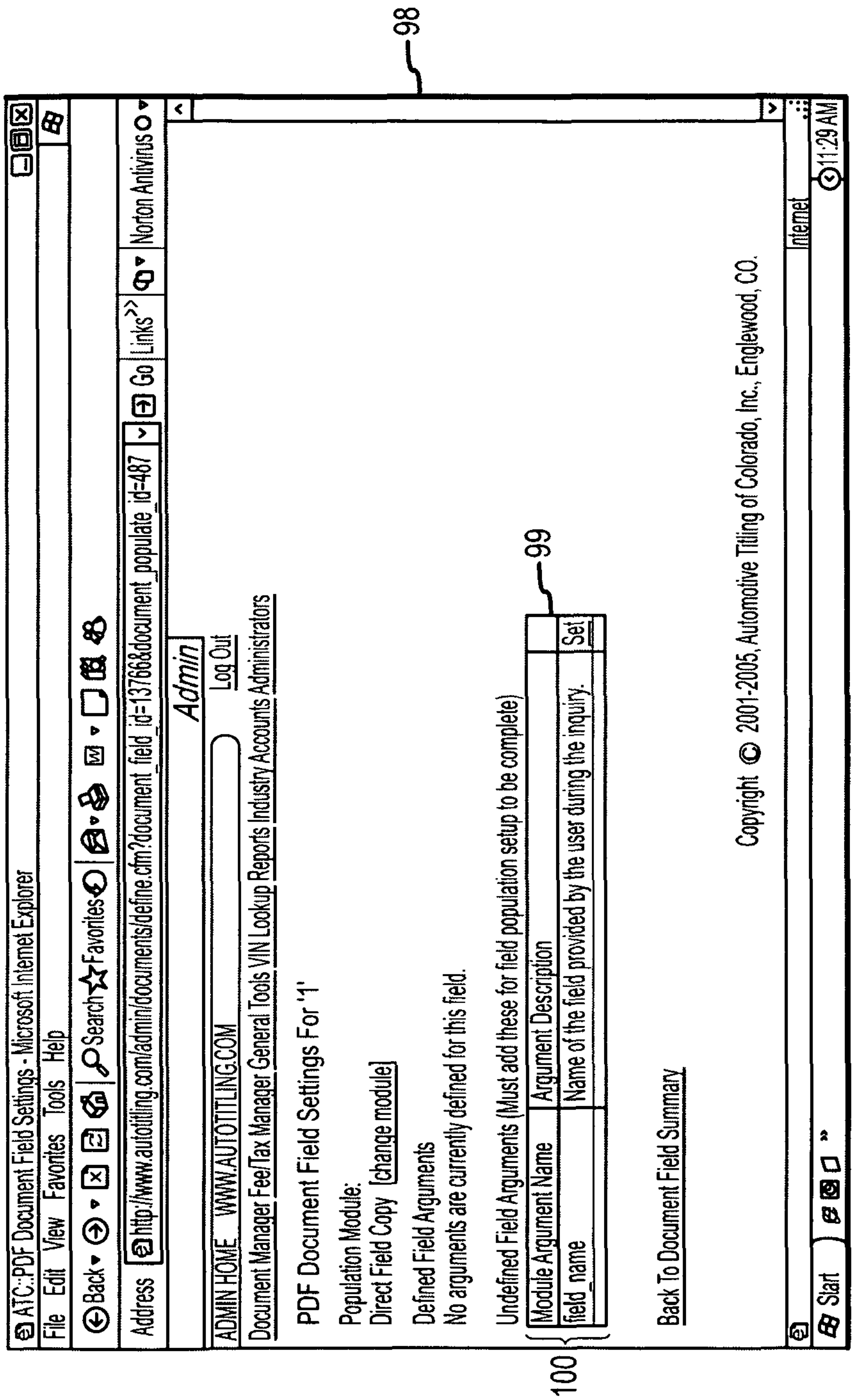
FIG. 13 is a screen image representation of a field argument viewer generated by selection of the direct field copy module of the data field setting module viewer.
Figure 14:
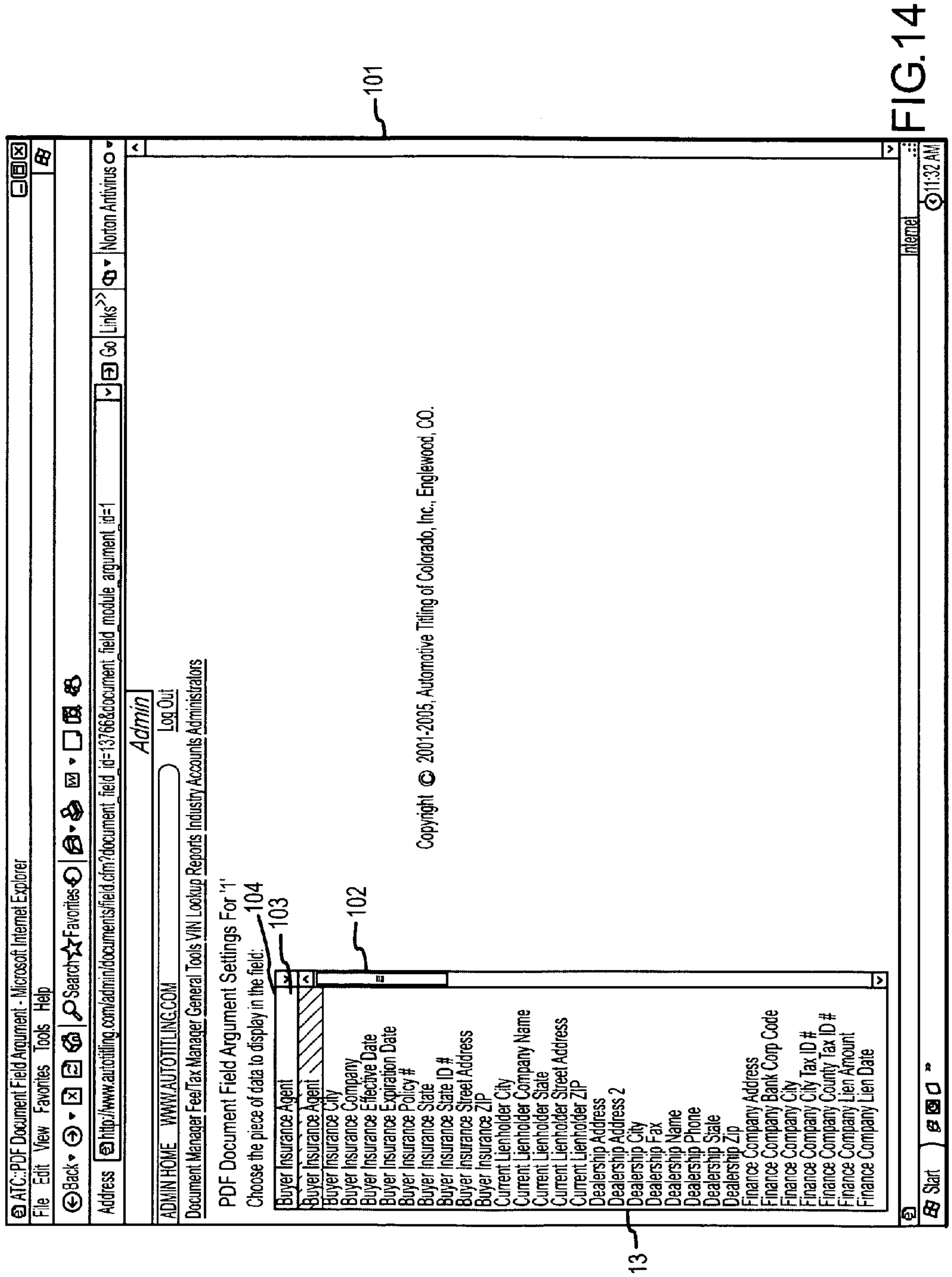
FIG. 14 is a screen image representation of an argument setting viewer generated by selection of a field argument in the field argument viewer of the direct field copy module.

Now referring primarily to FIGS. 12, 13, and 14, a first of the plurality of data field setting modules (90) comprises a direct field copy module (105) which functions by click event to generate the corresponding field argument viewer (98) (an embodiment shown in FIG. 13) and by click event of one of the field arguments (100) using the "set" icon in the embodiment shown, the corresponding argument setting viewer (101) (an embodiments shown in FIG. 14) further generates a list of all field argument settings (102) which includes the plurality of inquiry fields (13) of the motor vehicle titling inquiry author viewer (9). One of the plurality of inquiry fields (13) can be selected by click event to establish the field argument setting (103) for the selected undefined data entity field (96) of the enabled PDF data entity (91). Subsequent retrieval of the enabled PDF data entity (91) with the defined data entity field (95) allows the population of the defined data entity field (95) by direct copy of the motor vehicle titling data element (11) established in the one of the plurality of inquiry fields (13) selected as the field argument setting (103).

Figure 15:
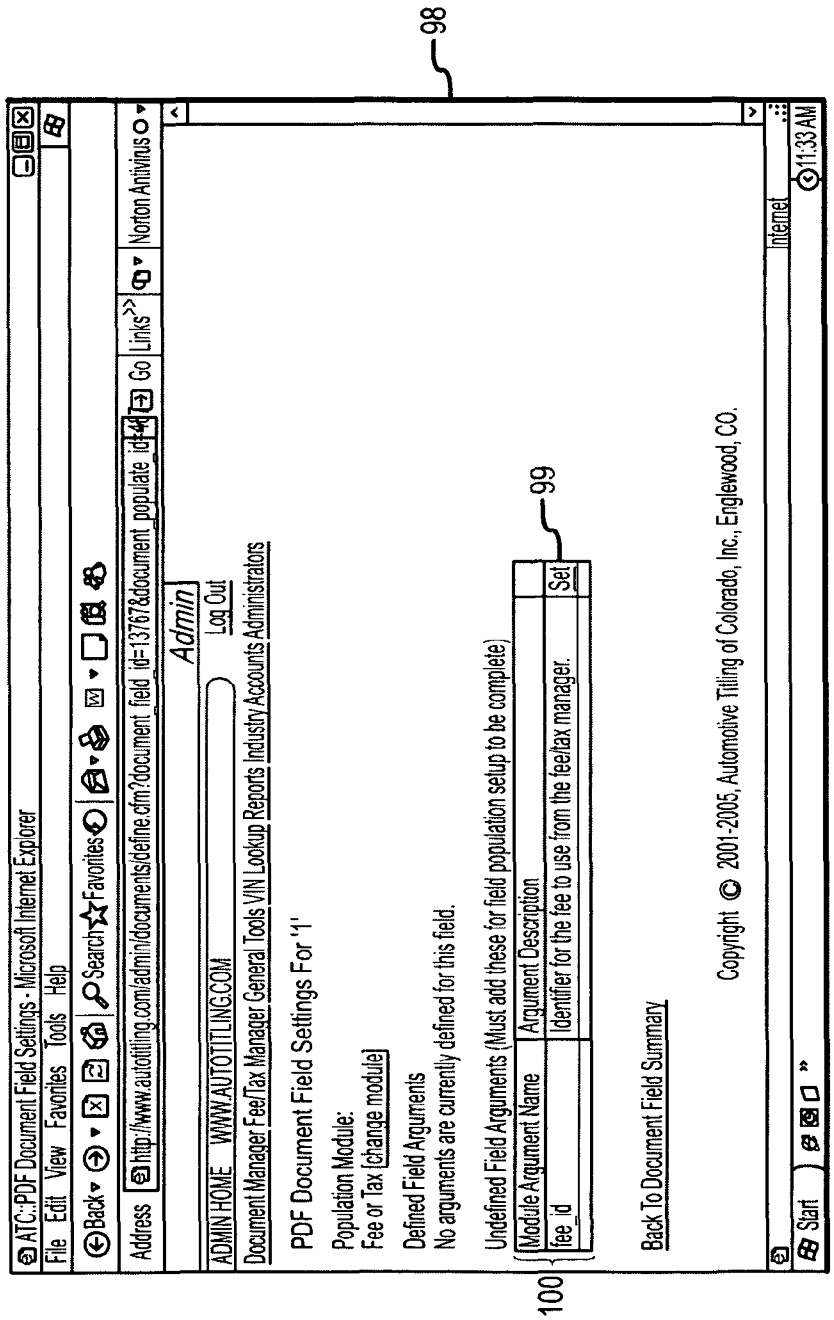
FIG. 15 is a screen image representation of a field argument viewer generated by selection of the fee-tax module of the data field setting module viewer.
Figure 16:
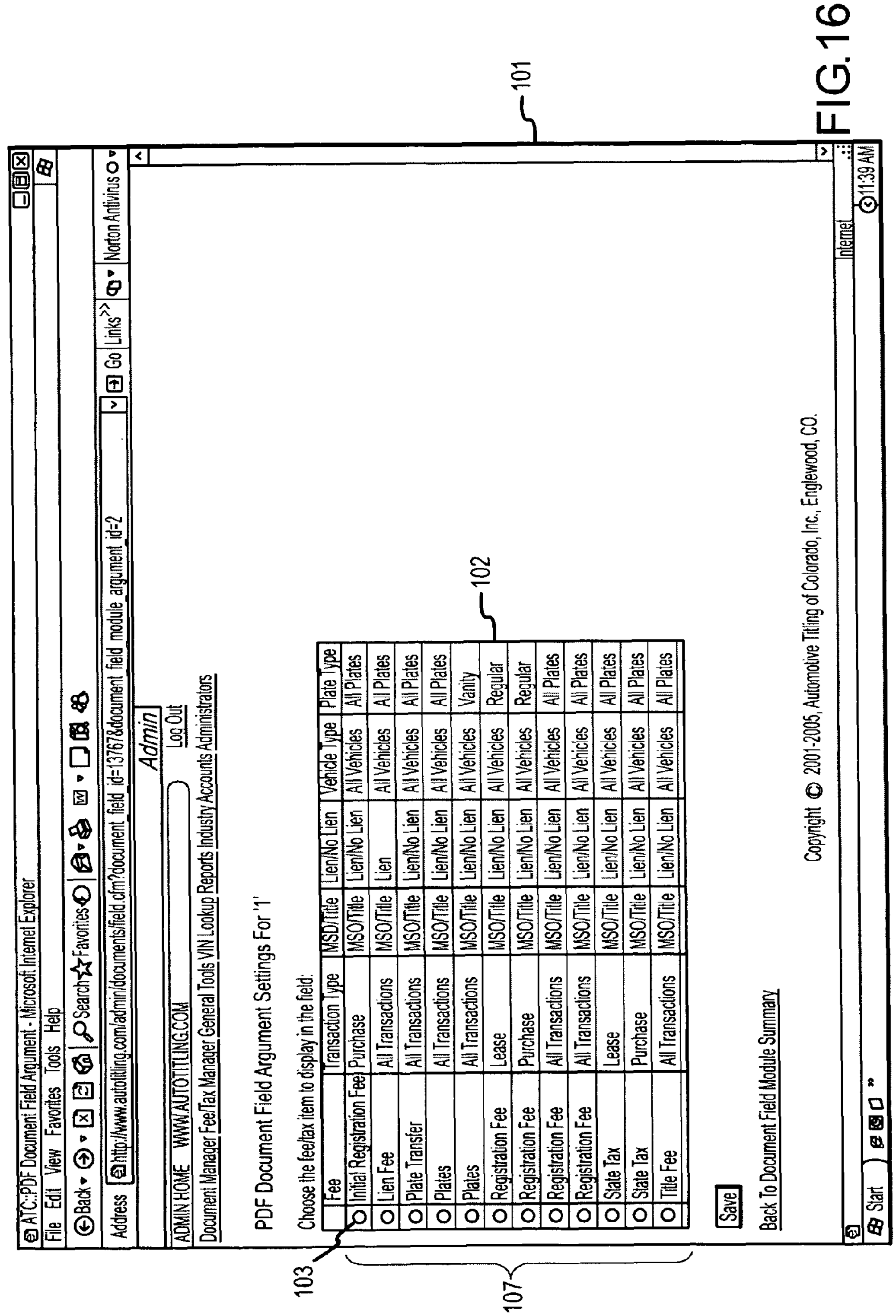
FIG. 16 is a screen image representation of an argument setting viewer generated by selection of a field argument in the field argument viewer of the fee-tax module.

Now referring primarily to FIGS. 12, 15, and 16, a second of the plurality of data field setting modules (90) comprises a fee-tax module (106) which operates by click event to generate the corresponding field argument viewer (98) (an embodiment shown in FIG. 15) and by click event of one of the field arguments (100) using the "set" icon in the embodiment shown, the corresponding argument setting viewer (101) (an embodiment shown in FIG. 16) can further generate a field argument settings list (102) which includes a plurality of fee-tax calculators (107). One of the plurality of fee tax-calculators (107) can be selected by click event to establish the field argument setting (103) for the undefined data entity field (96) of the enabled PDF data entity (91). Subsequent retrieval of the enabled PDF data entity (91) with the defined data entity field (95) allows the population of the defined data entity field (95) with the fee or tax calculated by the selected one of the plurality of fee-tax calculators (107) corresponding to the first, second, or third architectural manager level (State, County, or City) in which the add data entity function (62) was activated by click event (as above described).

Figure 17:
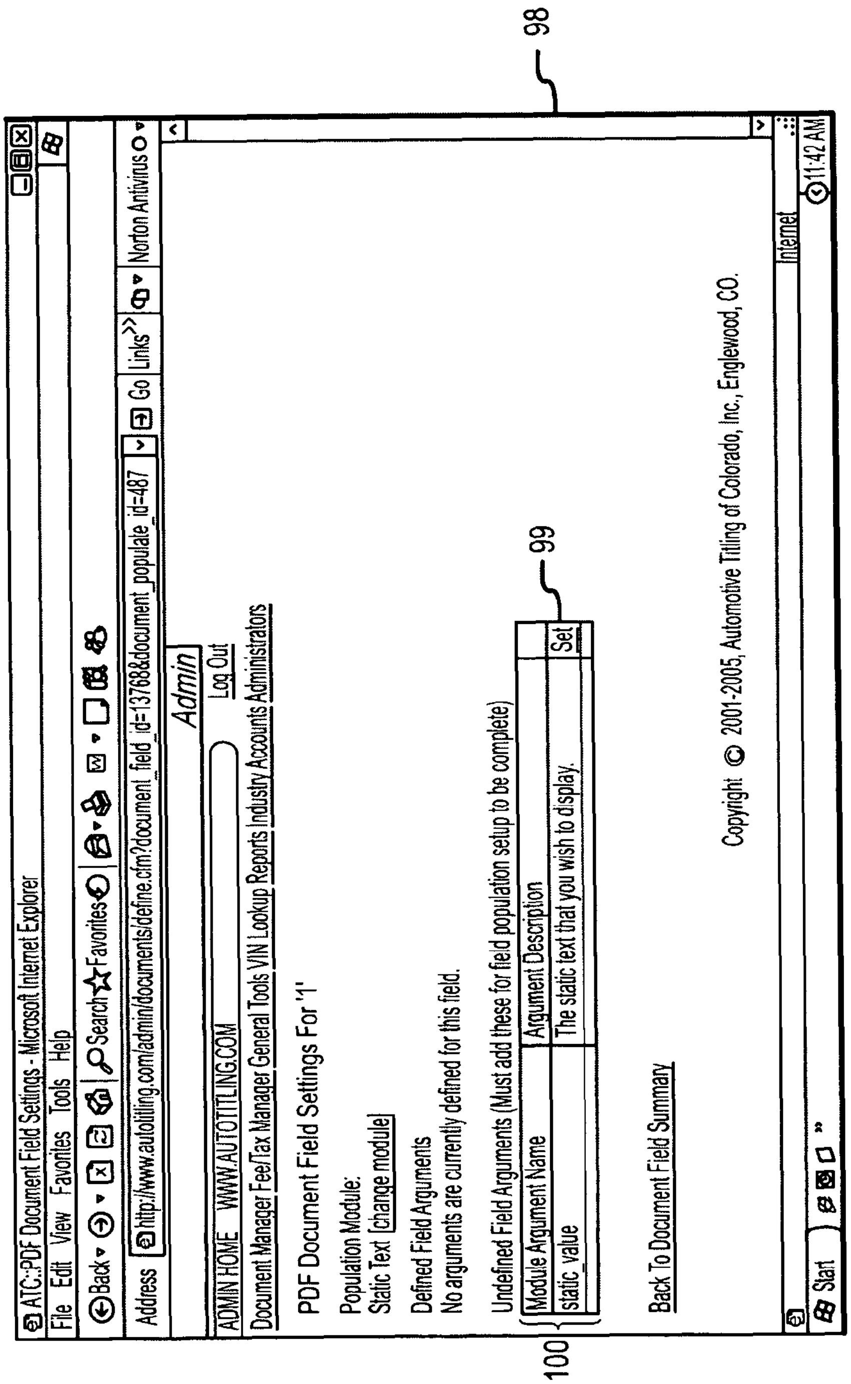
FIG. 17 is a screen image representation of a field argument viewer generated by selection of the static text module of the data field setting module viewer.
Figure 18:
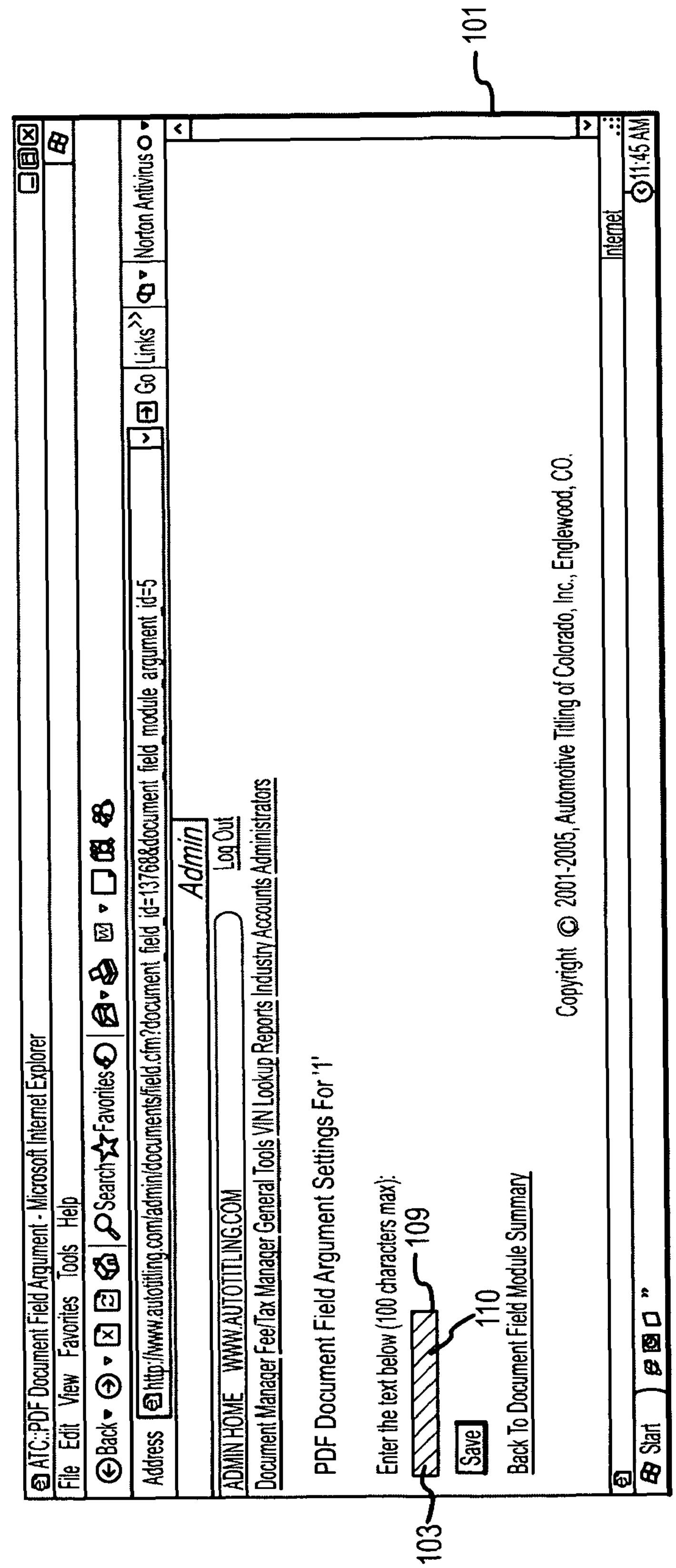
FIG. 18 is a screen image representation of an argument setting viewer generated by selection of a field argument in the field argument viewer of the static text module.

Now referring primarily to FIGS. 12, 17 and 18, a third of the plurality of data field setting modules (90) comprises a static text module (108) which operates by click event to generate a corresponding field argument viewer (98) (an embodiment shown in FIG. 17) and by click event of one of the field arguments (100) using the "set" icon in the embodiment shown, the corresponding argument setting viewer (101) (an embodiment shown in FIG. 18) further generates a static text field (109) which by entry of static text (110) establishes the field argument setting (103) for the selected undefined data entity field (96) of the enabled PDF data entity (91). Subsequent retrieval of the enabled PDF data entity (91) with the defined data entity field (95) allows population of the defined data entity field (95) with the static text (110) entered into the static text field (109).

Figure 19:
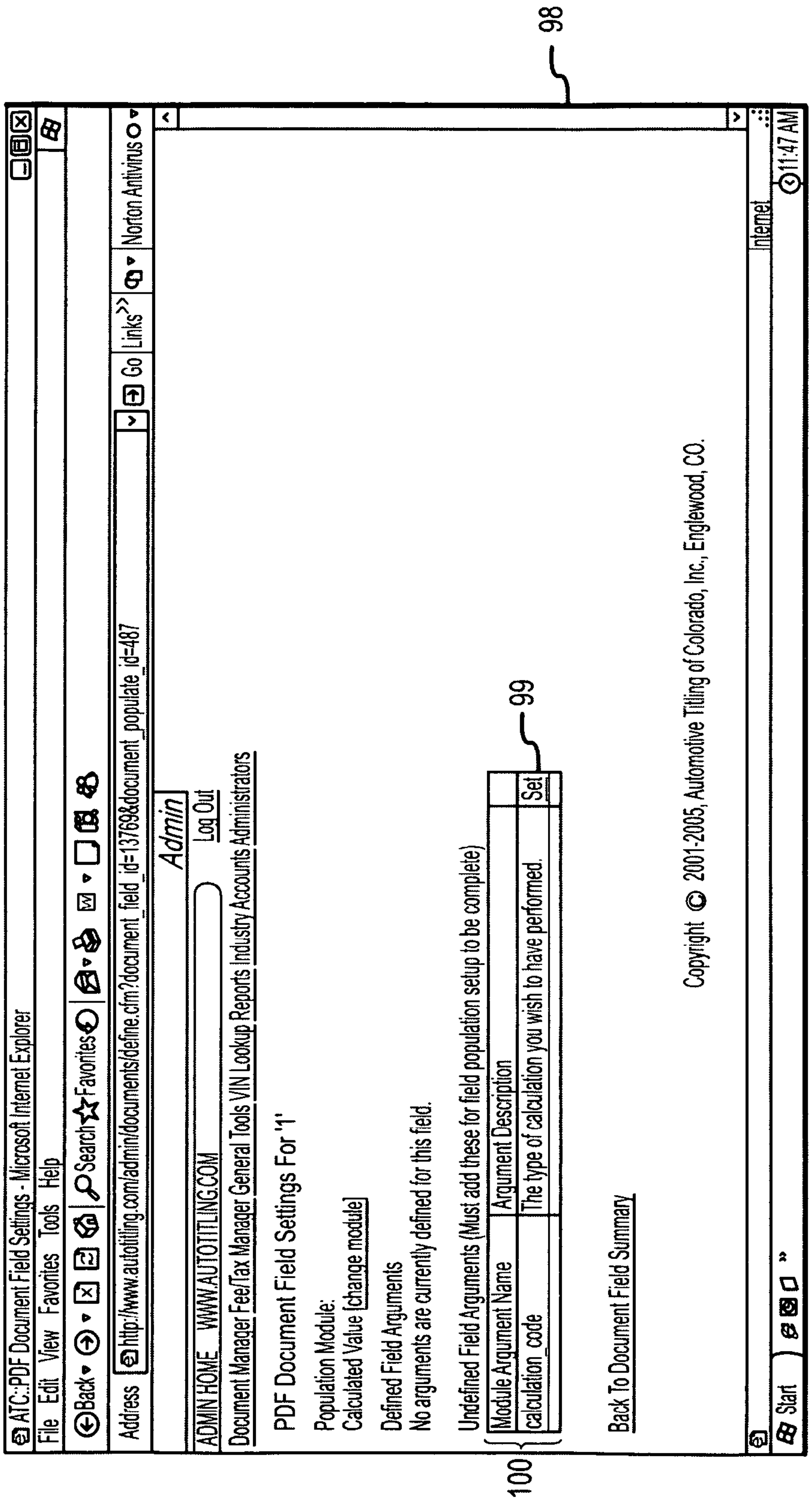
FIG. 19 is a screen image representation of a field argument viewer generated by selection of the calculated value module of the data field setting module viewer.
Figure 20:
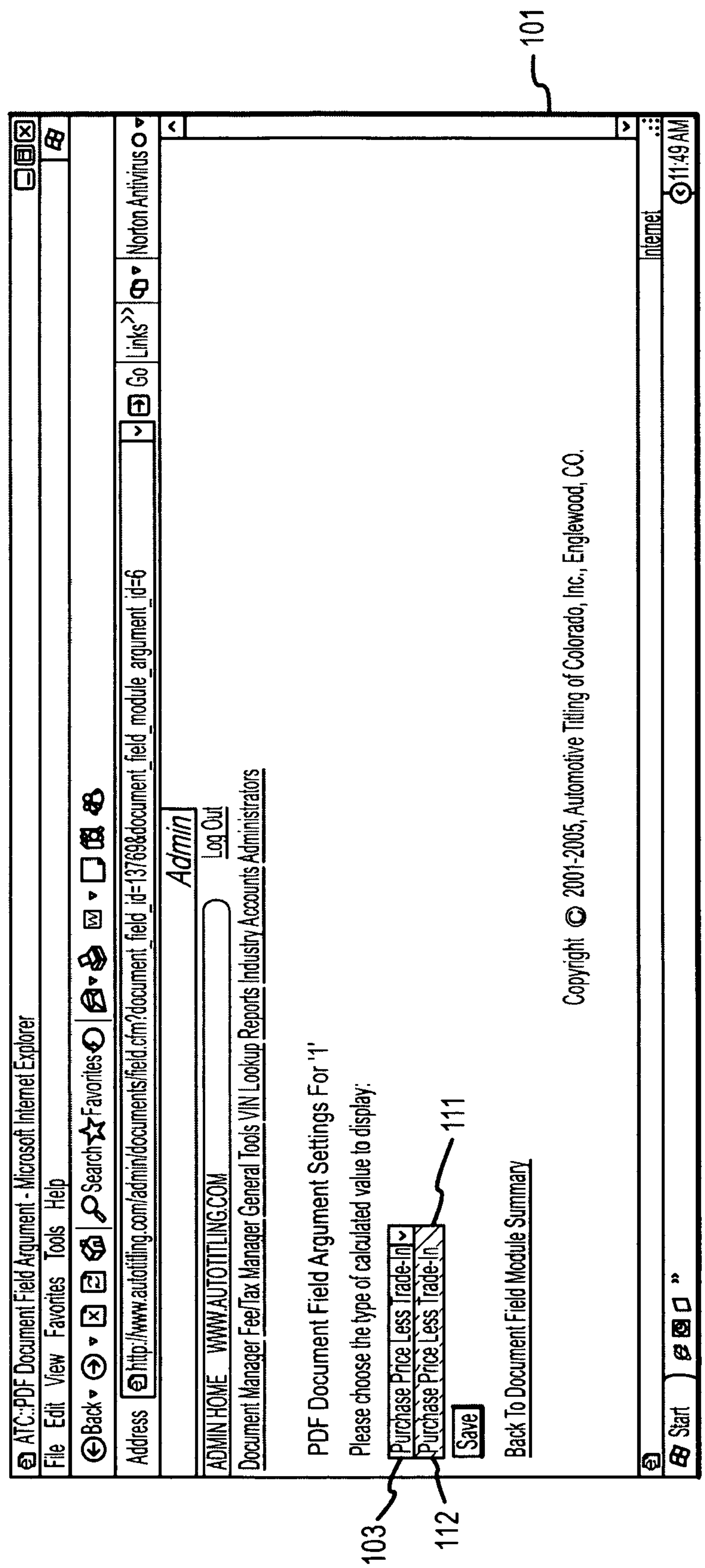
FIG. 20 is a screen image representation of an argument setting viewer generated by selection of a field argument in the field argument viewer of the calculated value module.

Now referring primarily to FIGS. 12, 19 and 20, a fourth of the plurality of data field setting modules (90) comprises a calculated value module (110) which operates by click event to generate a corresponding field argument viewer (98) (an embodiment shown in FIG. 19) and by click event of one of the field arguments (100) using the "set" icon in the embodiment shown, the corresponding argument setting viewer (101) (an embodiment shown in FIG. 20) further generates a value calculator list (111) the value calculator (112) selected by click establishes the field argument setting (103) for the selected undefined data entity field (96) of the enabled PDF data entity (91). Subsequent retrieval of the enabled PDF data entity (91) with the defined data entity field (95) allows population of the defined data entity field (95) with the calculated value (112).

Figure 21:
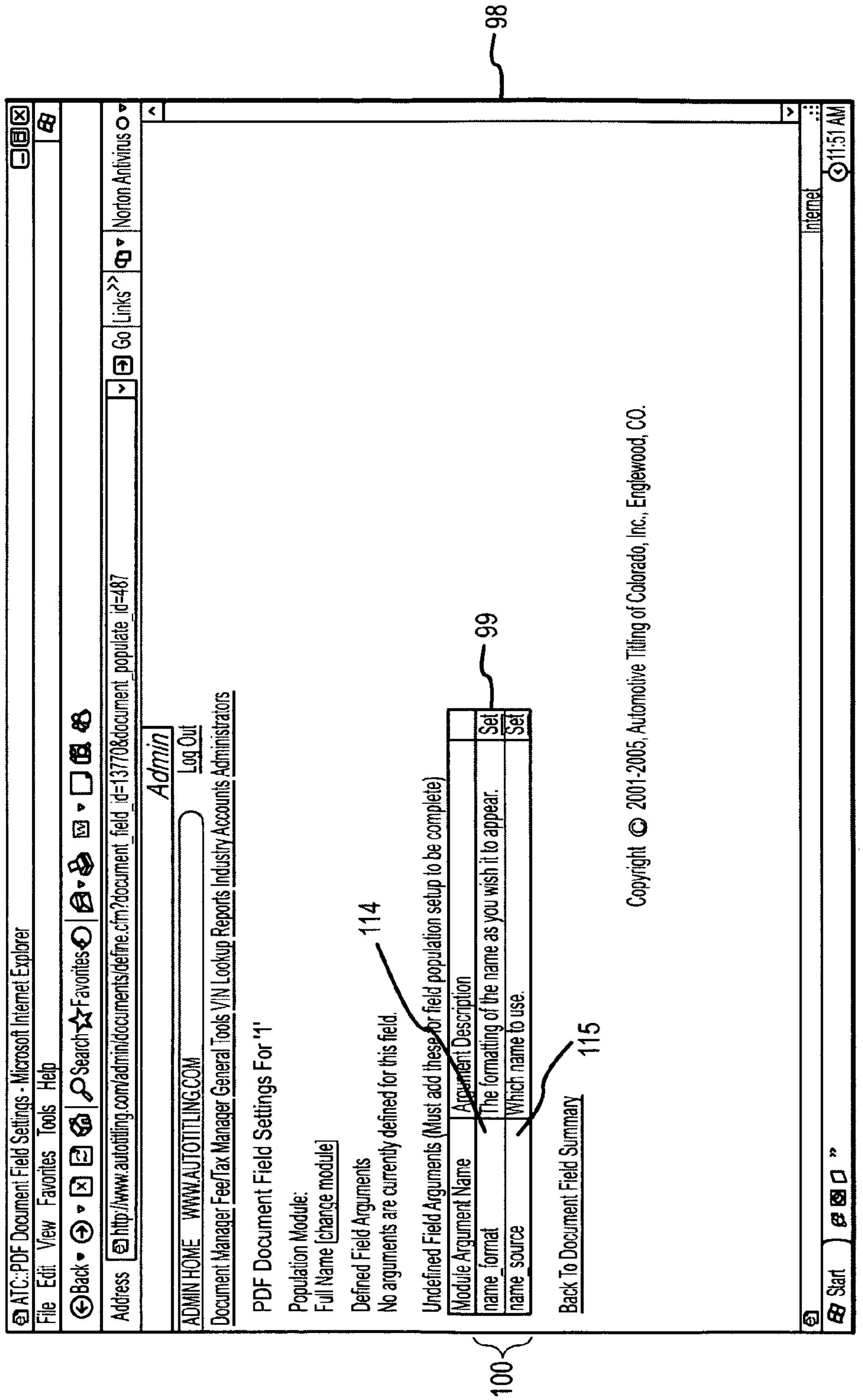
FIG. 21 is a screen image representation of a field argument viewer generated by selection of the full name module of the data field setting module viewer.
Figure 22:
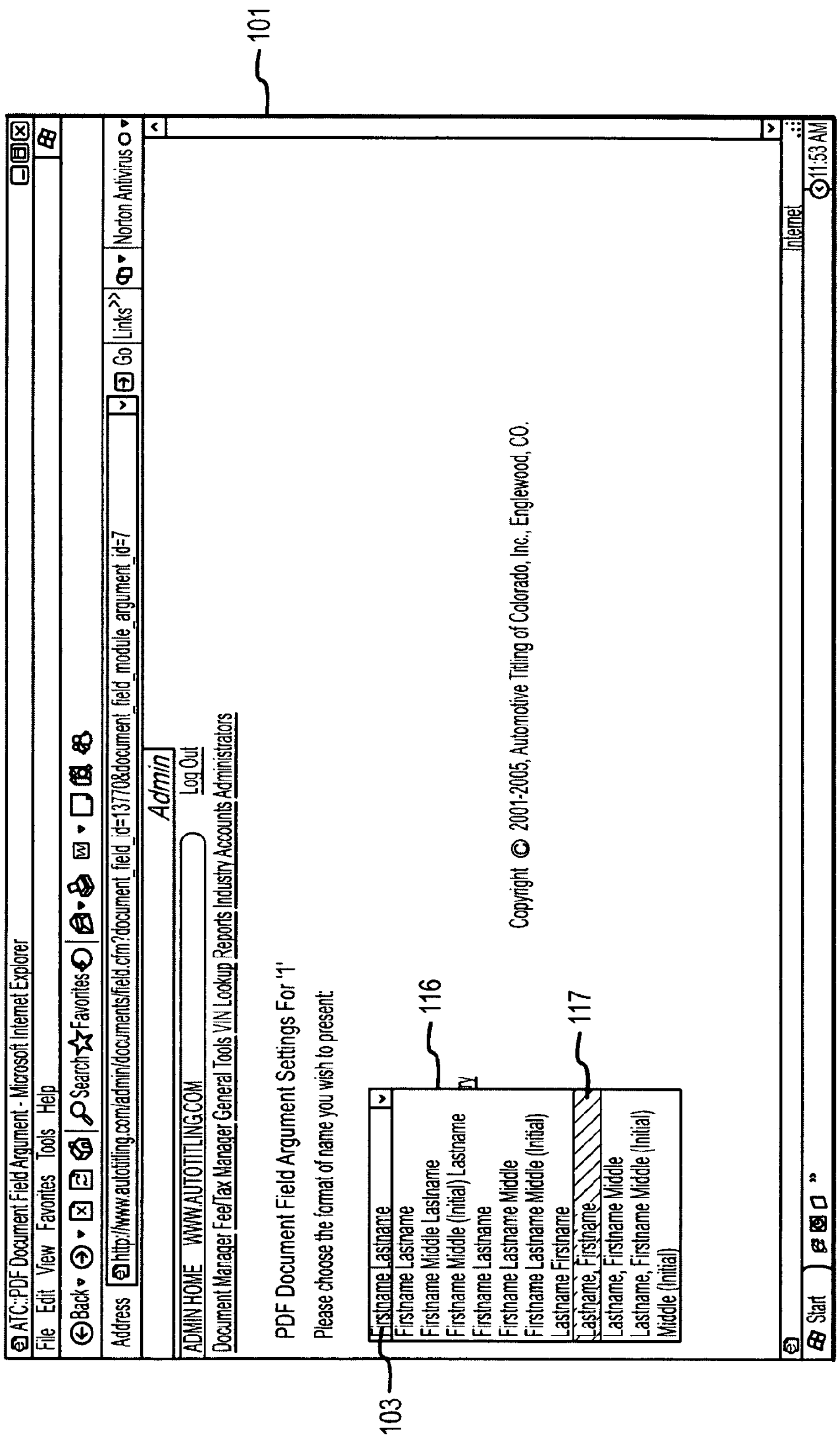
FIG. 22 is a screen image representation of a first argument setting viewer generated by selection of a name format field argument in the field argument viewer of the full name module.
Figure 23:
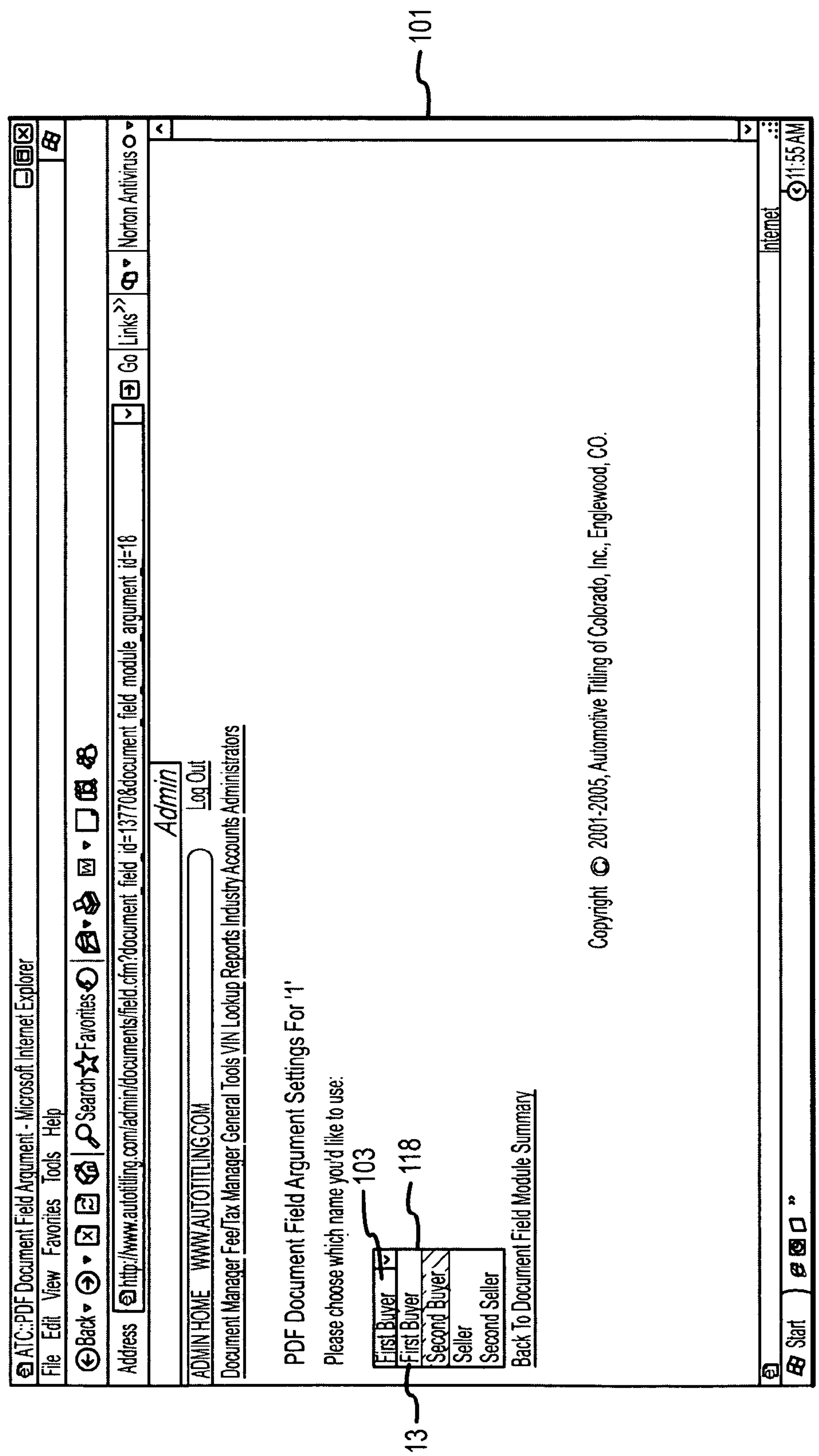
FIG. 23 is a screen image representation of a second argument setting viewer generated by selection of a name source field argument in the field argument viewer of the full name module.

Now referring primarily to FIGS. 12, 21, 22, and 23, a fifth of the plurality of data field setting modules (90) comprises a full name module (113) which operates by click event to generate a corresponding field argument viewer (98) (an embodiment shown in FIG. 21) and by click event of one of the field arguments (100) using the "set" icon in the embodiment shown, the corresponding argument setting viewer (101) (an embodiment for each field argument setting viewer is shown in FIGS. 22 and 23). As shown by FIG. 21 the field argument viewer (98) provides a first name format field argument (114) which requires the name format to be set and a second name field argument (115) which requires which name to use to be set. A click event of the first name format field argument (114) generates in the corresponding argument setting viewer (101) (FIG. 22) a list of name formats (116) each of which by click event generates a name format (117) which establishes the field argument setting (103) for the first name format field argument (114). A click event of the second name field argument (115) generates in the corresponding argument setting viewer (101) (FIG. 23) a list of inquiry fields (118) which relates to a name, such as the first buyer name, second buyer name, first seller name, second seller name, or the like. Selection of one of the plurality of inquiry fields (13) by click event establishes the field argument setting (103) for the second name field argument (115). Subsequent retrieval of the enabled PDF data entity (91) with the defined data entity field (95) allows population of the defined data entity field (95) with the motor vehicle titling data element (11) entered into the selected inquiry filed (13) in the selected name format (117).

Figure 24:
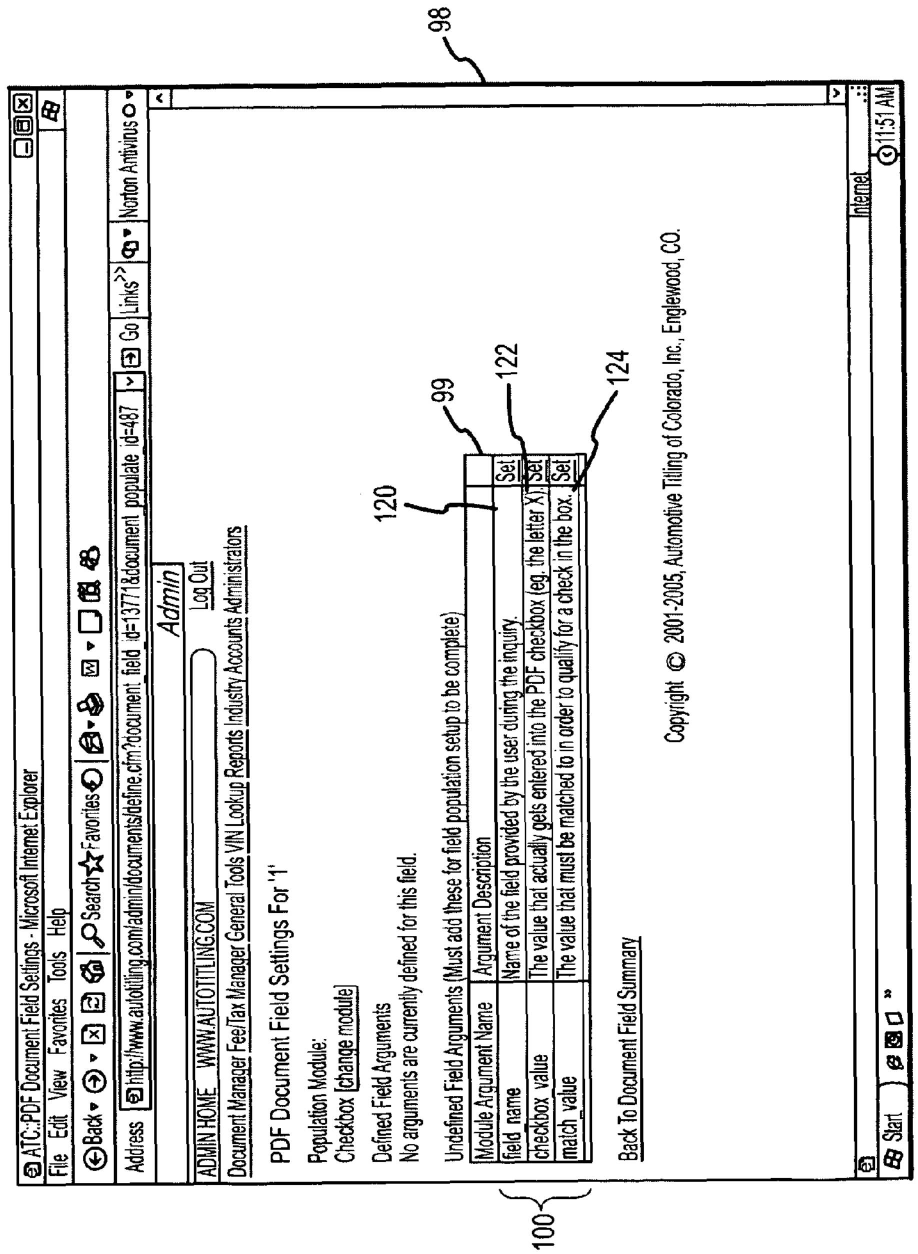
FIG. 24 is a screen image representation of a field argument viewer generated by selection of the checkbox module of the data field setting module viewer.
Figure 25:
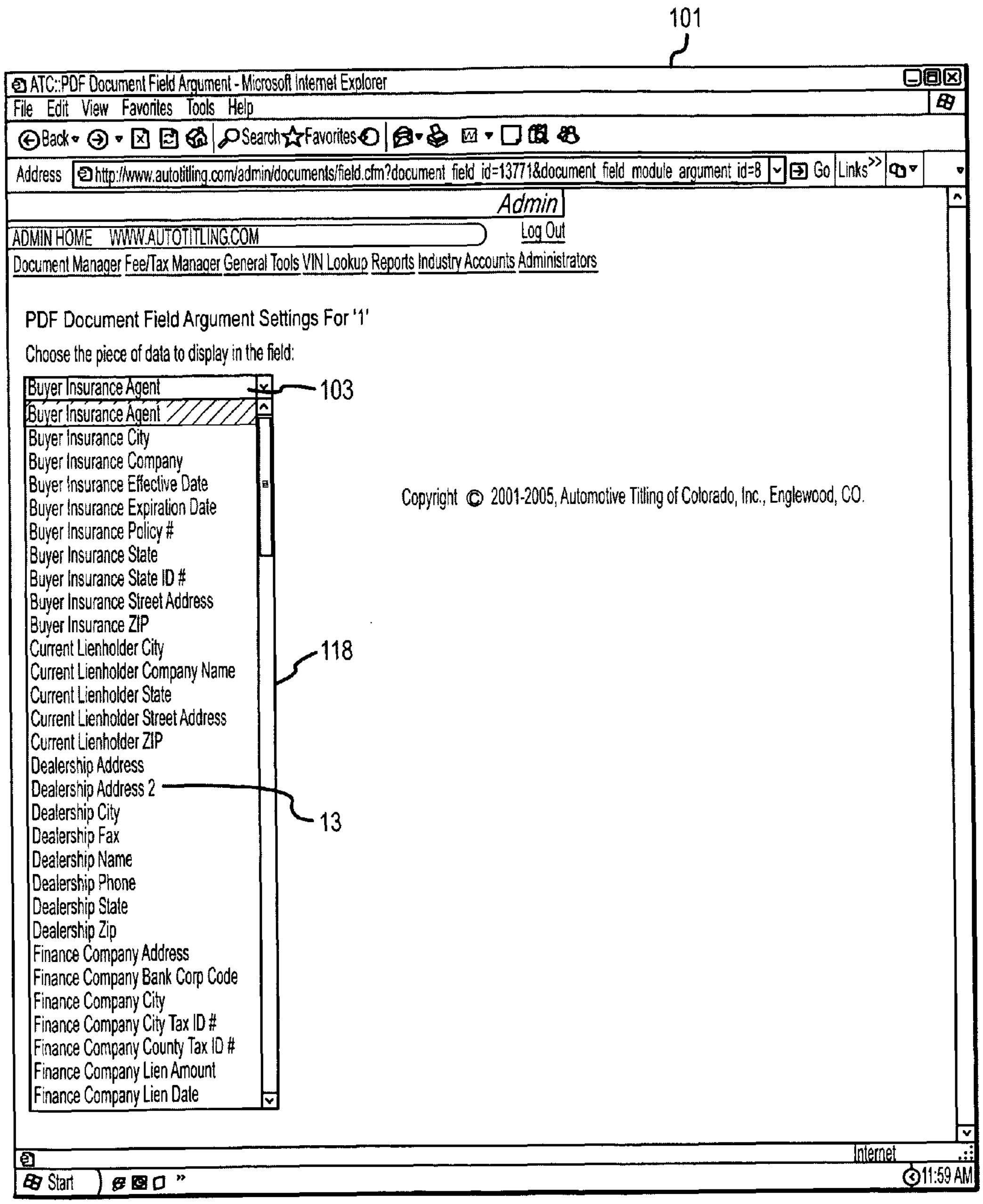
FIG. 25 is a screen image representation of a first argument setting viewer generated by selection of a field name field argument in the field argument viewer of the checkbox module.
Figure 26:
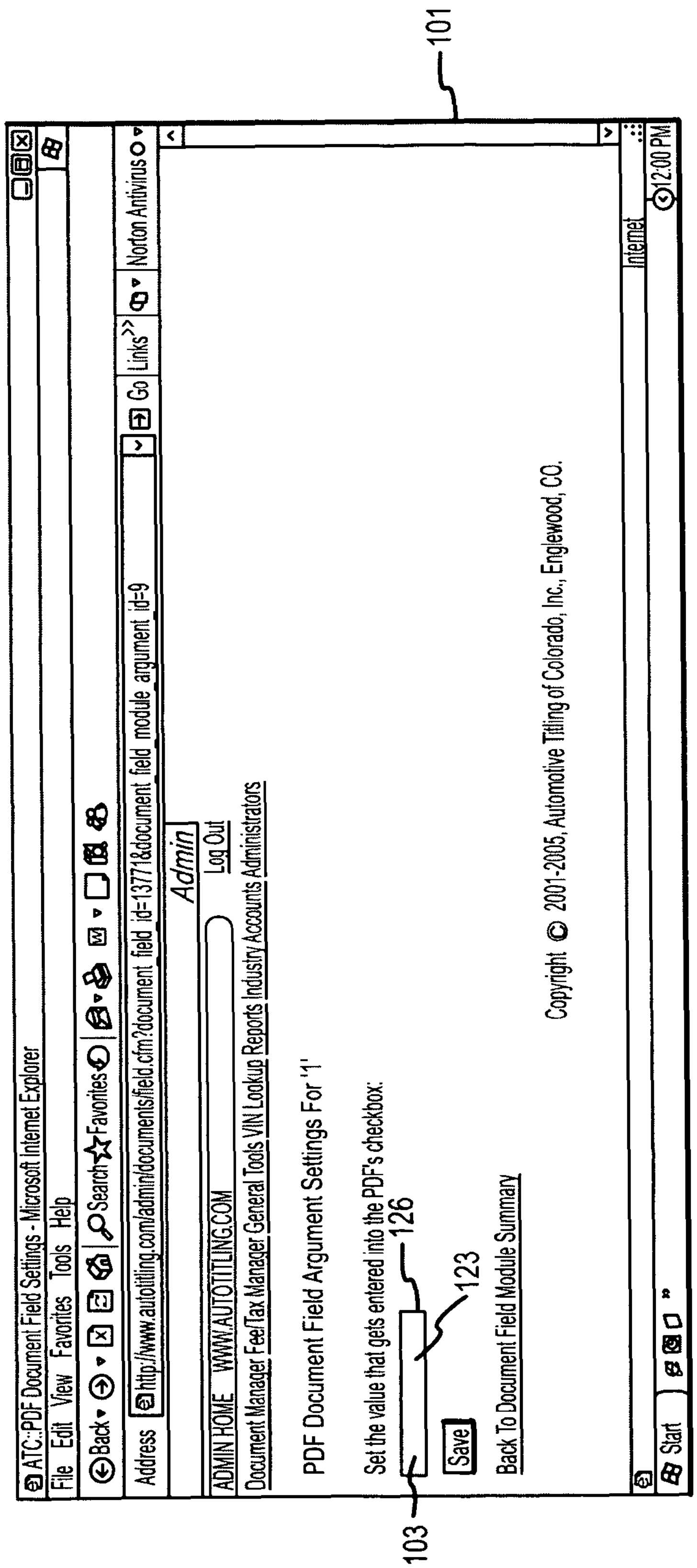
FIG. 26 is a screen image representation of a second argument setting viewer generated by selection of a checkbox value field argument in the field argument viewer of the checkbox module.
Figure 27:
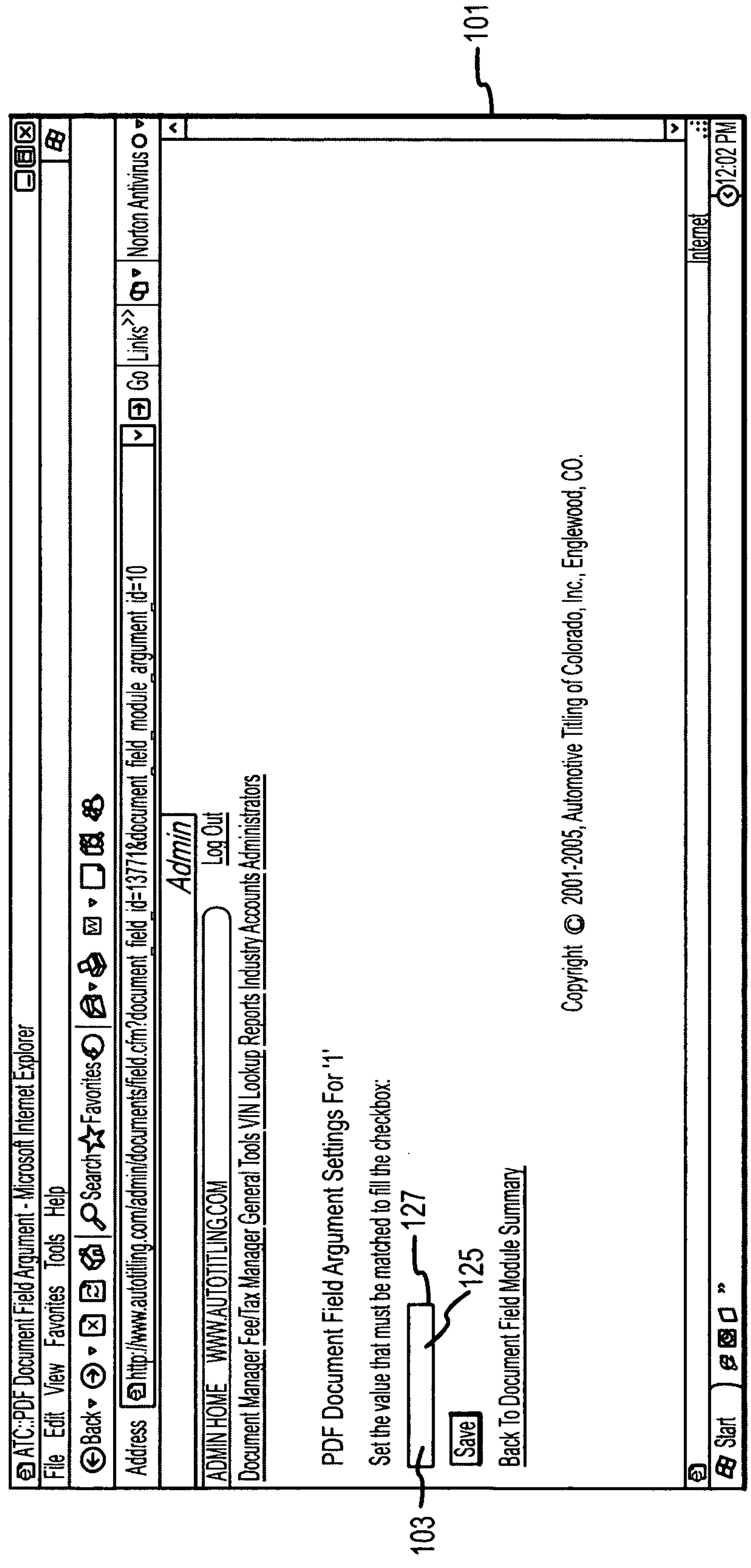
FIG. 27 is a screen image representation of a third argument setting viewer generated by selection of a match value field argument in the field argument viewer of the checkbox module.

Now referring primarily to FIGS. 12, 24, 25, 26, and 27 a sixth of the plurality of data field setting modules (90) comprises a conditional fill check box module (119) which operates by click event to generate a corresponding field argument viewer (98) (an embodiment shown in FIG. 24) and by click event of one of the field arguments (100) using the "set" icon in the embodiment shown, the corresponding argument setting viewer (101) (an embodiment for each field argument setting viewer shown in FIGS. 25, 26, and 27 respectively). As shown by FIG. 24 the field argument viewer (98) provides a field arguments list (99) with a first field name argument (120) which requires identification of one of the plurality of inquiry fields (13) associated with a check box (121) to be set, a second element value field argument (122) which requires identification of an element value (123) to be entered into the check box (121) to be set, and a third value match field argument (124) which requires that a check box match value (125) must be matched in the identified inquiry field (13) to qualify the check box (121) for a check to be set. A click event of the first field name argument (120) generates in the corresponding argument setting viewer (101) (FIG. 25) a list of the plurality of inquiry fields (118). Selection of one of the plurality of inquiry fields (13) by click event identifies that one of the plurality of fields (13) with the check box (121) as the field argument setting (103) for the first field name argument (120). A click event of a second element value field argument (122) generates in the corresponding argument setting viewer (101) (see FIG. 26) a check box element value data field (126) which allows the element value (123), such as an "x" to be established in the check box element value data field (126) to establish the field argument setting (103) for the second element value field argument (122). A click event of the third value match field argument (124) generates in the corresponding argument setting viewer (101) (see FIG. 27) a check box match value data field (127) which allows a check box match value (125), such as "yes" to be established in the check box match value data field (127) to establish the field argument setting (103) for the third value match field argument (124). Subsequent retrieval of the enabled PDF entity (91) allows population of the defined data entity field (95) (the check box (121)) with the check box element value (123) if the value within the defined entity field matches the check box match value (125).

Figure 28:
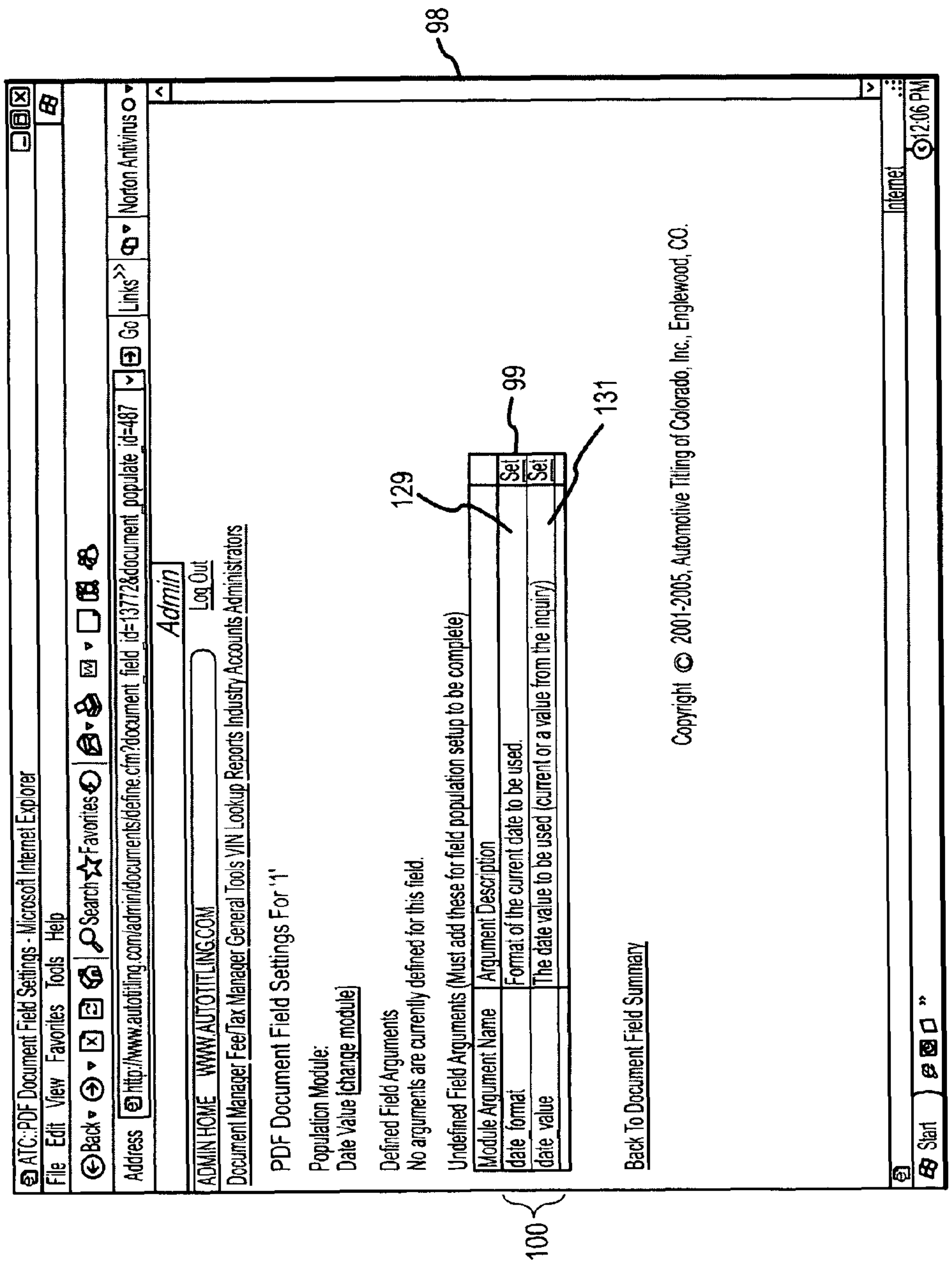
FIG. 28 is a screen image representation of a field argument viewer generated by selection of the data value module of the data field setting module viewer.
Figure 29:
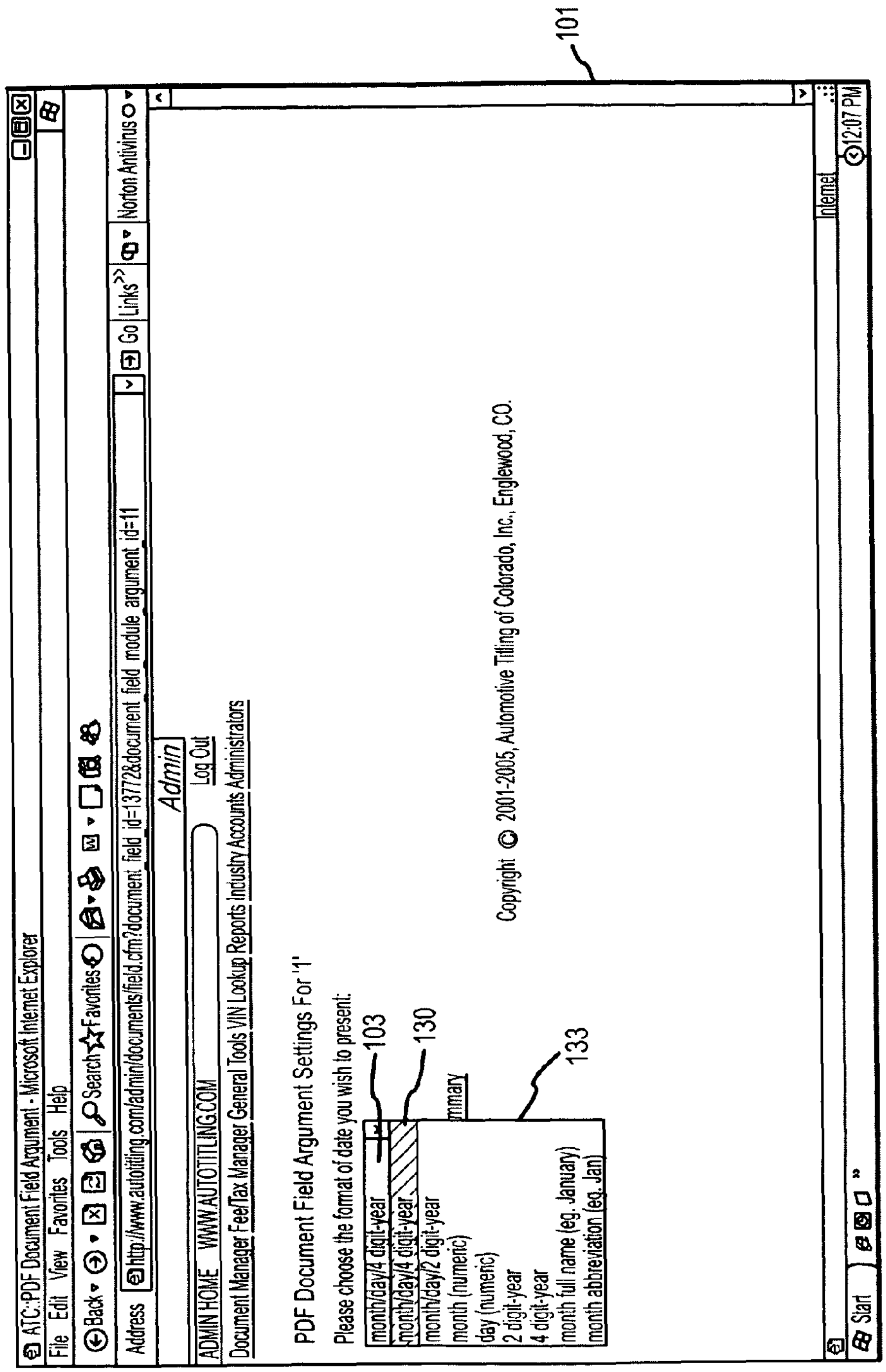
FIG. 29 is a screen image representation of a first argument setting viewer generated by selection of a date format field argument in the field argument viewer of the date value module.
Figure 30:
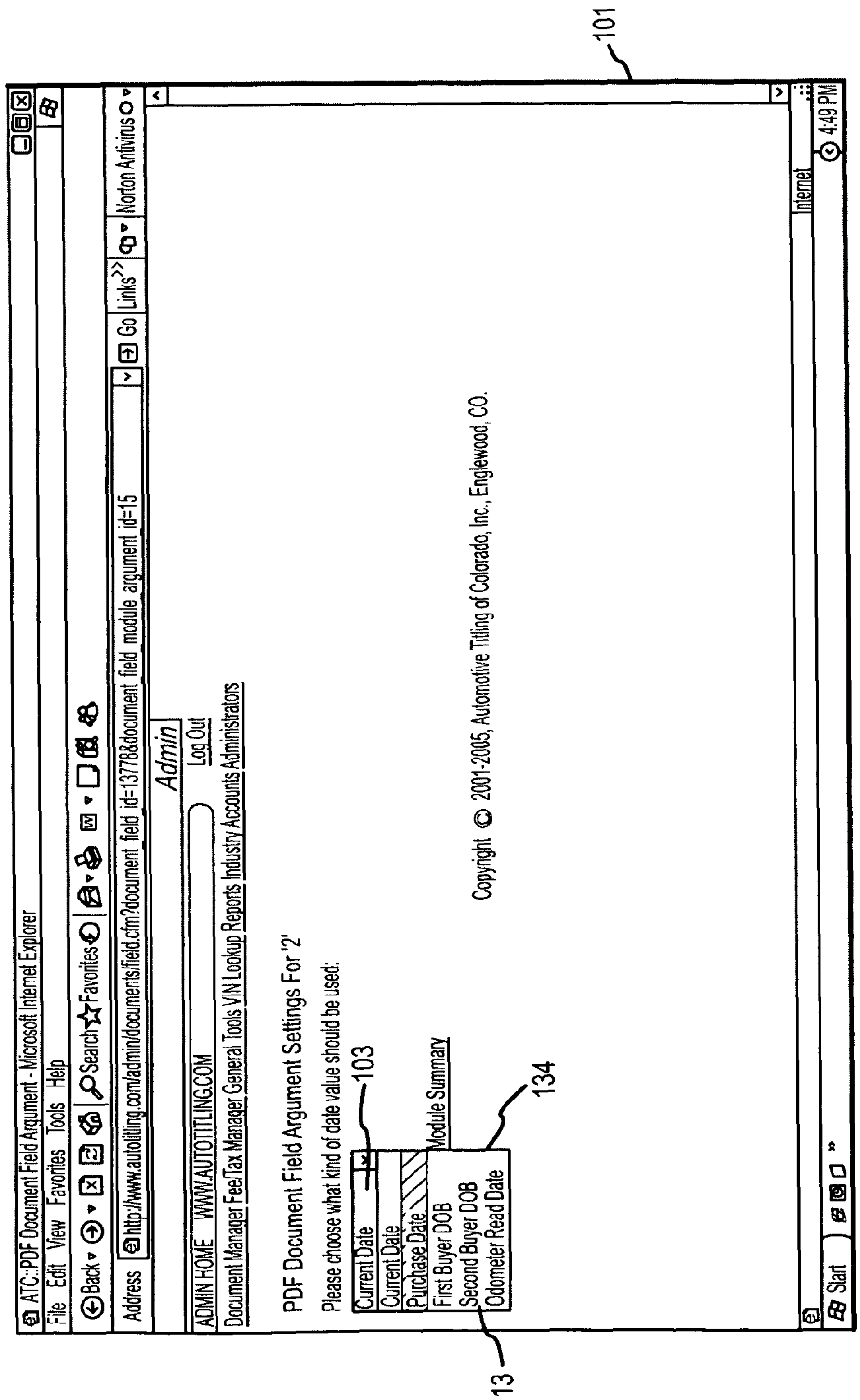
FIG. 30 is a screen image representation of a second argument setting viewer generated by selection of a date value field argument in the field argument viewer of the date value module.

Now referring primarily to FIGS. 12, 28, 29, and 30, a seventh of the plurality of data field setting modules (90) comprises a date value module (128) which operates by click event to generate a corresponding field argument viewer (98) (an embodiment shown in FIG. 28) and by click event of one of the field arguments (100) using the "set" icon in the embodiment shown, the corresponding field argument setting viewer (101) (an embodiment shown in FIG. 29). As shown by FIG. 28 the field argument viewer (98) provides a first date value format field argument (129) which requires the date value format (130) to be set and a second date value field argument (131) which requires which a date value (132) to be set. A click event of the first date value format field argument (129) generates in the corresponding argument setting viewer (101) (see FIG. 29) a date value formats list (133) from which a date value format (130) can be selected to establish the field argument setting (103) for the first date value format field argument (129). A click event of the second date value field argument (131) generates in the corresponding argument setting viewer (101) (see FIG. 30) a date value list (134) from which one of the plurality of inquiry fields (13) in the motor vehicle titling inquiry author (7) which relate to a date, such as the current date, buyer's date of birth, second buyer's date of birth, odometer read date, or the like can be selected to establish the field argument setting for the second date value field argument (131). Subsequent retrieval of the enabled PDF data entity (91) with the defined data entity field (95) allows population of the defined data entity field (95) with the motor vehicle titling data element (11) entered into the selected inquiry filed (13) in the selected date format (130).

Figure 31:
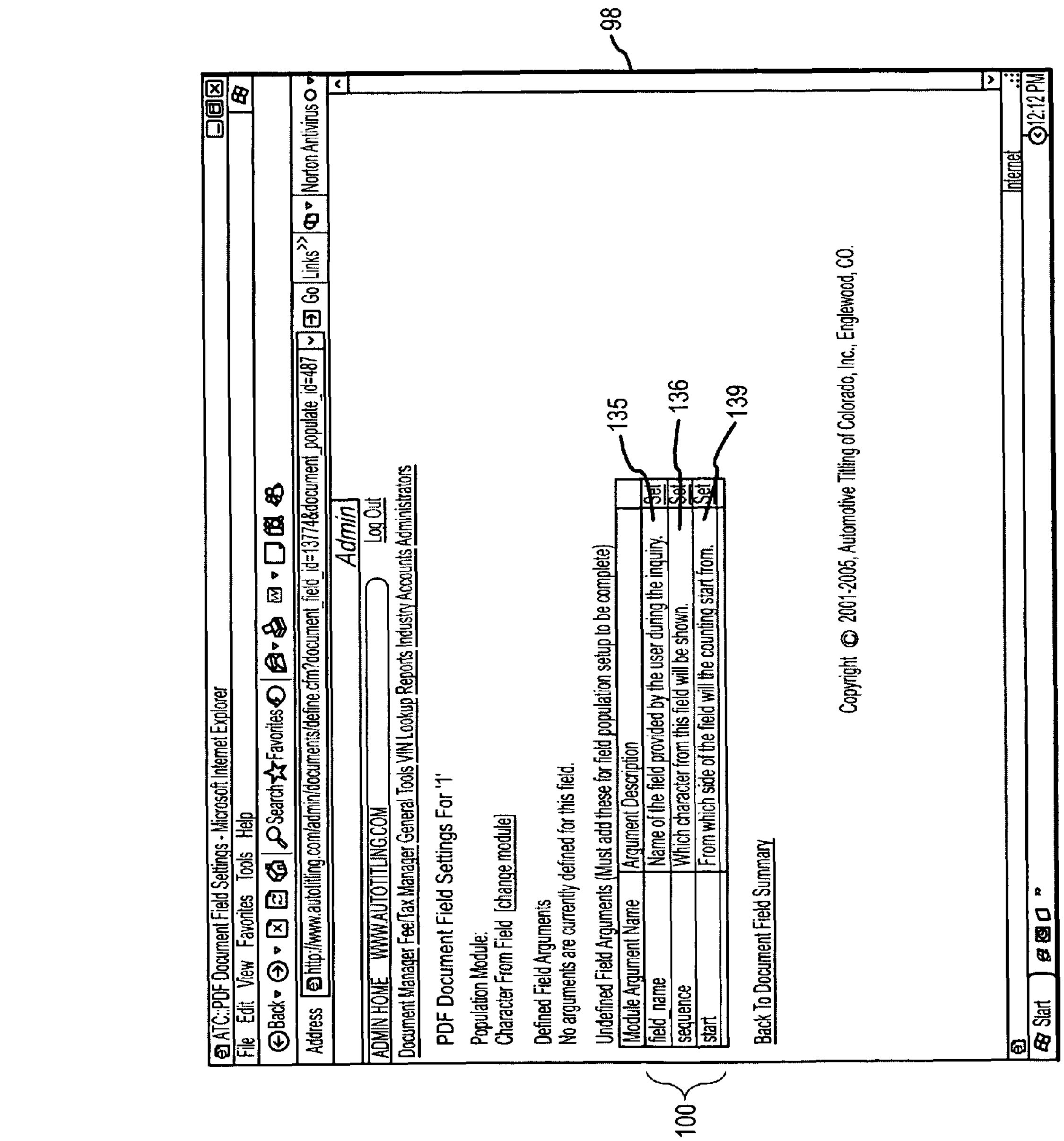
FIG. 31 is a screen image representation of a field argument viewer generated by selection of the character form field module (or field element selection module) of the data field setting module viewer.
Figure 32:
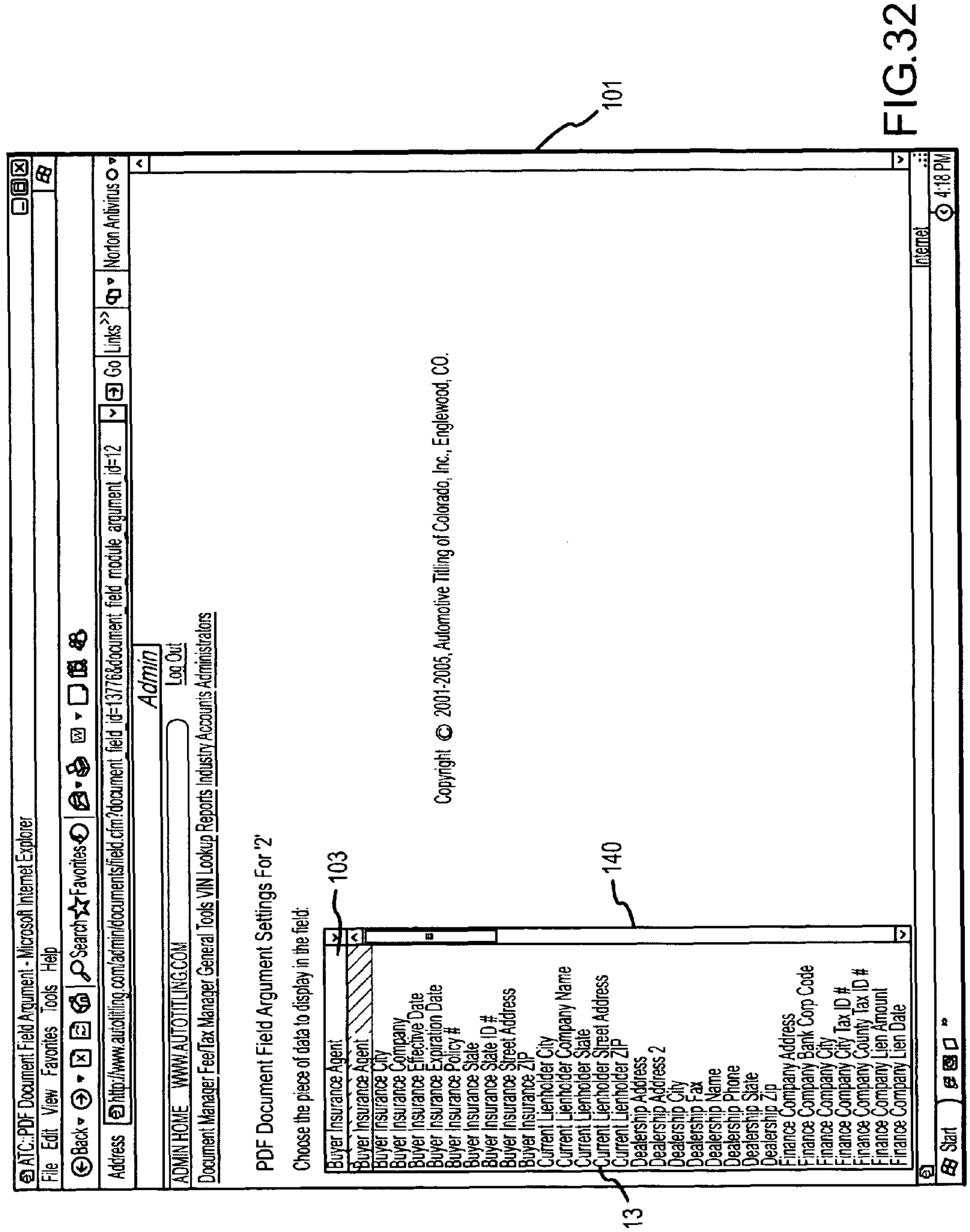
FIG. 32 is a screen image representation of a first argument setting viewer generated by selection of a field name field argument in the field argument viewer of the character form field module.
Figure 33:
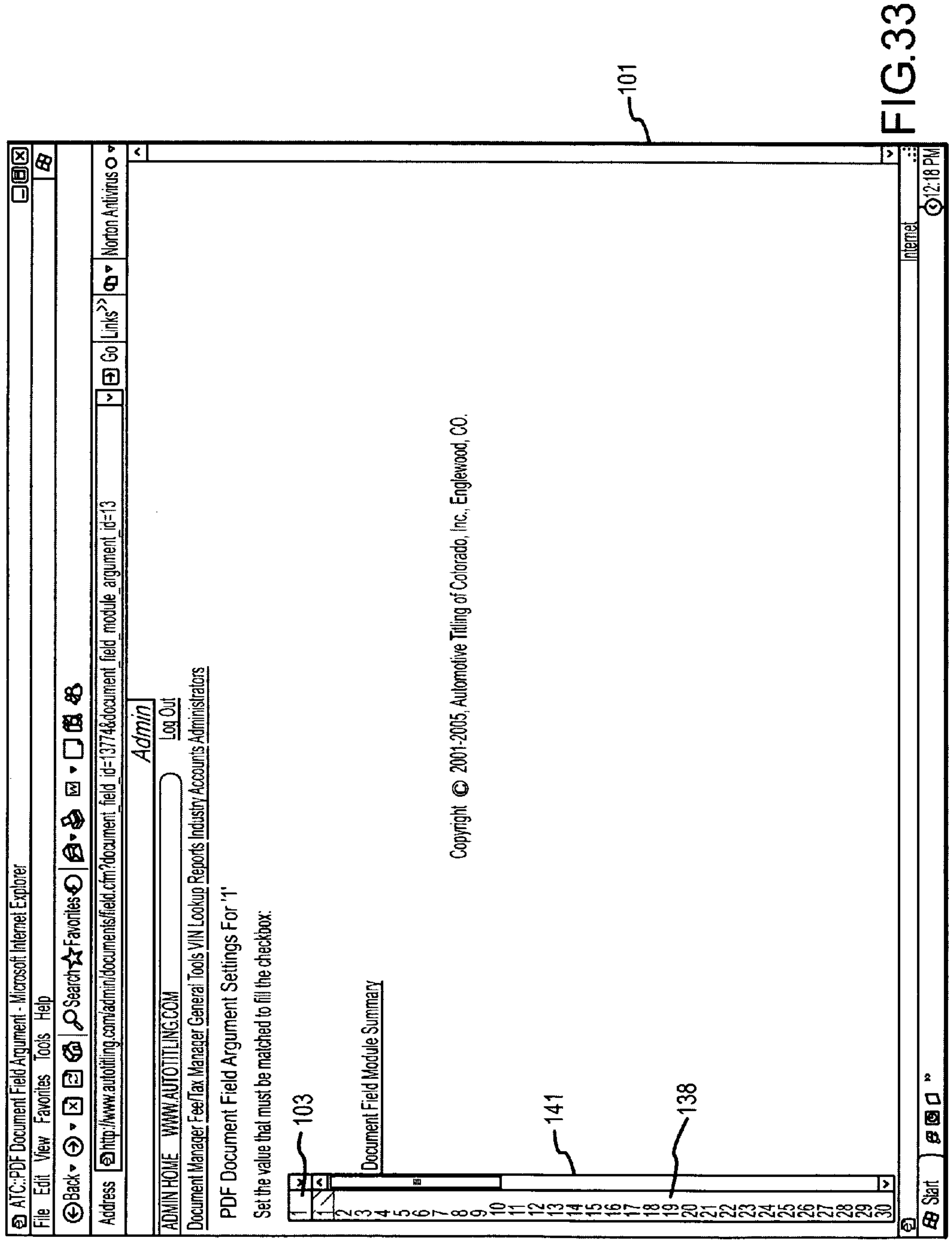
FIG. 33 is a screen image representation of a second argument setting viewer generated by selection of a sequence field argument (field element field argument) in the field argument viewer of the character form field module.
Figure 34:
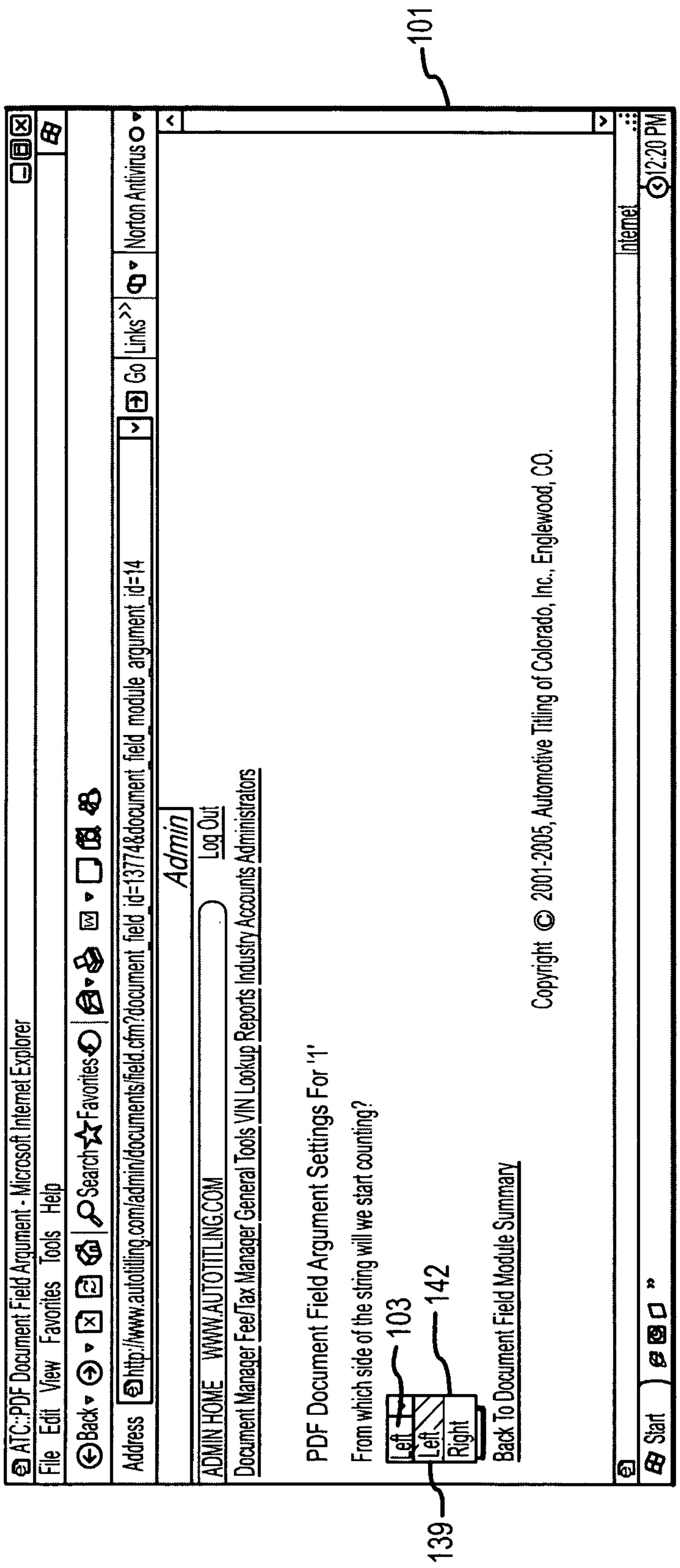
FIG. 34 is a screen image representation of a third argument setting viewer generated by selection of a start field argument (count direction field argument) in the field argument viewer of the checkbox module.

Now referring primarily to FIGS. 12, 31, 32, 33, and 34 an eighth of the plurality of data field setting modules (90) comprises a field element selection module (134) which operates by click event to generate a corresponding field argument viewer (98) (an embodiment shown in FIG. 31) and by click event of one of the field arguments (100) using the "set" icon in the embodiment shown, the corresponding argument setting viewer (101) (an embodiment for each field argument setting viewer shown in FIGS. 32, 33, and 34). As shown by FIG. 31, the field argument viewer (98) provides a first field name argument (135) which requires identification of one of the plurality of inquiry fields (13) to be set, a second field element argument (136) which requires selection of a field element (137) (such as a specific character) at a count location (138) within the selected one of the plurality of inquiry fields (13) to be set, and a third count direction field argument (139) which requires the count location (138) to be established within the selected one of the plurality of inquiry fields (13) by a count direction (139) from the left or the right terminal of the string to be set. A click event of the a first field name argument (135) generates in the corresponding argument setting viewer (101) an inquiry field list (140) each of the plurality of inquiry fields (13) listed functions by click event to establish the string associated with the selected one of the plurality of inquiry fields (13) as the field argument setting (103). A click event of the a second field element argument (136) generates in the corresponding argument setting viewer (101) (see FIG. 33) a list of count values (141) which allows selection of the count location (138), such as 1, 2, 3, . . . within the selected one of the plurality of inquiry fields (13) to establish the field argument setting. A click event of the third count direction field argument (139) generates in the corresponding argument setting viewer (101) (see FIG. 34) a list of count directions (142) which allows selection of count direction (139) starting from the left or the right terminal of the field string of the selected one of the plurality of inquiry fields (13) to establish the field argument setting (103). Subsequent retrieval of the enabled PDF data entity (91) with the defined data entity field (95) allows population of the defined data entity field (95) with the field element (137) having the count location (138) in the selected one of the plurality of inquiry fields (13).

Figure 35:
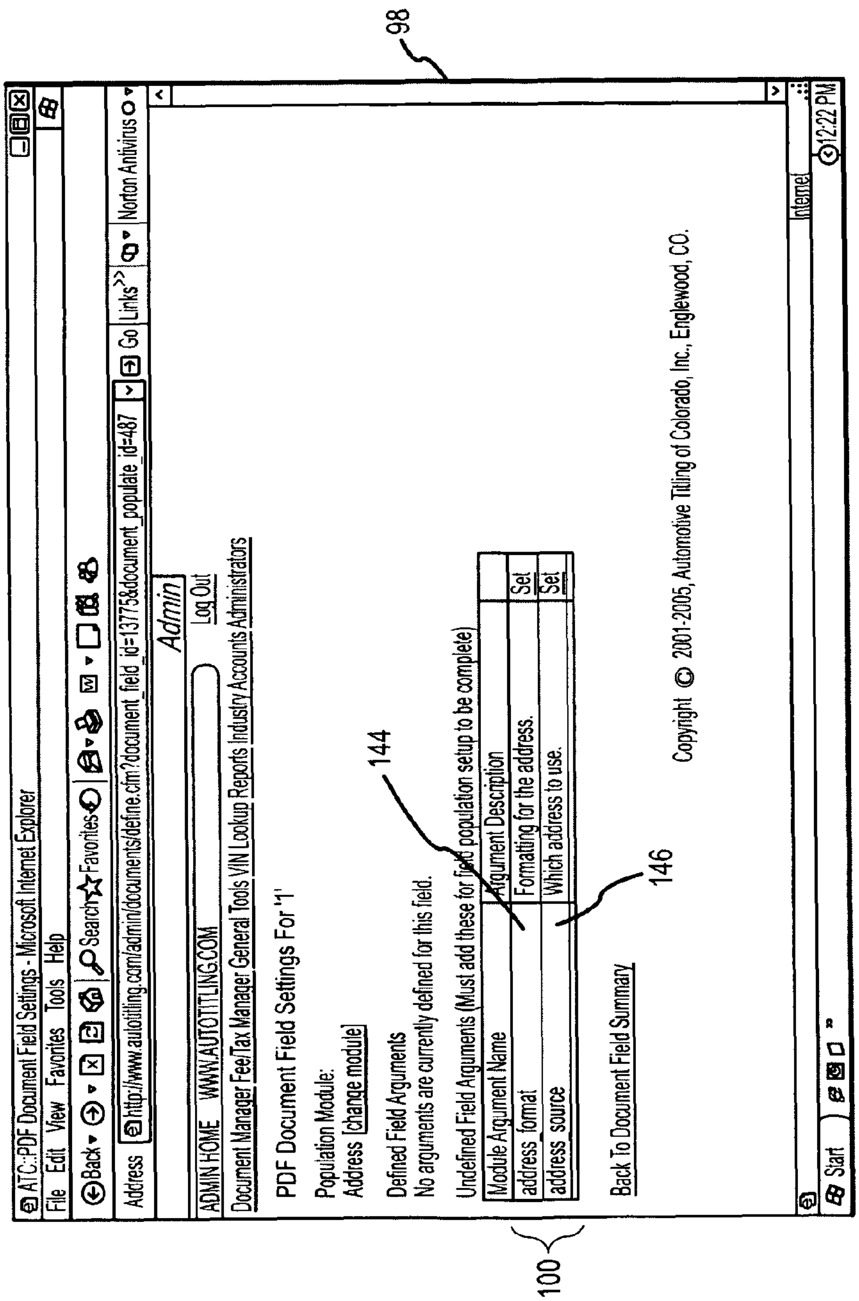
FIG. 35 is a screen image representation of a field argument viewer generated by selection of the address module of the data field setting module viewer.
Figure 36:
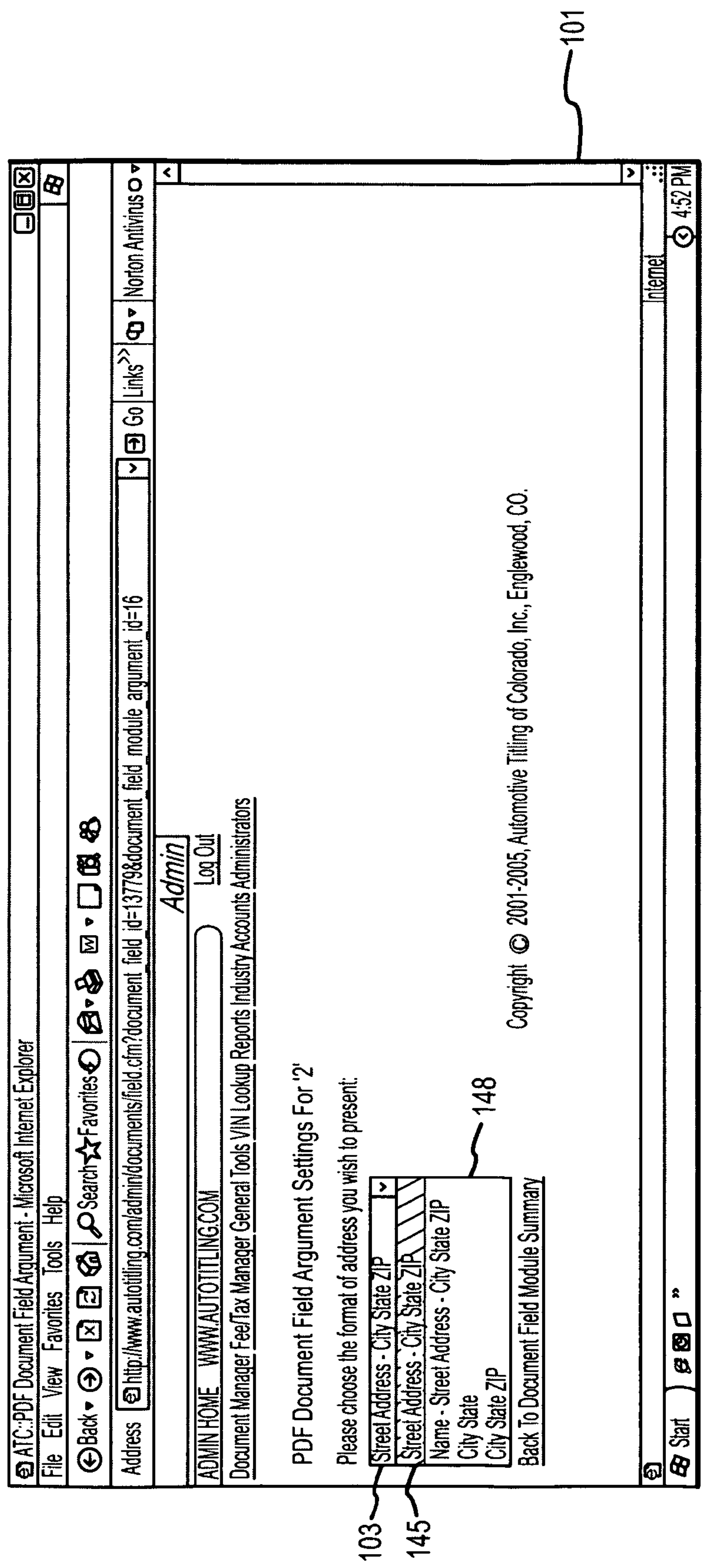
FIG. 36 is a screen image representation of a first argument setting viewer generated by selection of an address format field argument in the field argument viewer of the address module.
Figure 37:
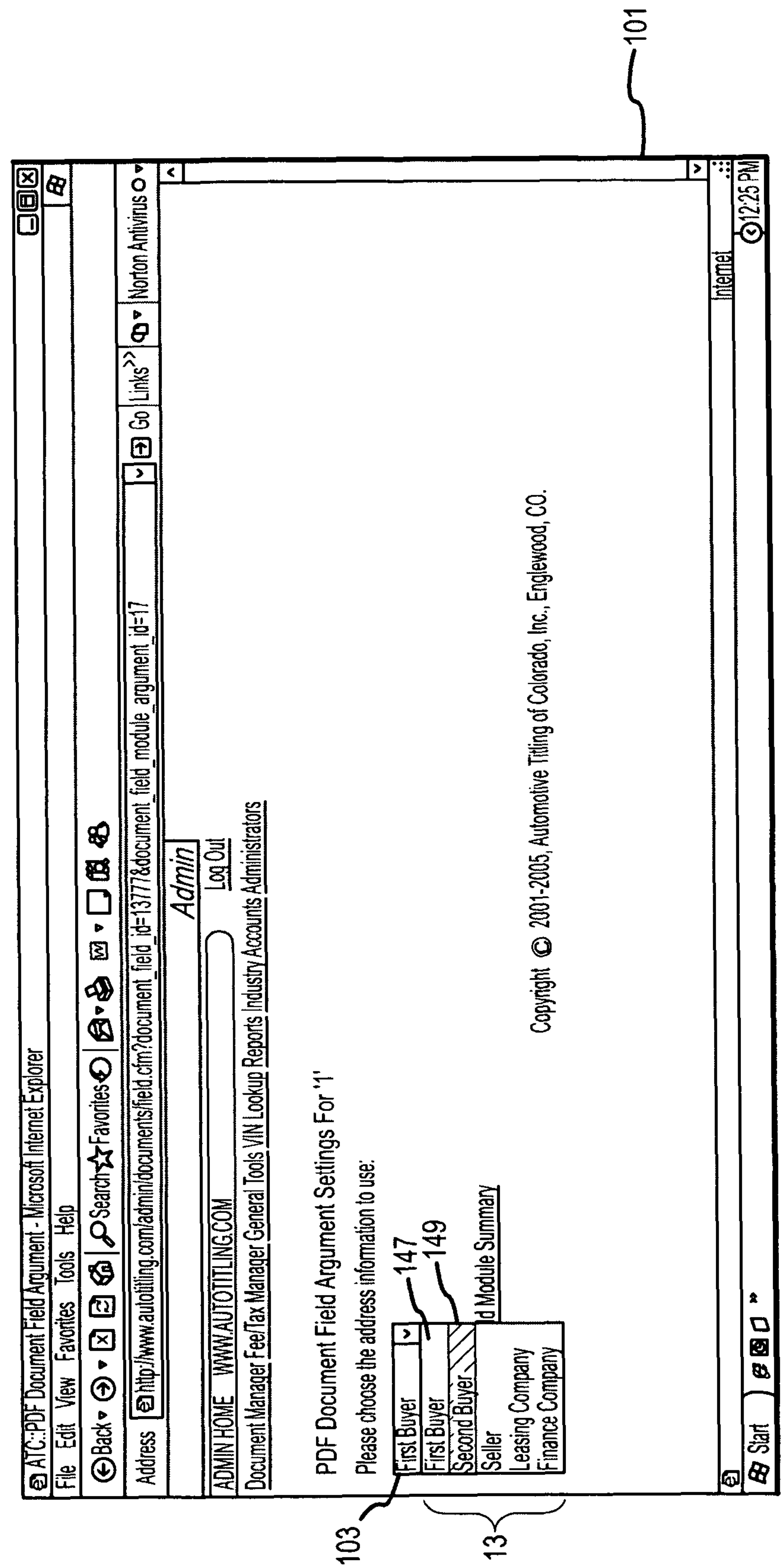
FIG. 37 is a screen image representation of a second argument setting viewer generated by selection of a address source field argument (field element field argument) in the field argument viewer of the character form field module.

Now referring primarily to FIGS. 12, 35, 36, and 37, a ninth of the plurality of data field setting modules (90) comprises an address value module (143) which operates by click event to generate a corresponding field argument viewer (98) (an embodiment shown in FIG. 35) and by click event of one of the field arguments (100) using the "set" icon in the embodiment shown, the corresponding argument setting viewer (101) (an embodiment for each field argument is shown in FIGS. 36 and 37 respectively). As shown by FIG. 35 the field argument viewer (98) provides a first address format field argument (144) which requires an address format (145) to be set and a second address source field argument (146) which requires an address source (147) to be set. A click event of the first address format field argument (144) generates in the corresponding argument setting viewer (101) an address format list (148) selection of an address format (145) by click event establishes the field argument setting (103) for the first address format field argument (144). A click event of the second address source field argument (146) generates in the corresponding argument setting viewer (101) an address source list (149) which allows selection of one of the plurality of inquiry fields (13) in the motor vehicle titling inquiry author (7) as the address source (147) to establish the field argument setting (103) for the second address source field argument (146). Subsequent retrieval of the enabled PDF data entity (91) with the defined data entity field (95) allows population of the defined data entity field (95) with the one of the plurality of motor vehicle titling data elements (11) entered in the selected one of the plurality of inquiry fields (13) of the motor vehicle titling inquiry author (7) as the address source (147).

Because the motor vehicle titling instructions server (5) or components, elements, programs, applications or modules thereof may not be able to interpret data or data structures including motor vehicle data elements (11) held by the second computer (2), the titling instruction inquiry author (7) can provide in whole or in part a programming interface which allows definition, validation, and interpretation of motor vehicle data elements (11) or other data or data structures utilized by or held in memory of the second computer (2). The titling instruction inquiry author (7) can be generated as an Extensible Markup Language ("XML") schema, standard generalized markup language ("SGML"), other markup language, or other type of program interface, which can be stored in the server computer (1) and accessed through the web server (4) or can be stored in the second computer (2).

Now referring primarily to FIG. 38, provides a flow diagram of the steps of generating and processing a motor vehicle titling inquiry (14) as to a preferred embodiment of the invention. In a "generate inquiry" step (154) the second module (10) of the motor vehicle titling inquiry author (7) generates the motor vehicle titling inquiry (14) utilizing the plurality of inquiry field identifiers (13*d*) assigned to the plurality of inquiry fields (13) along with the corresponding plurality of motor vehicle titling data elements (11) established in each of the plurality of fields (13) in a standard markup language structure. A non-limiting EXAMPLE 1 of a motor vehicle titling inquiry in an XML structure is provided below.

In a subsequent "receive inquiry" step (155) the first computer (1) receives the motor vehicle titling inquiry (14) (through the LAN or WAN such as the Internet (3)) as a secure packet of data. In a subsequent "parse and validate step" (156), the motor vehicle titling instructions server (5) operates to parse and validate the plurality of motor vehicle titling data elements (11) entered into the plurality of inquiry fields (13) utilized in the a motor vehicle titling inquiry (14).

A "check errors step" (157) can be performed, if errors exist in the motor vehicle titling inquiry (14), a "return inquiry" step (158) can operate to return the motor vehicle titling inquiry (14) to the second computer (2) with a response message describing the errors. EXAMPLE 2 provides a non-limiting example of a "return inquiry" step (158) on a titling instruction inquiry (14).

If the motor vehicle titling inquiry (14) has no errors, the motor vehicle titling instructions server (5) performs a "retrieval" step (159) to obtain the plurality of motor vehicle titling data entities (15) from the motor vehicle titling database (16) encompassed by the motor vehicle titling inquiry (14). As above-described, the motor vehicle titling database (16) of the first computer (1) can contain a plurality of motor vehicle titling data entities (15) which can be mapped to a motor vehicle titling inquiry (14) based on the identifiers coupled by the add data entity function (62).

Upon retrieving that part of the plurality of motor vehicle titling data entities (15) from the motor vehicle titling database (16) encompassed by the motor vehicle titling inquiry (14), the motor vehicle titling inquiry author (7) performs a "load data entities" step (160) by which the retrieved part of the plurality of motor vehicle titling data entities (15) are incorporated into the motor vehicle titling instruction (20). The load data entities step (160) can further include a "populate data entities" step (161) by which the plurality of motor vehicle titling data elements (11) are matched to and established in the defined data entity fields (95) of any retrieved enabled PDF data entity (91). Defined fields to which none of the plurality of motor vehicle titling data elements (11) are matched can be assigned a missing field identifier (165). An example of a motor vehicle titling instruction (20) as an XML schema is described by EXAMPLE 3.

Now referring to FIGS. 38 and 39, in a "return response" step (162) the motor vehicle titling instruction (20) can be forwarded to the second computer (2) and by function of motor vehicle titling instruction viewer (19) the motor vehicle titling instruction (20) can be displayed as an motor vehicle titling instruction image representation (20*a*) which displays or allows access to all of the a plurality of motor vehicle titling data entities (15) generated in response to the motor vehicle titling inquiry (14). In the embodiment of the motor vehicle titling instruction viewer (19) shown by FIG. 39, one or more enabled PDF data entity (91) can be downloaded by click event of a "click here to download pdf" icon (163).

In a subsequent "manual population step" (164), the user can manually establish one of the plurality of motor vehicle titling data elements (11) into defined data entity fields (95) of the downloaded enabled PDF data entity (91) which are assigned a missing field identifier (165).

Now referring again primarily to FIG. 1 and FIG. 2, the functions of the email server (18), the to a web server (4), and the titling instructions server (5) can function to transmit motor vehicle titling instructions (17) to an email recipient (20). The user (50) retrieves one or more motor vehicle titling instructions (17) stored in a memory element (22) (48) (or generated by applications served by the titling instructions server (5)). The user (50) can than select by click event an email recipient address (74) from an email recipient list (75) of an email recipient (20) to which the user will send URL's (19) of the selected motor vehicle titling instructions (17) in an email (18). The user may also enter descriptive text, notation, or comments to the email in a message field (76). The email can then either be created and sent by click event on email control icon (77) (such as the OK button) or canceled by click event of the email cancel icon (78). The email recipient (20) receives the recipient's email (18) which, upon opening displays URL (19) (or icon corresponding to an URL). Click event on the URL (19) establishes communication with and the titling instructions server (5) to transmit the motor vehicle titling instructions (17) to the email recipient's (20) automotive titling viewer (9).

Example 1

Now referring to FIGS. 40A and 40B, a non-limiting example of a motor vehicle titling inquiry is provided in an XML schema. This particular example is not intended to be limiting with respect to the type of markup language which can be utilized to generate a motor vehicle titling inquiry compatible with the architecture utilized to assign motor vehicle data entity identifiers to the plurality of motor vehicle titling data entities (15) by use of the motor vehicle titling data entity manager (54) as above described.

Example 2

FIGS. 41A to 41D provide a non-limiting example of a "return inquiry" step (158) on a titling instruction inquiry (14) in an XML schema.

Example 3

FIGS. 42A to 42D provide a non-limiting example of a motor vehicle titling instruction (20) in an XML schema.

As can be easily understood from the foregoing, the basic concepts of the present invention may be embodied in a variety of ways. The invention involves numerous and varied embodiments of an automotive titling system and methods of use thereof. As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "automotive title" should be understood to encompass disclosure of the act of "automotive titling"—whether explicitly discussed or not—and, conversely, were there the disclosure of the act of "automotive titling", such a disclosure should be understood to encompass disclosure of a "automotive title" and even a "means for automotive titling." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the automotive titling systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

Any claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of any such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Any claims set below are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any United States non-provision patent application or Patent Cooperation Treaty patent application, or any continuation, division, or continuation-in-part, or similar application thereof.

The invention claimed is:

1. A computer implemented method of populating a plurality of fields in a data entity, comprising the steps of:

a) retrieving a data entity, wherein said data entity comprises a PDF file having a plurality of data entity fields at least one of which comprises an undefined data entity field;

b) activating a data entity field population module which interacts with said PDF file;

c) generating a list of undefined data entity fields of said plurality of data entity fields of said PDF file by operation of said data entity field population module;

d) selecting one said undefined data entity field from said list of undefined data entity fields; and e) generating a data field setting module viewer which provides a plurality of data field setting modules.

2. The computer implemented method of populating a plurality of fields in a data entity as described in claim 1, further comprising the step of selecting one of said plurality of data field setting modules provided by said data field setting module viewer.

3. The computer implemented method of populating a plurality of fields in a data entity as described in claim 2, wherein said step of selecting one of said plurality of data field setting modules provided by said data field setting module viewer comprises the step of selecting one of said plurality of data field setting modules from the group consisting of: a direct field copy module, a fee or tax module, a static text module, a calculated value module, a full name module, a checkbox module, a date value module, a character form field module, and an address module.

4. The computer implemented method of populating a plurality of fields in a data entity as described in claim 3, further comprising the step of generating a field argument viewer which corresponds to the selected one of said plurality of data field setting modules.

5. The computer implemented method of populating a plurality of fields in a data entity as described in claim 4, further comprising the step of selecting a field argument from a list of field arguments generated in said field argument viewer.

6. The computer implemented method of populating a plurality of fields in a data entity as described in claim 5, further comprising the step of generating a plurality of field argument settings corresponding to the selected said field argument.

7. The computer implemented method of populating a plurality of fields in a data entity as described in claim 6, further comprising the step selecting one of said plurality of field argument settings to establish a defined data entity field.

8. The computer implemented method of populating a plurality of fields in a data entity as described in claim 7, wherein said step of selecting one of said plurality of data field setting modules comprises the step of selecting said direct field copy module, and wherein said step of selecting a field argument from a list of field arguments comprises the step of selecting a field argument which generates a list of inquiry fields of a motor vehicle titling inquiry author, and wherein selection of one of said plurality of inquiry fields of said motor vehicle titling inquiry author establishes said defined data entity field, and wherein said defined data entity field upon subsequent retrieval of said data entity populates with a motor vehicle titling data element established in the selected one of said plurality of inquiry fields of said motor vehicle titling inquiry author.

9. The computer implemented method of populating a plurality of fields in a data entity as described in claim 7, wherein said step of selecting one of said plurality of data field setting modules comprises the step of selecting a fee-tax module, and wherein said step of selecting a field argument from a list of field arguments comprises the step of selecting a field argument which generates a list of fee-tax calculators, and wherein selection of a fee-tax calculator establishes a defined data entity field, and wherein said defined data entity field upon subsequent retrieval of said data entity populates with a fee or a tax calculated by the selected one said fee-tax calculator.

10. The computer implemented method of populating a plurality of fields in a data entity as described in claim 7, wherein said step of selecting one of said plurality of data field setting modules comprises the step of selecting said static text module, and wherein said step of selecting a field argument from a list of field arguments comprises the step of selecting a field argument which generates a static text field which allows entry of an amount of static text, and wherein entry of said amount of static text in said static text field establishes a defined data entity field, and wherein said defined data entity field upon subsequent retrieval of said data entity populates with said amount of static text entered into said static text field.

11. The computer implemented method of populating a plurality of fields in a data entity as described in claim 7, wherein said step of selecting one of said plurality of data field setting modules comprises the step of selecting said calculated value module, and wherein said step of selecting a field argument from a list of field arguments comprises the step of selecting a field argument which generates a list of value calculators, and wherein selection of a value calculator establishes a defined data entity field, and wherein said defined data entity field upon subsequent retrieval of said data entity populates with a value calculated by the selected one said value calculator.

12. The computer implemented method of populating a plurality of fields in a data entity as described in claim 7, wherein said step of selecting one of said plurality of data field setting modules comprises the step of selecting said full name module, and wherein said step of selecting a field argument from a list of field arguments comprises the step of selecting a field argument which generates a list of name formats, and wherein selection of a name format establishes a defined data entity field, and wherein said defined data entity field upon subsequent retrieval of said data entity populates with a name formatted in the selected one said name format.

13. The computer implemented method of populating a plurality of fields in a data entity as described in claim 7, wherein said step of selecting one of said plurality of data field setting modules comprises the step of selecting said checkbox module, and wherein said step of selecting a field argument from a list of field arguments comprises the steps of:

a. selecting a first field argument which generates a list of inquiry fields associated with a checkbox of said data entity;

b. selecting a second field argument which generates a check box element value field which allows entry of a check box element value; and c. selecting a third field argument which generates a check box match value field which allows entry of check box match value; and wherein selection of an inquiry field from said list of inquiry fields, and wherein entry of said check box element value, and wherein entry of a check box match value establishes a defined data entity field, and wherein said defined data entity field upon subsequent retrieval of said data entity populates said check box associated with the selected one said inquiry fields with said check box element value if a value established in said selected inquiry field matches said check box match value.

14. The computer implemented method of populating a plurality of fields in a data entity as described in claim 7, wherein said step of selecting one of said plurality of data field setting modules comprises the step of selecting said date value module, and wherein said step of selecting a field argument from a list of field arguments comprises the step of selecting a field argument which generates a list of date formats, and wherein selection of a date format establishes a defined data entity field, and wherein said defined data entity field upon subsequent retrieval of said data entity populates with a date formatted in the selected one said date format.

15. The computer implemented method of populating a plurality of fields in a data entity as described in claim 7, wherein said step of selecting one of said plurality of data field setting modules comprises the step of selecting said field element selection module, and wherein said step of selecting a field argument from a list of field arguments comprises the steps of:

a. selecting a first field argument which generates a list of inquiry fields;

b. selecting a second field argument which generates a list of count locations corresponding to a plurality of field elements within an inquiry field of said motor vehicle titling inquiry author; and c. selecting a third field argument which generates a list of count directions to apply to a count location; and wherein selection of an inquiry field, and wherein selection of said count location, and wherein selection of a count direction establishes a defined data entity field, and wherein said defined data entity field upon subsequent retrieval of said data entity populates with said field element having said count location with said count direction in the selected one said inquiry field.

16. The computer implemented method of populating a plurality of fields in a data entity as described in claim 7, wherein said step of selecting one of said plurality of data field setting modules comprises the step of selecting said address value module, and wherein said step of selecting a field argument from a list of field arguments comprises the step of selecting a field argument which generates a list of address formats, and wherein selection of an address format establishes a defined data entity field, and wherein said defined data entity field upon subsequent retrieval of said data entity populates with an address established in the selected one said address format.

* * * * *